(12) United States Patent
Zhao et al.

(10) Patent No.: US 11,043,997 B2
(45) Date of Patent: Jun. 22, 2021

(54) ELECTRONIC DEVICE, COMMUNICATION METHOD AND STORAGE MEDIUM IN WIRELESS COMMUNICATION SYSTEM

(71) Applicant: Sony Corporation, Tokyo (JP)

(72) Inventors: Peiyao Zhao, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/634,584

(22) PCT Filed: Oct. 9, 2018

(86) PCT No.: PCT/CN2018/109472
§ 371 (c)(1),
(2) Date: Jan. 28, 2020

(87) PCT Pub. No.: WO2019/072167
PCT Pub. Date: Apr. 18, 2019

(65) Prior Publication Data
US 2020/0212978 A1    Jul. 2, 2020

(30) Foreign Application Priority Data
Oct. 11, 2017 (CN) .......................... 201710940030.4

(51) Int. Cl.
*H04L 27/00* (2006.01)
*H04B 7/06* (2006.01)
(Continued)

(52) U.S. Cl.
CPC ......... *H04B 7/0617* (2013.01); *H04B 7/0404* (2013.01); *H04B 7/0456* (2013.01)

(58) Field of Classification Search
CPC ... H04B 7/0617; H04B 7/0404; H04B 7/0456
(Continued)

(56) References Cited

U.S. PATENT DOCUMENTS

| 9,559,799 B2 * | 1/2017 | Lee ........................ H04L 5/0092 |
| 2013/0072244 A1 * | 3/2013 | Jeong ..................... H04B 7/086 |
| | | 455/509 |

(Continued)

FOREIGN PATENT DOCUMENTS

| CN | 1540903 A | 10/2004 |
| CN | 1855760 A | 11/2006 |

(Continued)

OTHER PUBLICATIONS

International Search Report and Written Opinion dated Jan. 4, 2019 for PCT/CN2018/109472 filed on Oct. 9, 2018, 8 pages including English Translation of the International Search Report.

(Continued)

*Primary Examiner* — Helene E Tayong
(74) *Attorney, Agent, or Firm* — Xsensus LLP

(57) ABSTRACT

The present disclosure relates to an electronic device in a wireless communication system, a communication method and storage medium. Provided is a method for estimating a channel angle of departure (AOD) that includes, by means of multiple antenna arrays, using the same analog beam formation parameters to transmit a reference signal so as to form a first combined beam and a second combined beam having different directions. The method further includes determining the relative beam gain for the two combined (Continued)

beams, and determining the channel AOD on the basis of a mapping relationship between the relative beam gain and the channel AOD.

15 Claims, 23 Drawing Sheets

(51) Int. Cl.
*H04B 7/0404* (2017.01)
*H04B 7/0456* (2017.01)

(58) Field of Classification Search
USPC .......................................................... 375/295
See application file for complete search history.

(56) References Cited

U.S. PATENT DOCUMENTS

| | | | |
|---|---|---|---|
| 2014/0050280 A1 | 2/2014 | Stirling-Gallacher et al. | |
| 2016/0344463 A1 | 11/2016 | Kim et al. | |
| 2017/0207843 A1* | 7/2017 | Jung | H04B 7/0695 |
| 2018/0270844 A1* | 9/2018 | Kim | H04W 72/14 |

FOREIGN PATENT DOCUMENTS

| | | |
|---|---|---|
| KR | 20100077405 A | 7/2010 |
| WO | 2015/156496 A2 | 10/2015 |

OTHER PUBLICATIONS

Extended European search report dated Sep. 21, 2020, in corresponding to European patent Application No. 18867074.9, 21 pages.
Huawei et al., "Multi-panel codebook", 3GPP TSG RAN WG1 NR Ad Hoc Meeting, R1-1711407, Jun. 27-30, 2017, total 5 pages, Qingdao, China, XP051300595. Retrieved from the Internet: URL:http://www.3gpp.org/ftp/Meetings_3GPP_SYNC/RAN1/Docs/ [retrieved on Jun. 26, 2017] * Section 2 *.
Samsung, "Type I CSI reporting", 3GPP TSG RAN WG1 Meeting #89, R1-1707961, May 15-19, 2017, total 10 pages, Hangzhou, China, XP051273159. Retrieved from the Internet: URL:http://www.3gpp.org/ftp/Meetings_3GPP_SYNC/RAN1/Docs/ [retrieved on May 14, 2017] * Section 4 *.

* cited by examiner $\phi=0°$                    $\phi=30°$

ELECTRONIC DEVICE, COMMUNICATION METHOD AND STORAGE MEDIUM IN WIRELESS COMMUNICATION SYSTEM

CROSS-REFERENCE TO RELATED APPLICATIONS

The present application is based on PCT filing PCT/CN2018/109472, filed Oct. 9, 2018, which claims priority to CN 201710940030.4, filed Oct. 11, 2017, the entire contents of each are incorporated herein by reference.

TECHNICAL FIELD

The present disclosure relates to electronic device, communication method and storage medium in wireless communication system, and more specifically, the present disclosure relates to electronic device, communication method and storage medium for beamforming and channel direction estimation with multiple antenna arrays.

BACKGROUND ART

With the development of wireless communication technology, various techniques for enhancing anti-interference capability have been researched and developed. One of such techniques is beamforming technology. Generally, a beam is generated in the way of analog beamforming, that is, a baseband signal representing a data stream is transmitted via a radio frequency link to phase shifters corresponding to respective antenna elements in an antenna array, the phase shifters change a phase of the signal according to respective phase setting parameters, and the signal is transmitted by the corresponding antenna elements to form a directive beam, thereby a significant array gain can be obtained. In 5G NR (New Radio), both of the base station and the user equipment (UE) can use directional beams to overcome large path fadings in a frequency band above 6 GHz. However, in conventional beamforming techniques, changing the beam direction requires reconfiguring the phase setting parameters of the phase shifters, which requires a certain time overhead.

In addition, in order to improve a signal-to-noise ratio (SNR) at the receiving side, the beam direction is required to match the channel direction, that is, at the transmitting side, the transmitting beam aligns with the channel emission angle (Angle of Departure, AoD), and at the receiving side, the receiving beam aligns with the channel arrival angle (Angle of Arrival, AoA). Due to the limited number of radio frequency links, beam scanning is used in prior arts to determine the beams to be used at the transmitting side and the receiving side. Specifically, the transmitting side and the receiving side pre-store a beamforming codebook which includes beamforming parameters (i.e., a phase setting parameter matrix for the phase shifters) for generating finite beams with different directions, respectively. The optimum pair of transmitting beam and receiving beam can be selected from the beamforming codebook by beam scanning. However, a disadvantage of this method is that the direction of the beam formed by the beamforming parameters in the beamforming codebook is limited, so that only the beam with a direction as close to the channel direction as possible can be selected, that is, it is possible to only estimate that the channel direction is within a certain approximate range, but it is impossible to align the beam with the channel direction accurately. The accuracy of such channel direction estimation depends on the size of the beamforming codebook. In order to improve the accuracy of estimation, the codebook size must be increased, resulting in an increase in overhead of beam scanning.

However, it is necessary to obtain an accurate channel direction in many applications. As an example, if the transmitting side is able to estimate the accurate channel direction, it may not be limited by a specific beamforming codebook when transmitting a beam to the receiving side, so that the transmitting beam can be aligned with the channel direction more accurately, further improving the received SNR. As another example, in case of downlink transmission, when the UE as the receiving side moves, a change of the channel direction results in a decrease in degree of matching with the current beam, and the received SNR of the UE decreases, and further, when the channel direction exceeds a coverage of the current transmitting beam, the base station at the transmitting side needs to perform beam switching, and in a condition that there is no channel direction information, the overhead of beam switching is large. Therefore, if the base station can obtain accurate channel direction information, the movement of the UE can be predicted and tracked, so that as the channel direction changes, the base station can adjust the beam direction to track the user, maintain a high received SNR, and reduce the overhead of beam switching. In addition, it is significant to obtain an accurate channel direction in terms of UE positioning and user scheduling.

Therefore, there is a further need of improved forming of beams and estimation of the channel direction.

SUMMARY OF THE INVENTION

Aspects are provided by the present disclosure to satisfy the above-mentioned need.

A brief overview regarding the present disclosure is given below, for purpose of a basic understanding of some aspects of the present disclosure. However, it will be appreciated that the overview is not an exhaustive description of the present disclosure. It is not intended to specify key portions or important portions of the present disclosure, nor to limit the scope of the present disclosure. It aims at describing some concepts about the present disclosure in a simplified form and serves as a preorder of a more detailed description given later.

According to an aspect of the present disclosure, there is provided an electronic device at a transmitting side, comprising a processing circuitry configured to: a processing circuitry configured to: determine a target channel direction, determine basic compensation phase information for a plurality of antenna arrays with respect to the target channel direction, wherein the basic compensation phase information indicates phase differences compensated for each of the plurality of antenna arrays such that beams transmitted by the plurality of antenna arrays can be combined into a single combined beam which has the same direction as the target channel direction, and control the plurality of antenna arrays to transmit beams based on the target channel direction and the basic compensation phase information.

According to an aspect of the present disclosure, there is provided an electronic device at a transmitting side, comprising a processing circuitry configured to: determine common analog beamforming parameters for a plurality of antenna arrays, each antenna array forming a beam pointing to a particular channel direction based on the analog beamforming parameters, and determine, based on phase differences between corresponding antenna elements of the plurality of antenna arrays, a relative phase adjustment for baseband signals of the plurality of antenna arrays so as to adjust a direction of a combined beam resulting from a combination of transmitting beams formed by the plurality of antenna arrays with the analog beamforming parameters.

According to an aspect of the present disclosure, there is provided an electronic device at a transmitting side, comprising: a processing circuitry, configured to: perform a code division multiplexing on reference signals for a plurality of ports with an orthogonal code matrix, and control a plurality of antenna arrays to transmit the code division multiplexed reference signals on a first communication resource and a second communication resource with same analog beamforming parameters, so as to form a first combined beam and a second combined beam, wherein the first combined beam and the second combined beam are symmetric about a particular transmitting beam corresponding to the analog beamforming parameters.

According to an aspect of the present disclosure, there is provided an electronic device at a transmitting side, comprising a processing circuitry configured to: determine common analog beamforming parameters for a plurality of antenna arrays; control the plurality of antenna arrays to transmit code division multiplexed reference signals on a first communication resource and a second communication resource by using the determined target transmitting beam, so as to form a first combined beam and a second combined beam, respectively, wherein the first combined beam and the second combined beam have different directions; receive information on a relative beam gain of the first and second combined beams received at a receiving side; and determine a channel direction angle based on a mapping relationship between the information and the channel direction angles.

According to an aspect of the present disclosure, there is provided an electronic device at a receiving side, comprising a processing circuitry configured to: control to receive a first reference signal beam and a second reference signal beam formed by a transmitting side transmitting beamformed reference signals on a first communication resource and a second communication resource, wherein the first reference signal beam on the first communication resource and the second reference signal beam on the second communication resource have different directions; determine a relative beam gain of the received first and second reference signal beams; and feedback information on the relative beam gain to the transmitting side.

According to an aspect of the present disclosure, there is provided a communication method comprising: determining a target channel direction, determining basic compensation phase information of a plurality of antenna arrays for the target channel direction, wherein the basic compensation phase information indicates phase differences compensated for each of the plurality of antenna arrays such that beams transmitted by the plurality of antenna arrays can be combined into a single combined beam which has the same direction as the target channel direction, and controlling the plurality of antenna arrays to transmit beams based on the target channel direction and the basic compensation phase information.

According to an aspect of the present disclosure, there is provided a communication method comprising: determining common analog beamforming parameters for a plurality of antenna arrays, each antenna array forming a beam pointing to a particular channel direction based on the analog beamforming parameters, and determining, based on phase differences between corresponding antenna elements of the plurality of antenna arrays, a relative phase adjustment for baseband signals of the plurality of antenna arrays so as to adjust a direction of a combined beam which results from a combination of transmitting beams formed by the plurality of antenna arrays with the analog beamforming parameters.

According to an aspect of the present disclosure, there is provided a communication method comprising: performing a code division multiplexing on reference signals of a plurality of ports with an orthogonal code matrix, and controlling a plurality of antenna arrays to transmit the code division multiplexed reference signals on a first communication resource and a second communication resource with the same analog beamforming parameters, so as to form a first combined beam and a second combined beam, wherein the first combined beam and the second combined beam are symmetric about a particular transmitting beam corresponding to the analog beamforming parameters.

According to an aspect of the present disclosure, there is provided a communication method comprising: determining common analog beamforming parameters for a plurality of antenna arrays; controlling the plurality of antenna arrays to transmit code division multiplexed reference signals on a first communication resource and a second communication resource by using the determined target transmitting beam, so as to form a first combined beam and a second combined beam, respectively, wherein the first combined beam and the second combined beam have different directions; receiving information on a relative beam gain of the first and second combined beams received at a receiving side; and determining a channel direction angle based on a mapping relationship between the information and the channel direction angles.

According to an aspect of the present disclosure, there is provided a communication method comprising: controlling to receive a first reference signal beam and a second references signal beam formed by a transmitting side transmitting beamformed reference signals on a first communication resource and a second communication resource, wherein the first reference signal beam on the first communication resource and the second reference signal beam on the second communication resource have different directions; determining a relative beam gain of the received first and second reference signal beams; and feedbacking information on the relative beam gain to the transmitting side.

According to an aspect of the present disclosure, there is provided a non-transitory computer readable storage medium storing executable instructions which, when executed, performs the communication method as described above.

According to one or more embodiments of the present disclosure, desired beams can be formed efficiently, and the channel direction can be evaluated accurately for facilitating beam tracking, user positioning, user scheduling or the like and reducing expense of system resources.

BRIEF DESCRIPTION OF THE DRAWINGS

A better understanding of the present disclosure may be achieved by referring to a detailed description given hereinafter in connection with accompanying figures, where the same or similar reference signs are used to indicate the same or similar components throughout the figures. The figures are included in the specification and form a part of the specification along with the following detailed descriptions, for further illustrating embodiments of the present disclosure and for explaining the theory and advantages of the present disclosure. Wherein.

Figure 1:
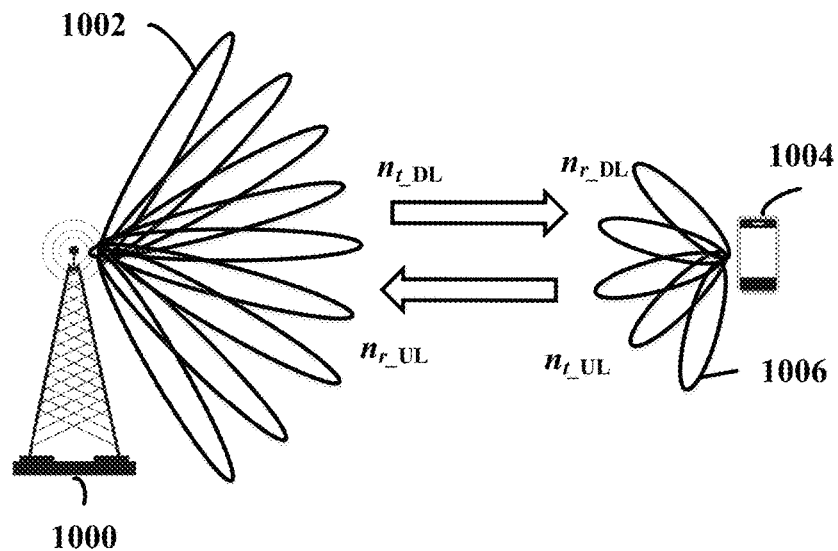
FIG. 1 illustrates a schematic diagram of conducting communication using the beamforming technique in a wireless communication system.

Further features of the present invention will become apparent from the following description of exemplary embodiments with reference to the attached drawings.

DESCRIPTION OF EMBODIMENTS

The illustrative embodiments of the invention will be described hereinafter with reference to the drawings. For purpose of clarity and simplicity, not all features are described in the specification. Note that, however, many settings specific to the implementations can be made in practicing the invention according to specific requirements, so as to achieve specific goals of the developers, for example, to comply with the limitations related to apparatus and service, and these limitations may vary from one implementation to another. Furthermore, it will be appreciated that the developing work will be a routine task, despite complex and tedious, for those skilled in the art who benefit from the present disclosure.

In addition, note that the figures illustrate only steps of a process and/or components of a device that are closely related to the technical solutions of the invention, and omit other details that are in little relation to the invention.

Embodiments of the present disclosure will be described below with reference to the drawings. The following description of illustrative embodiments are merely exemplary and should not be regarded as any limit for the scope of the present disclosure and the applications thereof.

The First Embodiment

Before giving detailed description for the technical solutions of the first embodiment of the present disclosure, some concepts that may be used in the present disclosure are briefly introduced. The descriptions are only for the purpose of facilitating the understanding of the technical solutions of the present disclosure, and are not intended to limit the application scenarios of the present disclosure.

Introduction to the Concepts

Typically, a wireless communication system includes at least a base station and a user equipment (UE), and the base station provides communication services for one or more UEs.

In the present disclosure, the term "base station" has the full breadth of its usual meaning and includes at least a wireless communication station that is used as part of a wireless communication system or radio system to facilitate communication. As an example, the base station may be, for example, an eNB of the 4G communication standard, a gNB of the 5G communication standard, a remote radio head, a wireless access point, a drone control tower, or a communication device performing similar functions. Application examples of the base station will be described in detail in the following sections.

In the present disclosure, the term "user equipment" or "UE" has the full breadth of its usual meaning and includes at least a terminal device that is used as part of a wireless communication system or a radio system to facilitate communication. As an example, the UE may be, for example, a terminal device such as a mobile phone, a laptop, a tablet, an in-vehicle communication device, or the like, or an element thereof. Application examples of the UE will be described in detail in the following sections.

The base station and the UE may have multiple antennas supporting the MIMO technique. The use of the MIMO technique enables base stations and UEs to utilize the spatial domain to support spatial multiplexing, beamforming, and transmit diversity. The spatial multiplexing can be used to simultaneously transmit different data streams on the same frequency. These data streams can be sent to a single UE to increase the data rate (which can be classified as SU-MIMO technique) or sent to multiple UEs to increase the total system capacity (which can be classified as MU-MIMO technique). This is done by spatially precoding each data stream (i.e., performing a scaling of the amplitude and/or an adjusting of the phase) and then transmitting each spatially precoded stream on the downlink (DL) from the base station to the UE through multiple transmitting antennas. The spatially precoded data streams arrive at one or more UEs with different spatial signatures, which enables each UE to receive the data streams via its multiple antennas and recover one or more data streams destined for the UE. On the uplink (UL) from the UE to the base station, each UE transmits a spatially precoded data stream through its multiple antennas, which enables the base station to receive the data stream through its antennas and identify the source of each spatial precoded data stream.

The spatial multiplexing is generally used when the channel is in a good condition. When the channel condition is not good, the beamforming can be used to concentrate the transmitted energy in one or more directions. This can be achieved by spatially precoding the data for transmission through multiple antennas (e.g., multiple antenna elements in the antenna array). In order to achieve a good coverage at the edge of a cell, the transmission of a single data stream by beamforming can be used in conjunction with the transmit diversity.

FIG. 1 is a schematic diagram showing the communication by a wireless communication system using the beamforming technique. In FIG. 1, the rightward arrow indicates the downlink (DL) direction from the base station 1000 to the UE 1004, and the leftward arrow indicates the uplink (UL) direction from the UE 1004 to the base station 1000. As shown in FIG. 1, a beam set usable by the base station 1000 include $n_{t\_DL}$ ($n_{t\_DL}$ is a natural number greater than or equal to 1, $n_{t\_DL}$=9 in FIG. 1) downlink transmitting beams aligned respectively with different directions, and a beam set usable by the UE 1004 include $n_{r\_DL}$ ($n_{r\_DL}$ is a natural number greater than or equal to 1, and n $n_{r\_DL}$=5 in FIG. 1) downlink receiving beams aligned respectively with different directions. In addition, the beam set usable by the base station 1000 also include $n_{r\_UL}$ ($n_{r\_UL}$ is a natural number greater than or equal to 1, and $n_{r\_UL}$=9 in FIG. 1) uplink receiving beams aligned respectively with different directions, and the beam set usable by the UE 1004 also include $n_{t\_UL}$ ($n_{t\_UL}$ is a natural number greater than or equal to 1, $n_{t\_UL}$=5 in FIG. 1) uplink transmitting beams aligned respectively with different directions. It will be appreciated that, depending on system requirements and settings, the coverage and number of the uplink receiving beams and the downlink transmitting beams of the base station 1000 may be different, so are the uplink transmitting beams and the downlink receiving beams of the UE 1004. In order to avoid redundant description and unnecessary confusion, the present disclosure will be mainly described by taking the downlink transmission as example. However, it will be appreciated that aspects of the present disclosure may also be applied to the uplink transmission. That is to say, "the transmitting side" mentioned below may be either a base station or a UE. Correspondingly, "the receiving side" may be either a UE or a base station.

In the downlink transmission, the base station 1000 may select one beam (hereinafter referred to as a target transmitting beam) for transmission from its beam set by beam scanning, and the UE 1004 may select one beam for reception from its beam set by beam scanning. The base station 1000 and the UE 1004 can configure their antennas by using analog beamforming parameters associated with the selected beam.

The multiple antennas of the base station 1000 and the UE 1004 may be arranged in an antenna array. Typically, the antennas (hereinafter referred to as antenna elements) of the antenna array are uniformly arranged into a matrix of M rows×N columns, wherein an interval of antenna elements in the horizontal direction is $d_H$, and an interval of antenna elements in the vertical direction is $d_V$. If classified in terms of structure, when M or N is 1 (that is, there are only 1 row or 1 column of antenna element), the antenna array may be referred to as a uniform linear array (ULA), and when neither M nor N is 1 (that is, there are multiple rows and multiple columns of antenna elements), the antenna array can be referred to as a uniform planar array (UPA). The antenna array can also be constructed in any pattern, such as a disk shape, according to actual requirements.

Figure 2:
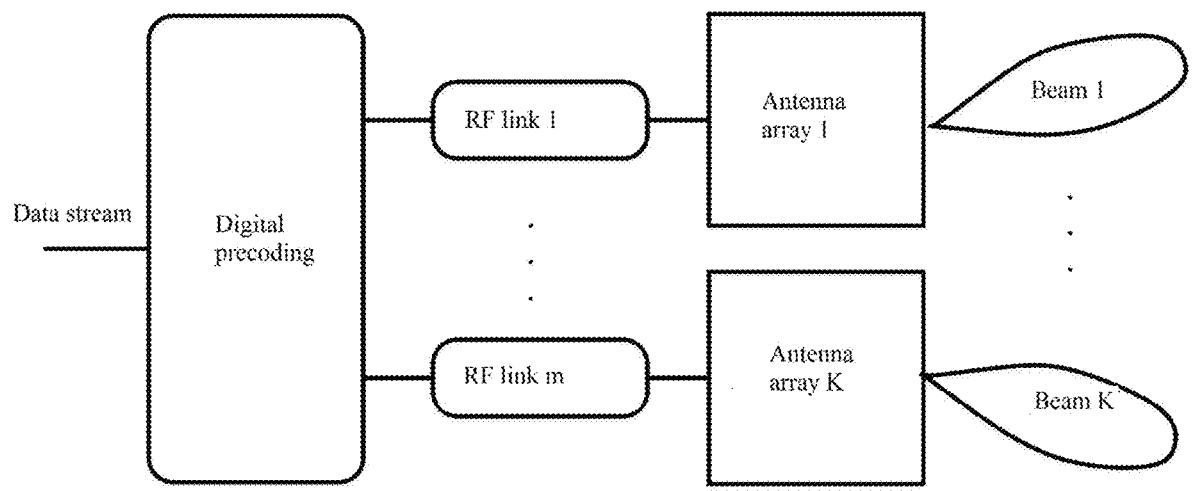
FIG. 2 is a model diagram of transmitting data by the transmitting side.

FIG. 2 shows a schematic diagram of transmitting user data using antenna arrays. As shown in FIG. 2, the baseband signal representing the user data stream is mapped to one or more radio frequency links (m≥1) by digital precoding. The radio frequency links upconvert the baseband signal to obtain a radio frequency signal and transmit the radio frequency signal to one or more antenna arrays (K≥1). The radio frequency links and the antenna arrays can be partially connected or fully connected. The antenna arrays have determined the analog beamforming parameters for forming the beam according to the target channel direction with respect to the receiving side, for example, have calculated the analog beamforming parameters associated with the target channel direction according to a particular algorithm, or have determined the beam that best matches the target channel direction by beam scanning. As an example of the analog beamforming parameters, the phase setting parameters of the phase shifters corresponding to the antenna elements of the antenna array are determined. Thus, based on the determined analog beamforming parameters, the electromagnetic radiation emitted by all of the antenna elements of each antenna array forms a desired beam to transmit the signal. The process of beamforming using the analog beamforming parameters may also be referred to as "analog precoding."

Relative Phase Adjustment Based on Basic Compensation Phase

However, since each of the antenna arrays independently forms a beam, there is a possibility that the beam formed by individual antenna array is wide and the beam gain is too small to meet the communication requirement.

In this regard, the first embodiment of the present disclosure proposes an improved technical solution. Various aspects of the first embodiment of the present disclosure are described below with reference to the accompanying drawings.

Figure 3A:
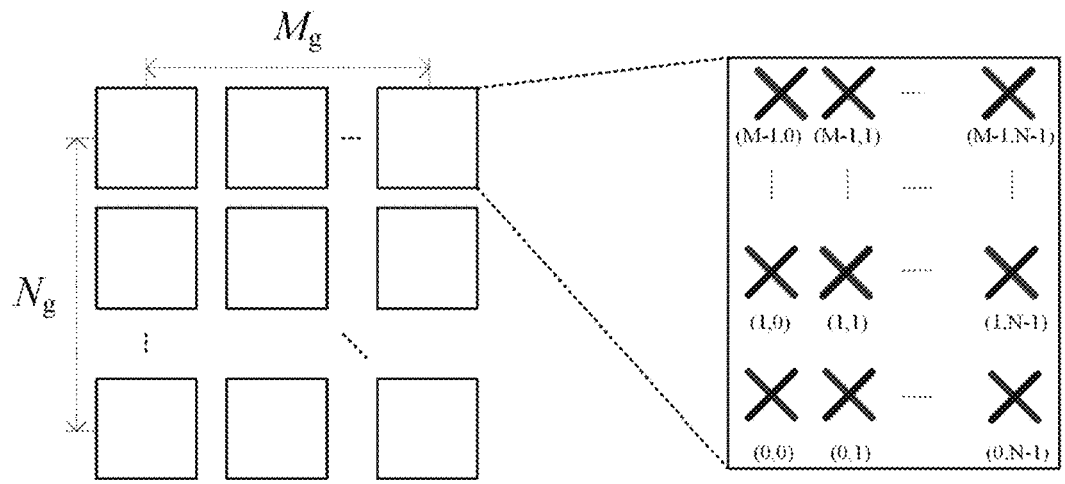
FIG. 3A-3B are schematic diagrams of an antenna array matrix.
Figure 3B:
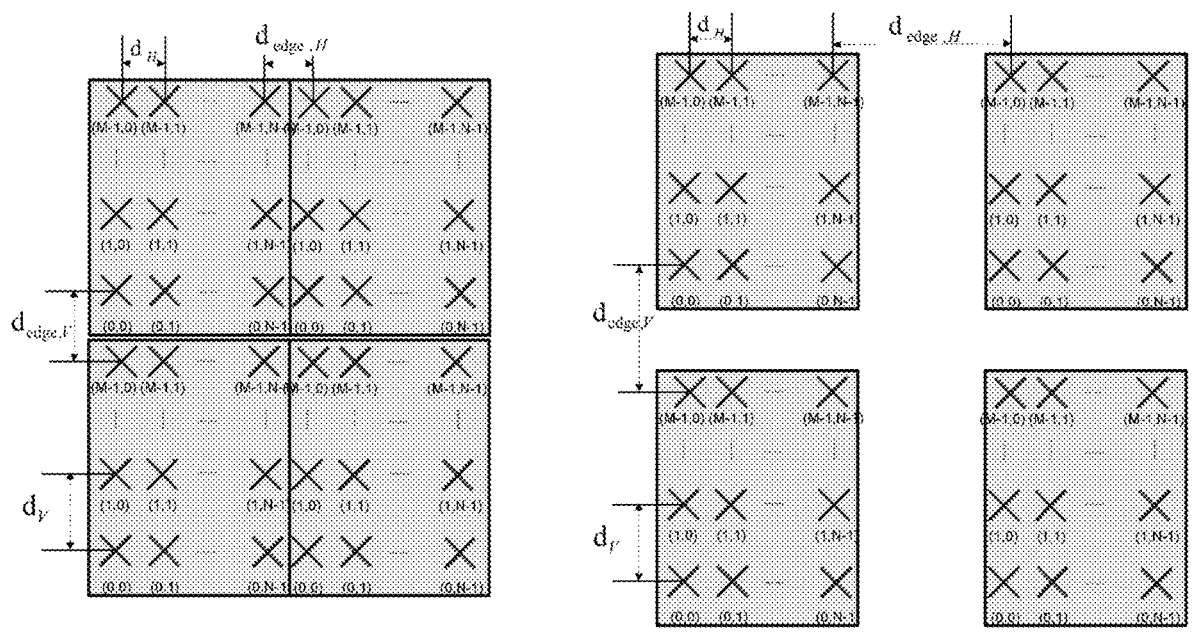

In the first embodiment of the present disclosure, multiple antenna arrays are used. Typically, the plurality of antenna arrays may be arranged in a matrix. FIGS. 3A and 3B are schematic diagrams illustrating an antenna array matrix. As shown in FIG. 3A, the antenna array matrix can be described by a vector ($M_g$, $N_g$, M, N, P), where $M_g$ and $N_g$ represent the number of antenna arrays in the horizontal direction and the vertical direction, respectively, and each of the antenna arrays has M rows×N columns of antenna elements that are uniformly arranged, where P represents the number of polarization directions.

Depending on the relationship between an interval of the antenna arrays and the interval of antenna elements, the arrangement of the antenna array matrix can be divided into a uniform arrangement and a non-uniform arrangement, as shown in FIG. 3B. In a uniform arrangement as shown on the left side of FIG. 3B, the interval of antenna arrays is equal to the interval of antenna elements, that is, $d_{edge,H}=d_H$, $d_{edge,V}=d_V$, where $d_{edge,H}$ and $d_{edge,V}$ represent the intervals of antenna arrays in the horizontal direction and in the vertical direction, respectively, and $d_H$ and $d_H$ represent the intervals of antenna elements in the horizontal direction and in the vertical direction, respectively. In a non-uniform arrangement shown on the right side of FIG. 3B, the interval of antenna arrays is not equal to the interval of antenna elements, for example $d_{edge,H}>d_H$, $d_{edge,V}>d_V$.

The antenna array matrix described above can be configured for a variety of transmission modes. For example, the multiple antenna arrays can be configured for a single-user MIMO (SU-MIMO) diversity mode, where these antenna arrays transmit the same data stream to improve the received SNR. The antenna array matrix may also be configured, for example, for a single-user MIMO high-order spatial multiplexing mode (i.e., these antenna arrays respectively transmit multiple data streams of a single user) or a multi-user MIMO (MU-MIMO) mode (i.e., these antenna arrays respectively transmit a plurality of data streams of a plurality of users), wherein the number of data streams that can be transmitted by the plurality of antenna arrays depends on the channel condition (e.g., a rank indication (RI) of a channel matrix). However, the first embodiment of the present disclosure is primarily directed to a single-user MIMO diversity mode.

In addition, depending on how to select a beam by each antenna array, the antenna array matrix includes an independent beam selection type and a coherent beam selection type. For the independent beam selection type, each of the antenna arrays in the antenna array matrix uses different beams independently, and the analog beamforming parameters for each of antenna arrays are different from each other. Thus, each of the antenna arrays can transmit beams in different directions. For example, the beam direction of one antenna array can be aligned with a direct path, while the beam direction of another antenna array can be aligned with a reflective path. An advantage of this type is that it is able to resist occlusion better. For the coherent beam selection type, all antenna arrays in the antenna array matrix use the same beam, and the analog beamforming parameters for each of the antenna arrays are the same. By aligning all of the antenna arrays with the channel direction with most energy (e.g., the direct path), the received SNR at the receiving side is maximized.

Figure 4:
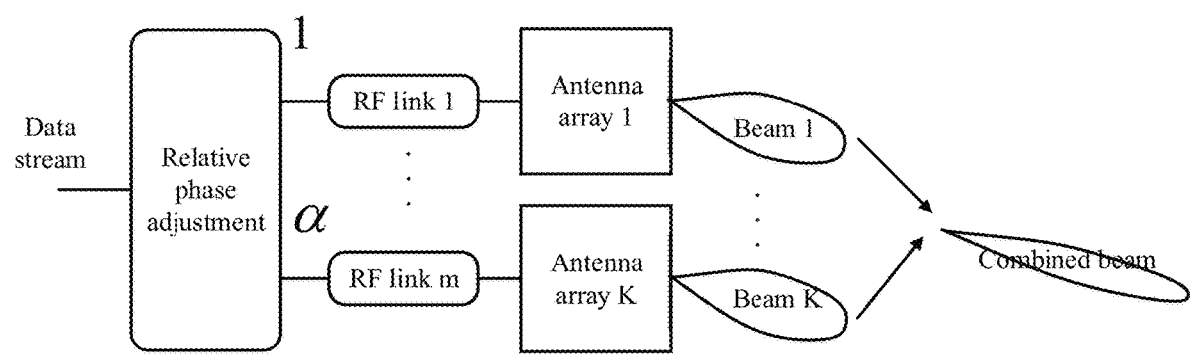
FIG. 4 is a model diagram of transmitting data by the transmitting side according to a first embodiment of the present disclosure.

FIG. 4 is a schematic diagram showing the transmission of user data using a plurality of antenna arrays according to the first embodiment. As shown in FIG. 4, the baseband signal representing the user data stream first is subjected to a relative phase adjustment and is mapped onto the radio frequency links. The radio frequency links upconvert the baseband signal with the adjusted relative phase and transmit the radio frequency signal to each of the antenna arrays. Antenna arrays 1 to K have determined common analog beamforming parameters (phase setting parameters of the phase shifters) according to the target channel direction, that is, Antenna arrays 1 to K belong to the coherent beam selection type. Based on the determined analog beamforming parameters, Antenna array 1 transmits Beam 1, Antenna array 2 transmits Beam 2, and so on. The K beams formed by the antenna arrays have the same direction and are aligned with the target channel direction to maximize the received SNR.

Compared to the technique described with reference to FIG. 2, the first embodiment of the present disclosure further performs the relative phase adjustment on the baseband signal for Antenna arrays 1 to K, so that Beams 1 to K formed by the K antenna arrays can be combined into a single combined beam. Such relative phase adjustment can be performed as the digital precoding or a part of the digital precoding.

The principle of the first embodiment of the present disclosure will be described below with reference to the figures. For convenience of explanation, it is assumed that there are Antenna arrays 1 and 2 (i.e., K=2) and both antenna arrays are ULAs. It will be appreciated that embodiments of the present disclosure do not limit the number of antenna arrays to be two, nor the antenna arrays to be ULAs. The case of more than two antenna arrays and of the antenna arrays being UPAs will be described later.

The antenna array 1 and the antenna array 2 are linearly arranged such that all of the array elements of the two ULAs are linear. For each of the antenna arrays, the beam transmitted by the antenna array can be expressed as $$f = \left[1, \ldots, e^{j\frac{2\pi}{\lambda}d(N-1)\sin\phi}\right] \in C^{1 \times N},$$

Here, $\lambda$ represents a wavelength of the electromagnetic wave, N represents a size of each antenna array (i.e., the number of antenna elements), d represents the interval of antenna elements, and $\phi$ represents a direction of the transmitting beam formed by each of the antenna arrays (hereinafter sometimes referred to as "target channel direction").

Since the large-scale fading coefficients of respective antenna arrays are almost the same, there is no need to adjust the amplitude of the baseband signal to be transmitted by the antenna arrays. Therefore, in the first embodiment, only the phase of the baseband signal is adjusted. It is assumed that the parameter for the relative phase adjustment to be performed on Antenna array 1 and Antenna array 2 is [1, $\alpha$], where $\alpha$ represents the relative phase of the baseband signal to be transmitted by Antenna array 2 with respect to the baseband signal to be transmitted by Antenna array 1.

Therefore, the combined beam $f_b$ resulting from combining the beams of Antenna arrays 1 and 2 can be expressed as $f_b = [f, \alpha f] \in C^{1 \times 2N}$.

By adjusting the relative phase $\alpha$, the beam direction of the combined beam $f_b$ can be controlled.

Here, $\alpha$ is set to $\alpha_b$ as follows:

$$\alpha_b = e^{-j\frac{2\pi}{\lambda}(d(N-1)+d_{edge})\sin\phi} \quad (1)$$

where $d_{edge}$ represents the interval between Antenna array 1 and Antenna array 2.

By performing the relative phase adjustment with α, the combined beam $f_b$ can be expressed as $$f_b = [\underbrace{1, \ldots, e^{j\frac{2\pi}{\lambda}d(N-1)\sin\phi}}_{f}, \underbrace{e^{-j\frac{2\pi}{\lambda}(d(N-1)+d_{edge})\sin\phi}, \ldots, e^{-j\frac{2\pi}{\lambda}(d(2N-2)+d_{edge})\sin\phi}}_{\alpha f}]$$

the beam direction of the combined beam $f_b$ is also $\phi$, that is, the beam direction of the combined beam $f_b$ does not deviate from the direction of the transmitting beam f formed by a single antenna array. At this time, the combined beam $f_b$ also points to the target channel direction. Here, such a relative phase $\alpha_b$ is referred to as a basic compensation phase.

In particular, for Antenna array 1 and Antenna array 2 which are uniformly arranged, that is, $d_{edge} = d$, there is $$\alpha_b = e^{-j\frac{2\pi}{\lambda}dN\sin\phi} \quad (2)$$

In this case, by performing the relative phase adjustment with $\alpha_b$, the combined beam $f_b$ can be expressed as $$f_b = [\underbrace{1, \ldots, e^{j\frac{2\pi}{\lambda}d(N-1)\sin\phi}}_{f}, \underbrace{e^{-j\frac{2\pi}{\lambda}dN\sin\phi}, \ldots, e^{-j\frac{2\pi}{\lambda}d(2N-1)\sin\phi}}_{\alpha f}],$$

and the beam direction of the combined beam $f_b$ is the same as the direction of the transmitting beams formed by the individual Antenna array 1 or 2.

It can be seen from Formulas (1) and (2) that the value of the basic compensation phase $\alpha_b$ is related to the structure and arrangement of the antenna arrays, such as the interval d of antenna elements and the interval $d_{edge}$ of antenna arrays. In general, these parameters are fixed after the antenna arrays are installed on the base station or user equipment. Therefore, the transmitting side only needs to determine the desired beam direction and the wavelength of electromagnetic wave so as to calculate the basic compensation phase $\alpha_b$ compensated for the antenna arrays.

With such relative phase adjustment, there is a fixed phase difference $\alpha = \alpha_b$ between corresponding antenna elements of the two antenna arrays, so that Antenna array 1 and Antenna array 2 transmit signals cooperatively, and are equivalent to a combined antenna array.

Compared with the beam generated by a single antenna array, the combined beam formed by Antenna array 1 and Antenna array 2 has a narrower beamwidth and a larger beam gain due to an increase in the number of antenna elements forming the beam. This is beneficial to improve the SNR at the receiving side and to improve the reliability of the transmission.

The case where the antenna array is ULA is discussed above, but the antenna array may also be a UPA. Assuming that Antenna array 1 and Antenna array 2 are arranged in the horizontal direction, $\alpha_b$ can be set to:

$$\alpha_b = e^{-j\frac{2\pi}{\lambda}(d_H(N-1)+d_{edge,H}))\sin\phi_h \sin\phi_v} \quad (3)$$

where $d_H$ represents the interval of antenna elements in the horizontal direction, $d_{edge,\ H}$ represents the interval of antenna arrays in the horizontal direction, $\phi_h$ represents the horizontal beam direction, and $\phi_v$ represents the vertical beam direction.

In particular, if the interval between Antenna array 1 and Antenna array 2 is equal to the interval of antenna elements in the horizontal direction, that is, $d_{edge,\ H} = d_H$, then $\alpha_b$ can be set to:

$$\alpha_b = e^{-j\frac{2\pi}{\lambda}d_H N\sin\phi_h \sin\phi_v} \quad (4)$$

Although an example of generating a combined beam using two antenna arrays has been described above, more antenna arrays can be used as needed.

For example, when K>2 antenna arrays are used, the relative phase adjustment parameters for the K antenna arrays may be [1, α, ..., $\alpha^{K-1}$], where $\alpha^k$ is a basic compensation phase for the k-th antenna array (1<k<K). By performing the relative phase adjustment on the baseband signal to be transmitted by the corresponding antenna array using this parameter (e.g., simultaneously with the digital precoding or as the digital precoding), the beams transmitted by individual antenna arrays can be combined into a single combined beam, and the direction of the combined beam is the same as the direction of the beams formed by individual antenna arrays.

As the number of antenna arrays used increases, the beamwidth of the combined beam that can be generated becomes narrower, that is, the directivity of the beam is stronger, and the beam gain is larger, which is advantageous for improving the received SNR.

Electronic Device and Communication Method Thereof According to the First Embodiment An example of an electronic device at the transmitting side and a communication method thereof according to the first embodiment of the present disclosure will be described below with reference to FIGS. 5A-5B.

Figure 5A:
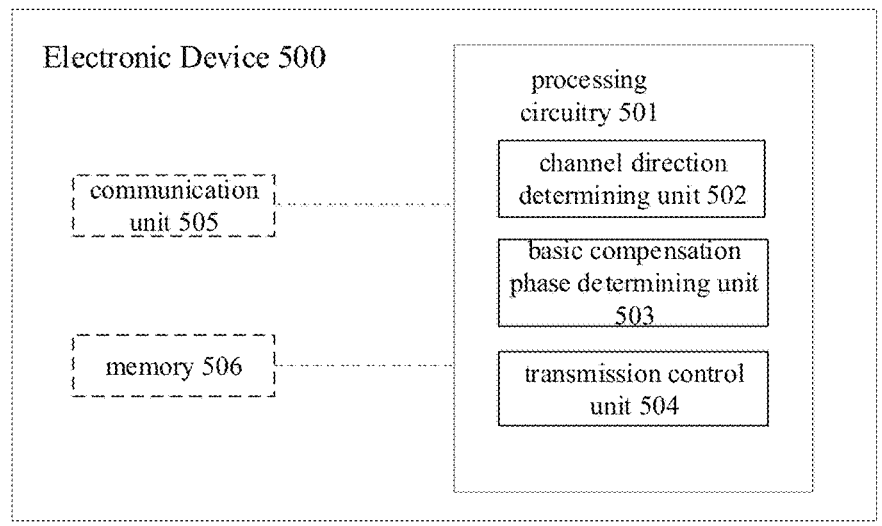
FIG. 5A is a block diagram of an electronic device at the transmitting side according to the first embodiment of the present disclosure.

FIG. 5A shows a block diagram of configuration of an electronic device 500 at the transmitting side according to the first embodiment. In the downlink transmission, the electronic device 500 may be a base station such as an eNB, a gNB or the like, or a component thereof, and in the uplink transmission, the electronic device 500 may be a user equipment such as a mobile phone, an in-vehicle communication device, a drone or the like, or a component thereof.

Figure 5B:
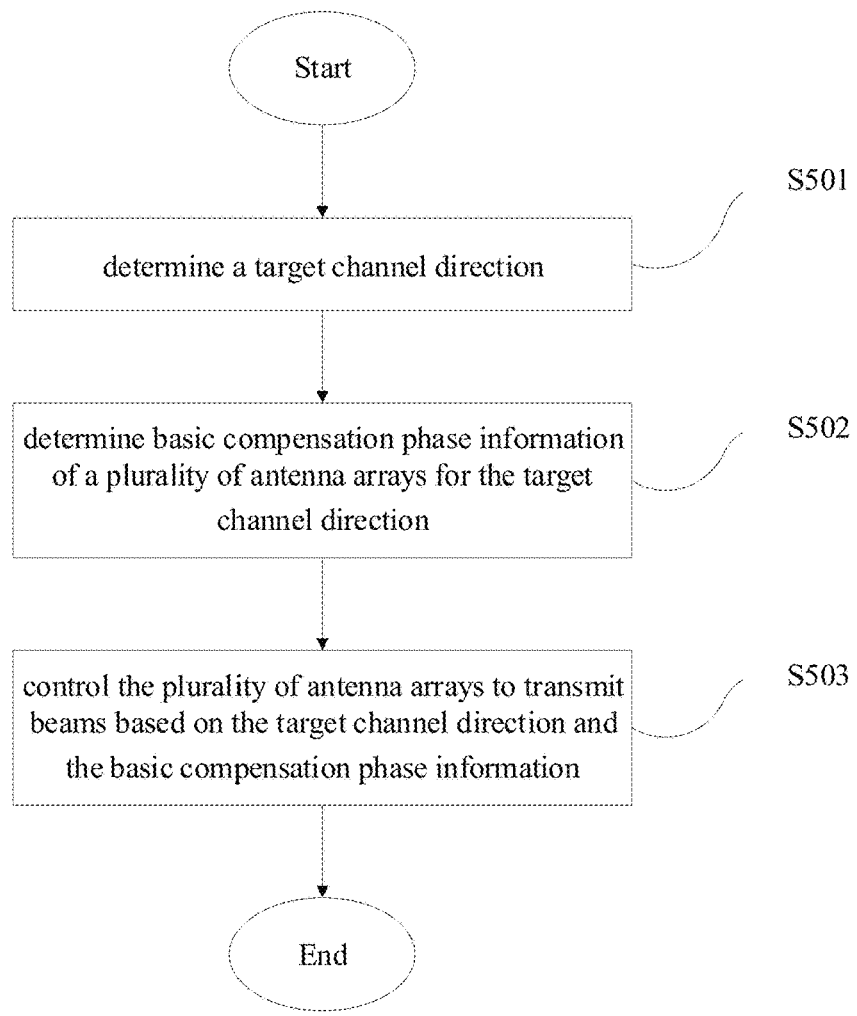
FIG. 5B is a flowchart of a communication method according to the first embodiment of the present disclosure.

As shown in FIG. 5A, the electronic device 500 includes at least a processing circuitry 501 that can be configured to perform the communication method as shown in FIG. 5B. The processing circuitry 501 may refer to various implementations of a digital circuitry, an analog circuitry, or a circuitry for hybrid signal (a combination of analog signal and digital signal) that perform functions in a computing system. The processing circuitry may include, for example, a circuitry such as an integrated circuit (IC), an application specific integrated circuit (ASIC), a portion or circuit of an individual processor core, an entire processor core, an individual processor, a programmable hardware device such as a field programmable array (FPGA), and/or a system including multiple processors.

The processing circuit 501 may include a channel direction determining unit 502, a basic compensation phase information determining unit 503, and a transmission control unit 504.

The channel direction determining unit 502 is configured to determine a target channel direction between the transmitting side and the receiving side (step S501 in FIG. 5B). The channel direction determining unit 502 can determine the target channel direction by various methods.

As an example, the channel direction determining unit 502 can determine an optimum transmitting beam by beam training using a pre-stored beamforming codebook, and set the direction of the optimum transmitting beam as the target channel direction. The procedure of the beam training will be briefly described below with reference to FIG. 1. In the downlink beam scanning process, the base station 1000 transmits $n_{r\_DL}$ downlink reference signals to the UE 1004 by each of the $n_{t\_DL}$ downlink transmitting beams 1002 in the transmitting beam set, and the UE 1004 receives $n_{r\_DL}$ downlink reference signals by each of $n_{r\_DL}$ downlink receiving beams in the receiving beam set. In this manner, the $n_{t\_DL}$ downlink transmitting beams of the base station 1000 sequentially transmit $n_{t\_DL} \times n_{r\_DL}$ downlink reference signals in total to the UE 1004, and each downlink receiving beam 1006 of the UE 1004 receives $n_{t\_DL}$ downlink reference signals, that is, $n_{r\_DL}$ downlink receiving beams of the UE 1004 receive $n_{t\_DL} \times n_{r\_DL}$ downlink reference signals in total from base station 1000. The UE 1004 measures the $n_{t\_DL} \times n_{r\_DL}$ downlink reference signals, for example, measures the received signal power (e.g., RSRP) of the downlink reference signals. Thus, the UE 1004 determines the strongest downlink transmitting beam of the base station 1000 and the strongest downlink receiving beam of the UE 1004. The UE 1004 feeds back information on the quality of the strongest beam and its index in the beam set to the base station 1000. The uplink beam scanning process has a similar procedure and its description is not given repeatedly here. The above procedure of determining the strongest transmitting and receiving beams of the base station and the UE by beam scanning is called the beam training process.

Generally, the strongest transmitting beam and the strongest receiving beam thus determined are beams closest to the channel direction, so their direction can be considered as the target channel direction.

As another example, the channel direction determining unit 502 may determine the target channel direction by using the channel direction estimation method to be described in the fourth embodiment of the present disclosure.

The basic compensation phase information determining unit 503 is configured to determine basic compensation phase information for a plurality of antenna arrays with respect to the determined target channel direction as described above (step S502 in FIG. 5B). In order to allow the beams transmitted by the plurality of antenna arrays to be combined into a single combined beam aligned with the target channel direction, the basic compensation phase information determining unit 503 determines the basic compensation phase information for relative phase adjustment of the baseband signals of the respective antenna arrays. As an example, the basic compensation phase information determining unit 503 may determine the basic compensation phase information according to the above Formula (1) or (2) based on the target channel direction, the structure and arrangement of the antenna arrays, and the like. The determined basic compensation phase information indicates a phase difference compensated for each of the antenna arrays.

The transmission control unit 504 is configured to control the plurality of antenna arrays to transmit beams based on the determined target channel direction and the basic compensation phase information (step S503 in FIG. 5B). In an exemplary implementation, the transmission control unit 504 can control to perform the relative phase adjustment on signals to be transmitted by the plurality of antenna arrays based on the basic compensation phase information, and control the antenna arrays to transmit the signals after the relative phase adjustment based on common analog beamforming parameters (e.g., the phase setting parameter matrix for the phase shifters) associated with the target channel direction. The beams transmitted by the antenna arrays are combined into a single beam, and the combined beam is aligned with the target channel direction. The relative phase adjustment of the baseband signals based on the basic compensation phase information can be implemented as the digital precoding, but is not limited thereto. For example, the process of relative phase adjustment can be implemented as a part of the digital precoding or an additional process.

The electronic device 500 may also include, for example, a communication unit 505 and a memory 506.

The communication unit 505 can be configured to communicate with the receiving side under the control of the processing circuitry 501. In one example, the communication unit 505 can be implemented as a transmitter or transceiver, including communication components such as the antenna arrays and/or radio frequency links described above. The communication unit 505 is depicted with dashed lines since it can also be located externally to the electronic device 500.

The memory 506 can store various information generated by the processing circuitry 501 (e.g., information about beam training, information on the target channel direction, and the basic compensation phase information, etc.), programs and data for operation of the electronic device 500, data to be transmitted by the communication unit 505, and the like. The memory 506 is depicted in dashed lines since it may also be located within the processing circuitry 501 or externally to the electronic device 500. The memory 506 can be a volatile memory and/or a non-volatile memory. For example, the memory 506 can include, but is not limited to, a random access memory (RAM), a dynamic random access memory (DRAM), a static random access memory (SRAM), a read only memory (ROM) or a flash memory.

It will be appreciated that the various units as described above are only logical blocks that are divided in terms of specific functions achieved by them, and are not intended to limit its specific implementation. In an actual implementation, each of the above units may be implemented as separate physical entities, or may also be implemented by a single entity (e.g., a processor (CPU or DSP, etc.), an integrated circuit, etc.).

The Second Embodiment

The second embodiment of the present disclosure will be described below with reference to the figures. Different portions of the second embodiment from the first embodiment will be mainly described below, while the same concepts and elements of the second embodiment as those of the first embodiment will not be described in detail.

The principle of the second embodiment of the present disclosure is also described with reference to FIG. 4. As shown in FIG. 4, the baseband signal representing the user data stream is adjusted in the relative phase with respect to the antenna arrays and is mapped onto the radio frequency links. The radio frequency links upconvert the baseband signal after the relative phase adjustment and transports the radio frequency signal to respective antenna arrays. Antenna arrays 1 to K have determined common analog beamforming parameters (e.g., phase setting parameters for the phase shifters) according to the target channel direction, that is, Antenna arrays 1 to K belong to the coherent beam selection type. Based on the determined analog beamforming parameters, Antenna array 1 transmits Beam 1, Antenna array 2 transmits Beam 2, and so on. The K beams formed by the antenna arrays are combined into a single combined beam.

In the first embodiment, the direction of the combined beam is the same as the direction of the beams formed by individual antenna arrays. However, in the second embodiment of the present disclosure, the beam direction of the resulting combined beam is changed by appropriately setting the phase difference of the baseband signals to be transmitted by the respective antenna arrays.

For convenience of explanation, it is also assumed that there are two ULA antenna arrays 1 and 2 (i.e., K=2). It will be appreciated that the embodiments of the present disclosure are not limited to the number of antenna arrays being 2 and the antennas array being ULA.

The parameter for relative phase adjustment of Antenna array 1 and Antenna array 2 is [1, α], that is, the phase difference between corresponding antenna elements of Antenna array 2 and Antenna array 1 is α.

The parameter for relative phase adjustment (relative phase difference) a of the second embodiment may be composed of two parts, for example, the basic compensation phase $\alpha_b$ for combining Beam 1 transmitted by Antenna array 1 and Beam 2 transmitted by Antenna array 2 into a single beam and an additional phase β for adjusting the beam direction of the combined beam, as shown in the following equation:

$$\alpha = \alpha_b \beta \qquad (5)$$

Here, $\alpha_b$ represents the basic compensation phase, which can be generated as in the first embodiment. β represents the additional phase, |β|=1.

Additional Phase β

Obviously, with the additional phase β=1, α=$\alpha_b$, the direction of the combined beam is the same as the beam direction transmitted by individual antenna arrays.

Figure 6:
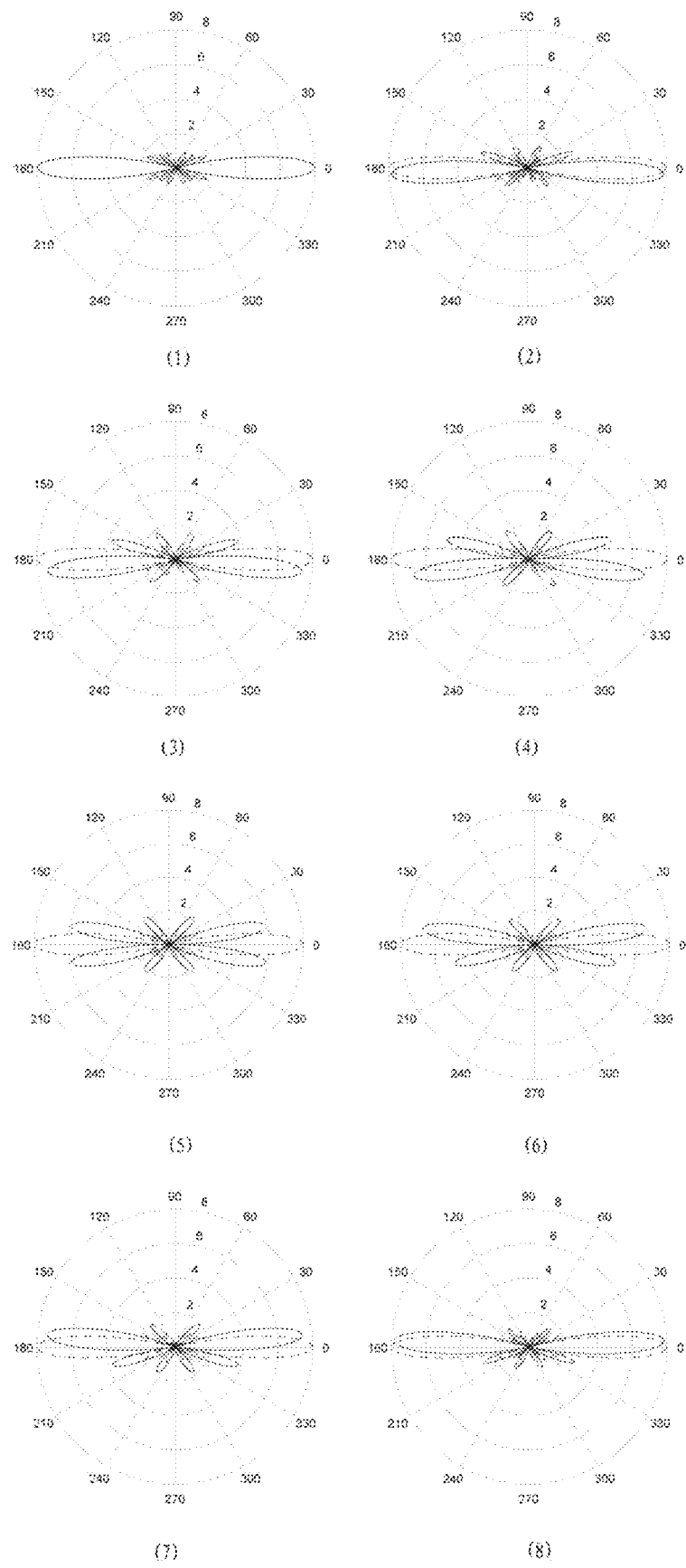
FIG. 6 is a diagram of beam patterns when an additional phase takes different values.

FIG. 6 is diagram showing the combined beam patterns when the additional phase β takes different values. The eight patterns in FIG. 6 correspond to $$\beta = e^{j\frac{\pi t}{4}}, t = 0, 1, \ldots, 7,$$

respectively. As a comparative reference, the reference beam shown in Pattern (1) (i.e., the combined beam at t=0, β=$e^{j0}$) is also plotted in the form of a dashed line in Patterns (2) to (8). Note that the direction angle shown in FIG. 6 is not a direction angle of the beam in real space, but merely a direction angle with respect to the reference beam (main lobe).

As shown in FIG. 6, from Patterns (2) to (4), as t increases from 1 to 3 (β changes from $$e^{j\frac{\pi}{4}} \text{ to } e^{j\frac{3\pi}{4}}),$$

the main lobe of the combined beam gradually shifts counterclockwise, that is, the main lobe with the strongest intensity produces an increasing angle of deviation from the reference beam. At the same time, the intensity of the main lobe is reduced and the intensity of the side lobe is increased.

In particular, when t=4 (β=$e^{j\pi}$), as shown in Pattern (5), the angle of deviation of the main lobe of the combined beam from the reference beam is maximized in the counterclockwise direction, while the intensity of the side lobe becomes almost equal to the intensity of the main lobe.

Then, from Pattern (8) to Pattern (6), as t decreases from 7 to 5 (β changes from $$e^{j\frac{7\pi}{4}} \text{ to } e^{j\frac{5\pi}{4}},$$

that is, from $$e^{j(-\frac{1\pi}{4})} \text{ to } e^{j(-\frac{3\pi}{4})}),$$

the main lobe of the combined beam gradually shifts clockwise, that is, the main lobe produces an increasing angle of deviation from the reference beam in the opposite direction. At the same time, the intensity of the main lobe is decreased and the intensity of the side lobe is increased. When t decreases to 4, the angle of deviation of the main lobe of the combined beam from the reference beam is maximized while the intensity of the side lobe becomes almost equal to the intensity of the main lobe.

The inventors of the present disclosure have also found that the directions of the combined beams when β=$e^{j\delta}$ and β=$e^{j(2\pi-\delta)}$=$e^{j(-\delta)}$ are symmetric about the reference beam. For example, as shown in FIG. 6, the combined beam when $$\beta = e^{j\frac{\pi}{4}}$$

(the 2-nd pattern) and the combined beam when $$\beta = e^{j\frac{7\pi}{4}}$$

(the 8-th pattern) are symmetric about the reference beam, the combined beam when $$\beta = e^{j\frac{2\pi}{4}}$$

(the 3-nd pattern) and the combined beam when $$\beta = e^{j\frac{6\pi}{4}}$$

(the 7-th pattern) are symmetric about the reference beam, and the combined beam when $$\beta = e^{j\frac{3\pi}{4}}$$

(the 4-nd pattern) and the combined beam when $$\beta = e^{j\frac{5\pi}{4}}$$

(the 6-th pattern) are symmetric about the reference beam. Such symmetry is especially useful for channel direction estimation to be described later. Note that depending on the value of the reference beam direction ϕ, the two combined beams are not necessarily strictly symmetrical about the direction of the reference beam, but might have a certain angular difference, but such approximately symmetric case is still considered as being symmetric.

FIG. 6 illustrates a variation of the combined beam direction discretely in a step of π/4. It will be appreciated that the direction and intensity of the combined beam may vary continuously with the additional phase. That is, the application of the additional phase β can result in the combined beam having a direction within a neighborhood of the reference beam direction. As needed, the transmitting side may calculate or store in advance a correspondence between the additional phase β and the directional deviation of the combined beam from the reference beam.

As shown in FIG. 6, in the case where the basic compensation phase has been determined, by appropriately setting the additional phase, the direction of the combined beam formed by the antenna array matrix can be changed accordingly.

As an example, when a small variation occurs in the direction of channel between the transmitting side and the receiving side, the direction of the combined beam can be changed by setting the parameter for relative phase adjustment (i.e., adjusting the additional phase) to fit the variation in the channel direction without beam switching.

As can be seen from FIG. 5, the application of the additional phase can cause the combined beam direction to vary only within a specific range (a neighborhood of the direction of the reference beam), and thus if the channel direction varies beyond this specific range, it is impossible to align the combined beam with the channel direction by changing the value of the additional phase. At this time, it is feasible to switch to a beam closer to the channel direction by performing beam switching, that is, to determine new analog beamforming parameters. If the beamforming codebook stored in advance at the transmitting side is limited in size, and the re-determined beam is still at an angle to the channel direction, the combined beam can be aligned with the channel direction by adjusting the additional phase β.

In order to conveniently set the additional phase, as an example, the mapping relationship between the additional phase and the variation of the combined beam direction may be predetermined and stored at the transmitting side.

By setting the phase difference between the antenna arrays based on both of the basic compensation phase and the additional phase, and determining the relative phase adjustment on the baseband signal for individual antenna arrays, the direction of the combined beam formed by combining the transmitting beams of the antenna arrays can be controlled as needed. In the case where different additional phases are used, the transmitting side can obtain two combined beams with different directions by different relative phase adjustments. This facilitates the transmitting side to make full use of multiple channel transmission paths to provide reliability of transmission. In addition, as will be described in detail in the following embodiments, the channel direction between the transmitting side and the receiving side can be determined based on a comparison of beam gains of two combined beams having different directions at the receiving side.

Electronic Device and Communication Method Thereof of the Second Embodiment

An example of an electronic device at the transmitting side and a communication method thereof according to the second embodiment of the present disclosure will be described below with reference to FIGS. 7A-7B.

Figure 7A:
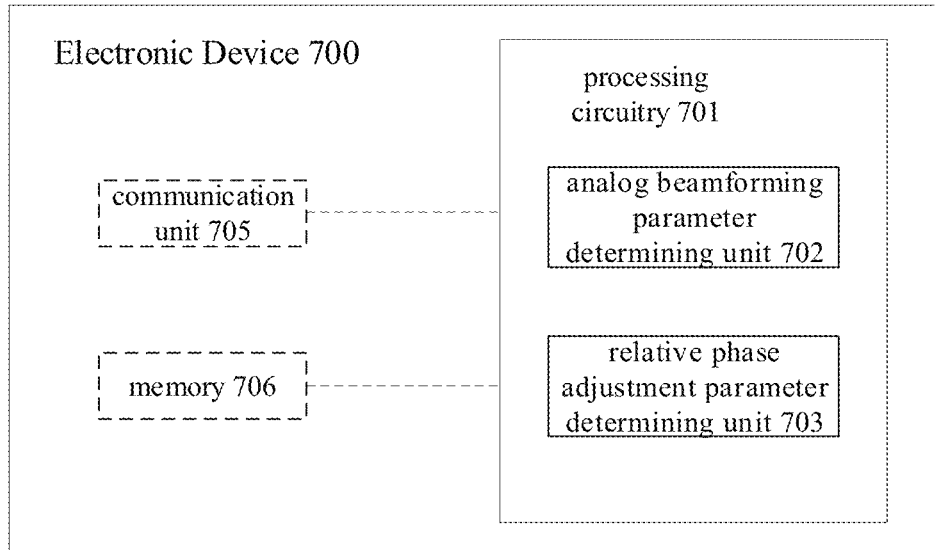
FIG. 7A is a block diagram of an electronic device at the transmitting side according to a second embodiment of the present disclosure.

FIG. 7A shows a block diagram of configuration of an electronic device 700 at the transmitting side according to the second embodiment. In the downlink transmission, the electronic device 700 may be a base station such as an eNB, a gNB or the like, or a component thereof, and in the uplink transmission, the electronic device 700 may be a user equipment such as a mobile phone, an in-vehicle communication device, a drone or the like, or a component thereof.

Figure 7B:
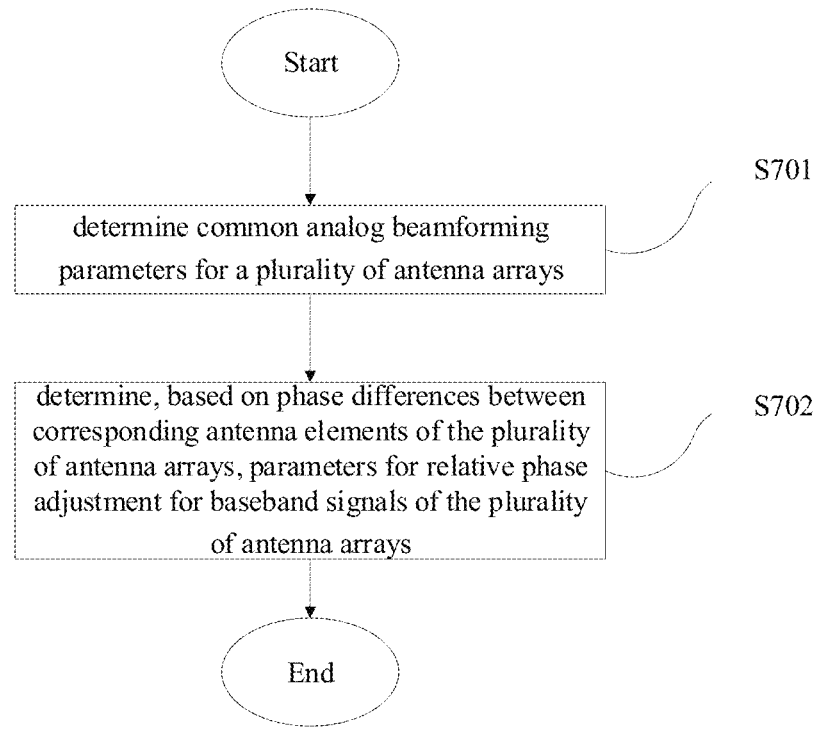
FIG. 7B is a flowchart of a communication method according to the second embodiment of the present disclosure.

As shown in FIG. 7A, the electronic device 700 includes at least a processing circuitry 701 that can be configured to perform the communication method as shown in FIG. 7B. Like the processing circuit 501, the processing circuit 701 can be implemented in a variety of ways.

The processing circuitry 701 can include an analog beamforming parameter determining unit 702 and a relative phase adjusting unit 703.

The analog beamforming parameter determining unit 702 is configured to determine common analog beamforming parameters for a plurality of antenna arrays (step S701 in FIG. 7B) such that each of the antenna arrays is able to form a beam that points to a particular channel direction (AOD) by using the determined common analog beamforming parameters. In the second embodiment of the present disclosure, the plurality of antenna arrays are of the coherent beam selection type so that signals can be transmitted using the same beam. As an example, the analog beamforming parameter determining unit 702 may select a transmitting beam and/or a receiving beam having a maximum gain by beam training as described above, and select analog beamforming parameters of a beam having a direction that best matches the current channel direction from the beamform codebook. As another example, the analog beamforming parameter determination unit 702 can estimate the current channel direction by channel direction estimation (e.g., the channel direction estimation method to be described in the following embodiments) to dynamically determine analog beamforming parameters of the beam aligned with the estimated channel direction. The analog beamforming parameter determining unit 702 can also determine the analog beamforming parameters that best match the particular channel direction in other various ways.

The relative phase adjusting unit 703 is configured to determine a relative phase adjustment for baseband signals to be transmitted by the plurality of antenna arrays based on phase differences between corresponding antenna elements of the plurality of antenna arrays, so as to control the direction of a combined beam that can be combined by transmitting beams formed by these antenna arrays based on the analog beamforming parameters determined by the analog beamforming parameter determining unit 702 (step S7002 in FIG. 7B). The relative phase adjusting unit 703 performs the relative phase adjustment for the baseband signals using parameters for the relative phase adjustment. Such relative phase adjustment can be performed as the digital precoding process or a part of the digital precoding process, or can also be performed as an additional process. The relative phase adjustment adds a controlled phase difference to the baseband signal corresponding to each antenna array, so that the beams transmitted by the plurality of antenna arrays can be combined into a single beam, and the single beam points to a desired direction so as to fit a variation in the channel direction without beam switching.

The relative phase adjustment parameter a used by the relative phase adjusting unit 703 can be generated based on a basic compensation phase $\alpha_b$ and an additional phase $\beta$. The basic compensation phase $\alpha_b$ can be calculated using Formulas (1) to (4) of the first embodiment. The additional phase $\beta$ can be used to adjust a change in direction of the combined beam. As an example, the additional phase $\beta$ may be generated based on a pre-stored mapping table in which a correspondence of the additional phase $\beta$ to the direction of the combined beam is described.

In the case where the channel direction is changed, the transmitting side can measure such a change, for example, by the channel direction estimation method to be described below. Then, based on the correspondence between the directional deviation of the combined beam from the reference beam and the additional phase, the relative phase adjusting unit 703 can use different relative phase adjustment parameters (i.e., different additional phases) to adjust the phase differences of the signals so as to fit the change in the direction of the combined beam.

If the measured angle by which the channel direction changes exceeds the maximum angle that the relative phase adjustment of the relative phase adjusting unit 703 can cause the combined beam to deviate, the analog beamforming parameter determining unit 702 may perform the determining step of the analog beamforming parameter (S7001 in FIG. 7B) again, such that the transmitting beam is re-determined to be as close to the changed channel direction as possible.

The electronic device 700 may also include, for example, a communication unit 705 and a memory 706.

The communication unit 705 can be configured to communicate with the receiving side under the control of the processing circuitry 701. In one example, the communication unit 705 can be implemented as a transmitter or transceiver, including communication components such as the antenna arrays and/or radio frequency links described above. The communication unit 705 is depicted in dashed lines as it may also be located externally to the electronic device 700.

The memory 706 can store various information generated by the processing circuitry 701 (for example, the analog beamforming parameters determined by the analog beamforming parameter determining unit 702, the parameter for relative phase adjustment used by the relative phase adjusting unit 703, such as the basic compensation phase, the additional phase, etc.), programs and data for operation of the electronic device 700, data to be transmitted by the communication unit 705, and the like. The memory 706 is depicted in dashed lines as it may also be located within processing circuitry 701 or externally to electronic device 700. The memory 706 can be volatile memory and/or non-volatile memory. For example, the memory 706 can include, but is not limited to, a random access memory (RAM), a dynamic random access memory (DRAM), a static random access memory (SRAM), a read only memory (ROM) or a flash memory.

The Third Embodiment

The third embodiment of the present disclosure will be described in detail below with reference to the accompanying figures.

The third embodiment of the present disclosure relates to code division multiplexing of signals (e.g., reference signals) to be transmitted by individual ports with an orthogonal code prior to transmitting the signals through antenna arrays, so as to transmit the signals on the same communication resource.

The term "communication resources" as used herein has different meanings in different communication systems. For example, "communication resources" may be time-domain and/or frequency-domain resources. Taking LTE as an example, each LTE frame (10 ms) can be divided into 10 equal-sized subframes, and each subframe (1 ms) can include two consecutive slots, each of which includes a resource block (RB), the resource block may be represented by a resource grid, and the resource grid may be divided into multiple resource elements (RE), for example, each resource block includes 12 consecutive subcarriers in the frequency domain, and for a normal cyclic prefix in each OFDM symbol, each resource block contains 7 consecutive OFDM symbols in the time domain, that is, each resource block contains 84 resource elements. In such an LTE frame, the symbols of the user data or reference signal is assigned with corresponding resource elements. However, in addition to time-frequency resources, "communication resources" may also refer to space-domain resources or code-domain resources.

In one example, the signals to be subjected to code division multiplexing process are reference signals. For convenience of explanation, the code division multiplexing process according to the third embodiment will be described below by taking the reference signals as an example, but it will be appreciated that the signals subjected to the code division multiplexing process is not limited to the reference signals but may be other signals.

The reference signal is a known signal that is provided by the transmitting side to the receiving side for channel estimation or channel sounding, and can be used for various measurements and for determining the actual channel condition experienced by radio signals from the base station to the UE. The channel estimation based on reference signals is more accurate than a theoretical method such as geographic location estimation. The reference signal is of great significance for mobility management, resource allocation, MIMO operation, and data demodulation.

Depending on the transmission direction, the reference signals can be typically divided into uplink reference signals and downlink reference signals. The reference signals and the user data stream are multiplexed into an uplink frame or a downlink frame in the time domain and/or the frequency domain, and the reference signals occupy predefined communication resources in the frame. The downlink reference signals are predefined signals that are transmitted from the base station to the UE and occupy particular downlink communication resources (for example, particular resource elements in a time-frequency resource block), and are used for downlink channel estimation, downlink channel sounding, cell search or the like. The downlink reference signals include, for example, but are not limited to, cell reference signal (CRS), data demodulation reference signal (DMRS), channel state information reference signal (CSI-RS), and the like. The uplink reference signals are predefined signals that are transmitted from the UE to the base station and occupy particular uplink communication resources (e.g., particular resource elements in a time-frequency resource block), and are used for uplink channel estimation, uplink channel quality measurement or the like. The downlink reference signals include, for example, but are not limited to, DMRS, Sounding Reference Signal (SRS) and the like. In one example, the CSI-RS is used to feed back the downlink channel state.

In general, there may be multiple ports depending on the reference signal sequences as used. In other words, the ports are in one-to-one correspondence to the reference signals. Reference signals of different ports can be transmitted using the same communication resource. When reference signals (for example, CSI-RS) of multiple ports are transmitted with the same communication resource (for example, the time-frequency resource), the reference signals on individual ports are transmitted by orthogonal code division multiplexing, for purpose of distinguishing the reference signals of different ports at the receiving side.

Orthogonal Code Matrix $C_M$

Assuming that there are M ports, let $s_m=[s_{m,0}, \ldots, s_{m,M-1}]$, $0 \le m \le M-1$ be the orthogonal code of the reference signal for the m-th port (it can also represent the reference signal for the m-th port), then the orthogonal codes used by the M ports form an orthogonal code matrix $C_M$ as follows:

$$C_M = [s_0^T, s_1^T, \ldots, s_{M-1}^T]^T = \begin{bmatrix} s_{0,0} & \cdots & s_{0,M-1} \\ \vdots & \ddots & \vdots \\ s_{M-1,0} & \cdots & s_{M-1,M-1} \end{bmatrix}$$

where T represents a transposition of a matrix.

Wherein, the m-th row of the orthogonal code matrix $C_M$ represents an orthogonal code for the reference signal to be transmitted over the m-th port, and can be regarded as a set of symbols of the reference signal. Column j represents an orthogonal code for the reference signal transmitted on the j-th communication resource (e.g., a time-frequency resource element). The orthogonal code matrix $C_M$ satisfies the orthogonality, that is, $C_M C_M^H = K I_M$, where $I_M$ is a unit matrix of M×M size, and H represents a conjugate transposition of a matrix.

The reference signals after the code division multiplexing using this orthogonal code matrix $C_M$ can then be transmitted by the antenna arrays using the same communication resource (e.g., time-frequency resource elements). Generally, the number K of antenna arrays is equal to or smaller than the number M of ports. In the case of M=K, the ports may be in one-to-one correspondency to the antenna arrays, that is, the reference signal for one port may be transmitted by the corresponding one of the antenna arrays. At this time, the element of the i-th row and the j-th column of the orthogonal code matrix $C_M$ represents the reference signal symbol transmitted by one antenna array corresponding to the port i over the j-th communication resource. In the case of M<K, one port may correspond to more than one antenna array, for example, each port may correspond to K/M (K may be a multiple of M) antenna arrays, respectively. For example, for the case of M=2, K=4, the reference signal for Port 0 is jointly transmitted by Antenna arrays 0 and 1, and the reference signal for Port 1 is jointly transmitted by Antenna arrays 2 and 3. At this time, the element of the j-th column and the i-th row of the orthogonal code matrix $C_M$ represents the reference signal symbol transmitted by the (K/M) antenna arrays associated with the i-th port over the j-th communication resource. Of course, the correspondence between the ports and the antenna arrays may not be limited to the case as shown above, and the transmitting side may assign the antenna array(s) used for transmitting signals of the respective port according to actual needs.

In the third embodiment of the present disclosure, in addition to code division multiplexing the reference signals, the orthogonal code matrix $C_M$ is also designed to combine the beams transmitted by multiple antenna arrays on each communication resource into a single beam and adjust the direction angle of the combined beam. A method of determining such orthogonal code matrix of the third embodiment will be described below.

According to the third embodiment, the orthogonal code matrix $C_M$ can be generated based on the basic compensation phase information and the additional phase information, wherein the basic compensation phase information indicates the phase difference compensated for each of the antenna arrays such that the transmitting beams of a plurality of antenna arrays can be combined into a single combined beam, and the additional phase information indicates the phase information used to adjust the direction of the combined beam.

For M ports, the orthogonal code matrix $C_M$ can be obtained by:

$$C_M = C_M^b \odot C_M^r \tag{6}$$

Wherein, $C_M$, $C_M^b$, and $C_M^r$ are M×M matrices, where $C_M^b$ is a basic compensation phase matrix including basic compensation phase information, and $C_M^r$ is an additional phase matrix including additional phase information. $\odot$ indicates that the corresponding elements of the matrix are multiplied.

Basic Compensation Phase Matrix $C_M^b$

In Formula (6), the basic compensation phase matrix $C_M^b$ contains information on the basic compensation phase compensated for the reference signal for each of the K ports. Similarly to the first and second embodiments, in the third embodiment, all antenna arrays use the same transmitting beam, that is, all antenna arrays decide to use the same analog beamforming parameters to form the same target transmitting beam. Since the arrangement and structure of the K antenna arrays is fixed and the adopted transmitting beam is the same, the basic compensation phase matrix $C_M^b$ can be expressed as:

$$C_M^b = \begin{bmatrix} 1 & 1 & \cdots & 1 \\ \alpha_{b,1} & \alpha_{b,1} & \cdots & \alpha_{b,1} \\ \vdots & \vdots & \ddots & \vdots \\ \alpha_{b,M-1} & \alpha_{b,M-1} & \cdots & \alpha_{b,M-1} \end{bmatrix} \tag{7}$$

In the basic compensation phase matrix $C_M^b$, its elements indicate the phase differences compensated for individual antenna arrays. More specifically, the m-th ($1 \le m \le M-1$) element $\alpha_{b,m}$ of each column vector represents the basic compensation phase of the antenna array(s) for transmitting the reference signal for the m-th port relative to the antenna array(s) for transmitting the reference signal for the 0-th port. Thus, on each communication resource, the beams transmitted by the K antenna arrays are combined into a single beam. Depending on the structure and arrangement of the antenna arrays and the direction of the transmitting beams, the value of the basic compensation phase $\alpha_{b,m}$ can be calculated according to Formulas (1) to (4) described in the first embodiment.

For example, for a uniformly arranged ULA, the basic compensation phase of Antenna array 1 relative to Antenna array 0 is $$\alpha_{b,1} = e^{-j\frac{2\pi}{\lambda}dN\sin\phi}$$

(d is the interval of antenna elements, N is the number of antenna elements per antenna array, and $\phi$ is the beam direction of the antenna array). The basic compensation phase of Antenna array 2 relative to Antenna array 0 is $$\alpha_{b,2} = e^{-j\frac{2\pi}{\lambda}dN\sin\phi}\alpha_{b,1} = e^{-j\frac{2\pi}{\lambda}2dN\sin\phi},$$

and so on. Therefore, for a ULA matrix having such a structure and arrangement, the basic compensation phase matrix $C_M^b$ can be expressed as:

$$C_M^b = \begin{bmatrix} 1 & 1 & \cdots & 1 \\ e^{-j\frac{2\pi}{\lambda}dN\sin\phi} & e^{-j\frac{2\pi}{\lambda}dN\sin\phi} & \cdots & e^{-j\frac{2\pi}{\lambda}dN\sin\phi} \\ \vdots & \vdots & \ddots & \vdots \\ e^{-j\frac{2\pi}{\lambda}(M-1)dN\sin\phi} & e^{-j\frac{2\pi}{\lambda}(M-1)dN\sin\phi} & \cdots & e^{-j\frac{2\pi}{\lambda}(M-1)dN\sin\phi} \end{bmatrix} \quad (8)$$

Although the calculation of the basic compensation phase matrix $C_M^b$ for the ULA matrix having a uniform structure has been described above with reference to Formula (8), it is not intended to impose any limitation. Actually, by substituting Formulas (2) to (4) described in the first embodiment into Formula (7), the basic compensation phase matrix $C_M^b$ for the non-uniformly arranged ULA matrix or UPA matrix can be similarly calculated.

Additional Phase Matrix $C_M^r$

The additional phase matrix $C_M^r$ in Formula (6) contains information on the additional phases applied to individual antenna arrays. More specifically, the m-th ($1 \leq m \leq M-1$) element of each column vector of the additional phase matrix $C_M^r$ represents the additional phase applied to the reference signal to be transmitted over the m-th port, thereby adjusting the direction of the combined beam formed by the K antenna arrays over each communication resource.

The additional phase matrix $C_M^r$ is designed to be orthogonal so as to ensure an orthogonality of the matrix $C_M$.

As an example, when the number of ports M=2, the additional phase matrix $C_2^r$ can be expressed as $$C_2^r = \begin{bmatrix} 1 & 1 \\ j & -j \end{bmatrix} \quad (9)$$

Wherein, with the additional phase [1, j], the beam formed by transmitting the reference signal for the 0-th port and the beam formed by transmitting the reference signal for the 1-st port are combined, resulting in a combined beam, and with the additional phase [1, -j], the beam formed by transmitting the reference signal for the 0-th port and the beam formed by transmitting the reference signal for the 1-st port are combined, resulting in another combined beam. As can be seen from Patterns (3) and (7) of FIG. 6, the two combined beams have different direction angles and are approximately symmetrical about of the reference beam direction (i.e., the direction of the transmitting beam of a single antenna array, see the beam shown in dotted lines).

For the number of ports $M=2^n$ (n is a positive integer greater than 1), $C_M^r$ can be constructed by an iterative method. As an example, $C_M^r$ can be constructed by $C_{M/2}^r$ according to the following formula:

$$C_M^r = C_{M/2}^r \otimes H_2 \quad (10)$$

Wherein, $H_2$ is a Hadamard matrix, $$H_2 = \begin{bmatrix} 1 & 1 \\ 1 & -1 \end{bmatrix},$$

and $\otimes$ represents the Kronecker product.

Formula (10) can be iterated till $C_2^r$. $C_2^r$ can be defined as Formula (9). In this way, the additional phase matrix for the number of ports of 4, 8, 16 or the like can be calculated.

The additional phase matrix obtained by such iteration with the Hadamard matrix can maintain its orthogonality, thereby ensuring the orthogonality of the orthogonal code matrix $C_M$ generated by the basic compensation phase matrix $C_M^b$ and the additional phase matrix $C_M^r$.

Transmission and Reception of Reference Signals

The transmission and reception of the reference signals according to the third embodiment will be described below with reference to FIGS. 8A-8B and FIGS. 9A-9B.

Figure 8A:
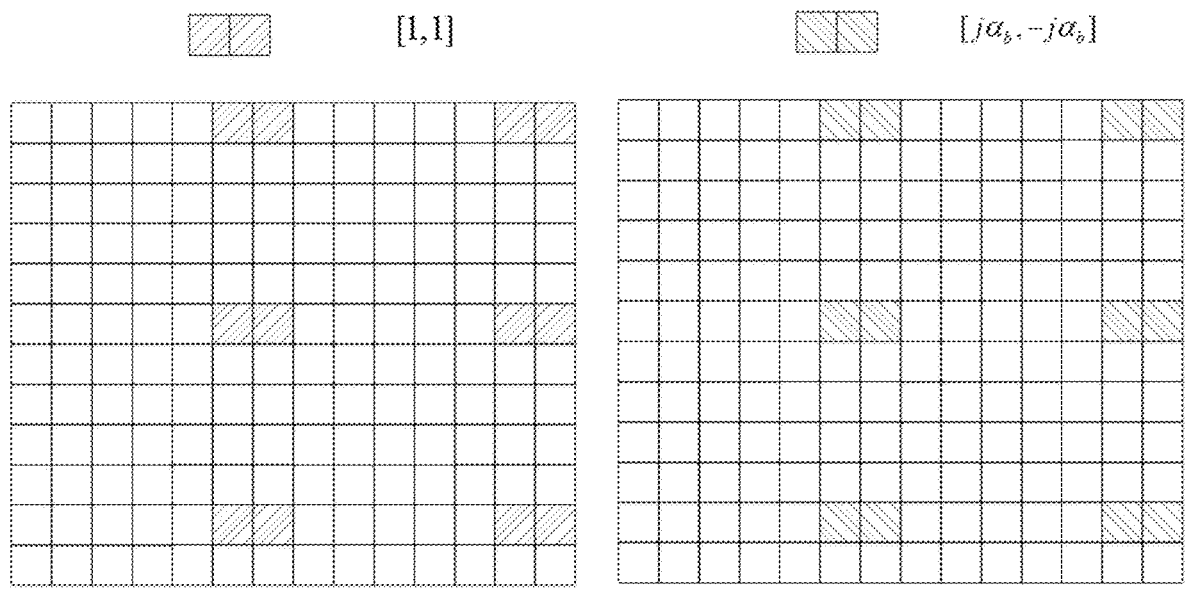
FIGS. 8A and 8B are a schematic diagram of transmitting reference signals for two ports and a diagram of beam patterns, respectively.
Figure 8B:
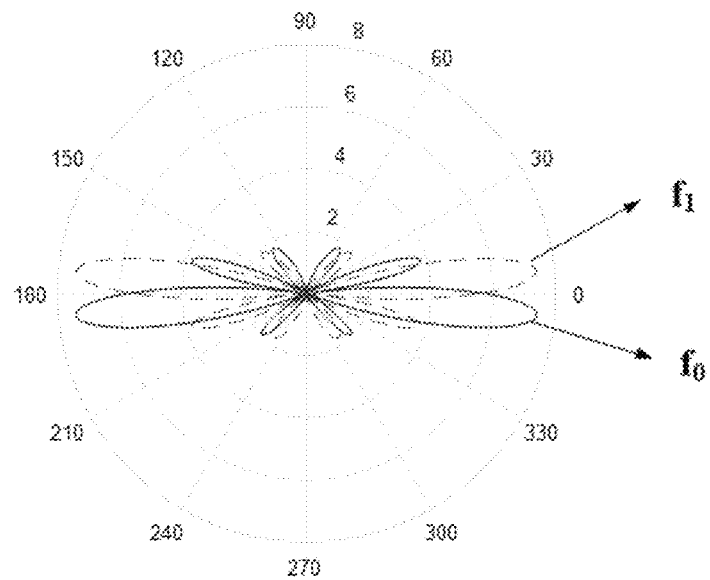

FIGS. 8A-8B illustrate an example of transmission of reference signals of two ports. The transmitting side generates the reference signals for the two ports by using the orthogonal code matrix $C_2$. In one example, according to Formulas (8) and (9) described above, the orthogonal code matrix $C_2$ can be determined as:

$$C_2 = \begin{bmatrix} 1 & 1 \\ j\alpha_b & -j\alpha_b \end{bmatrix} \quad (11)$$

Where $\alpha_b$ is the basic compensation phase.

According to the orthogonal code matrix, the reference signal for Port 0 uses code [1, 1] (given by the first row of $C_2$) for code division multiplexing, and the reference signal of Port 1 uses code [$j\alpha_b$, $-j\alpha_b$] (given by the second row of $C_2$) for code division multiplexing. FIG. 8A illustrates the case of the resource elements occupied by the reference signals for the two ports in the communication resource block, respectively, where the left side corresponds to Port 0 and the right side corresponds to Port 1. The symbol of each of the reference signals occupies two communication resources (resource elements) for transmission, and the reference signals of the two ports occupy the same communication resources.

FIG. 8B is a schematic diagram showing beams generated when these reference signals are transmits by antenna arrays. The antenna arrays have decided to use the same analog beamforming parameters in order to be able to form the same target transmitting beam. On the first resource element, the signal transmitted by the antenna array(s) of Port 1 has a phase difference $j\alpha_b$ (given by the first column of $C_2$) relative to the signal transmitted by the antenna array(s) of Port 0. On one hand, since the phase difference includes a basic compensation phase $\alpha_b$ compensated for each of the antenna arrays, the beams formed by the antenna arrays of the two ports can be combined into a single beam (the combined beam $f_0$). On the other hand, since the phase difference further includes an additional phase j applied to each of the antenna arrays to adjust the direction of the combined beam such that the combined beam has a certain angular offset from the target transmitting beam (see the beam shown by the dashed lines).

On the second resource element, the signal transmitted by the antenna array of Port 1 has a phase difference $-j\alpha_b$ (given by the second column of $C_2$) relative to the signal transmitted by the antenna array of Port 0. On one hand, since the phase difference includes a basic compensation phase $\alpha_b$ compensated for each of the antenna arrays, the beams formed by the antenna arrays of the two ports can be combined into a single beam (combined beam $f_1$). On the other hand, since the phase difference further includes an additional phase $-j$ applied to each of the antenna arrays, the combined beam has a certain angular offset from the target transmitting beam (see the beam shown by the dashed lines). The combined beam $f_1$ and the combined beam $f_0$ are substantially symmetric about the target transmitting beam. Thus, the reference signals are transmitted in different beams on different communication resources.

The receiving side can estimate the channel condition of each of the ports by receiving the reference signal. For example, in the above example, assuming that the channel vectors of Port 0 and Port 1 to the receiving side are $h_0$ and $h_1$, each of the antenna arrays uses the same analog beamforming parameters to form beam f, then on the first resource element, the received signal $y_0$ at receiving side can be expressed as:

$$y_0 = h_0 f^T + j\alpha_b h_1 f^T + n$$

On the second resource element, the received signal $y_1$ at the receiving side can be expressed as:

$$y_1 = h_0 f^T - j\alpha_b h_1 f^T + n$$

Here, n represents a noise component of the channel.

Then, with the orthogonality of the codes for code division multiplexing of Port 0 and Port 1, the channel conditions of the respective ports can be obtained by multiplying the received signals $y_0$ and $y_1$ by the conjugate transposition of the codes for code division multiplexing of the respective ports:

$$\text{Port 0: } h_0 f^T = \frac{[1, 1]\begin{bmatrix} y_0 \\ y_1 \end{bmatrix}}{\|[1, 1]\|^2} = \frac{y_0 + y_1}{2},$$

$$\text{Port 1: } h_1 f^T = \alpha_b^* \frac{[-j, j]\begin{bmatrix} y_0 \\ y_1 \end{bmatrix}}{\|[-j, j]\|^2} = \alpha_b^* \frac{-jy_0 + jy_1}{2},$$

Here, $\alpha_b^*$ is a conjugate of the basic compensation phase $\alpha_b$.

It will be appreciated that since the basic compensation phase matrix is related to the structure of the antenna arrays and the transmitting beam, the receiving side may not have knowledge of it or there is high complexity to have knowledge of it (for example, the transmitting side needs to notify the receiving side), but the additional phase matrix is fixed. Therefore, the receiving side can pre-store the additional phase matrix having orthogonality when determining the channel condition. For example, when the receiving side receives the received signal, the conjugate $[-j, j]$ of the row $[j, -j]$ of the additional phase matrix can be multiplied by the received signal $$\begin{bmatrix} y_0 \\ y_1 \end{bmatrix}$$

to obtain information on the channel condition of Port 1 and feed it back to the transmitting side. The transmitting side may multiply it by $\alpha_b^*$ for correction.

Figure 9A:
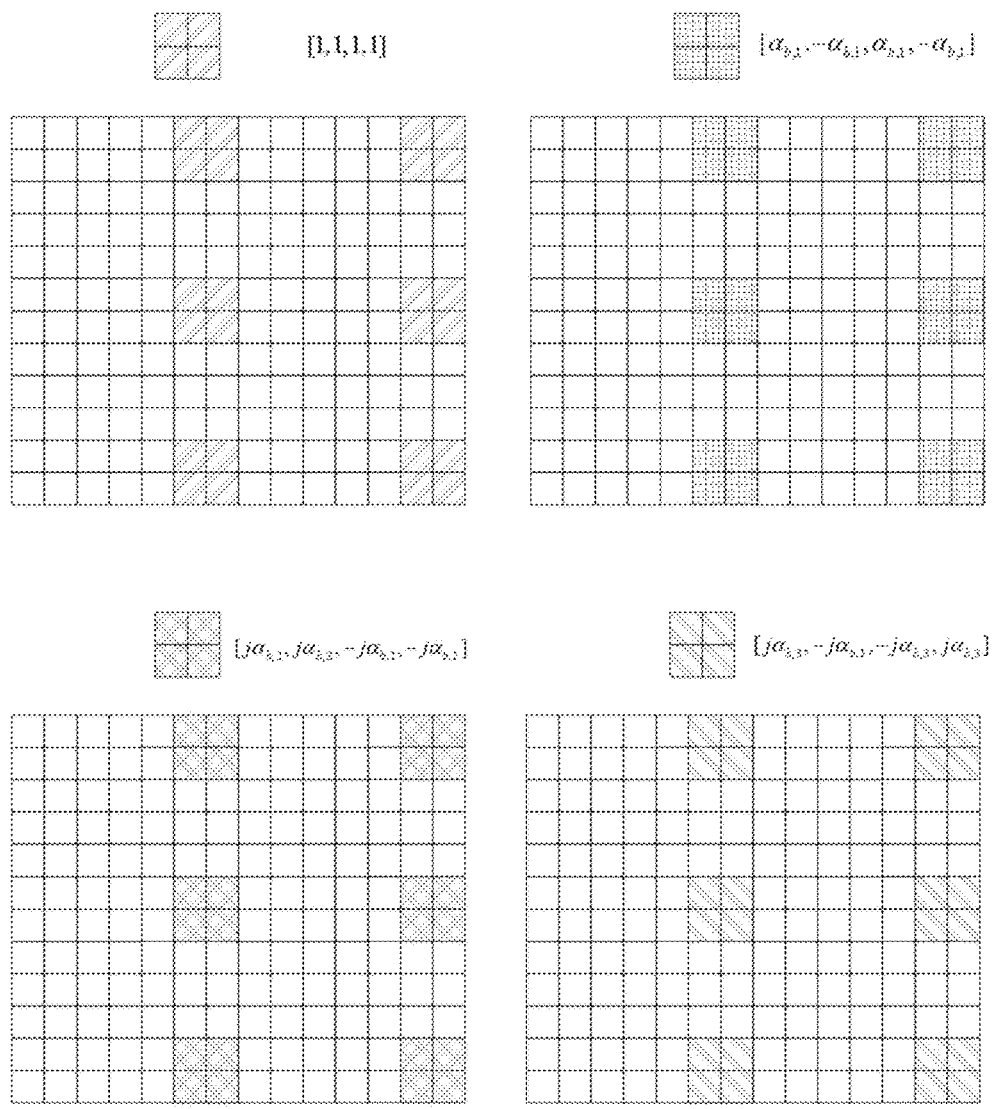
FIGS. 9A and 9B are a schematic diagram of transmitting reference signals for four ports and a diagram of beam patterns, respectively.
Figure 9B:
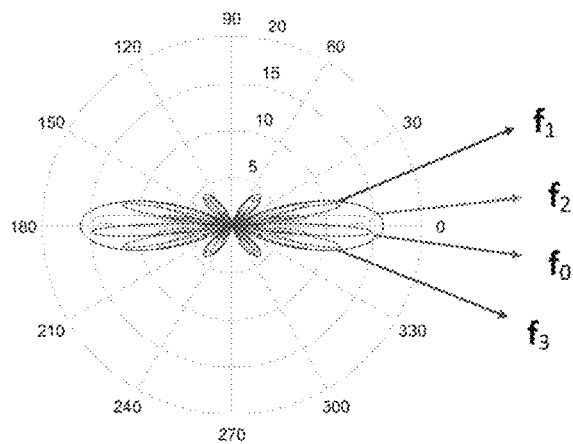

FIGS. 9A-9B illustrate an example of transmission of the reference signals for four ports. The transmitting side generates the reference signals for four ports by using the orthogonal code matrix $C_4$. In one example, the orthogonal code matrix $C_4$ is determined according to Formulas (8), (9) and (10) described above as follows:

$$C_2 = \begin{bmatrix} 1 & 1 & 1 & 1 \\ \alpha_{b,1} & -\alpha_{b,1} & \alpha_{b,1} & -\alpha_{b,1} \\ j\alpha_{b,2} & j\alpha_{b,2} & -j\alpha_{b,2} & -j\alpha_{b,2} \\ j\alpha_{b,3} & -j\alpha_{b,3} & -j\alpha_{b,3} & j\alpha_{b,3} \end{bmatrix} \quad (12)$$

According to the orthogonal code matrix, the reference signal of Port 0 uses code [1, 1, 1, 1] (given by the first row of $C_4$) for code division multiplexing, the reference signal of Port 1 uses code $[\alpha_{b,1}, -\alpha_{b,1}, \alpha_{b,1}, -\alpha_{b,1}]$ (given by the second row of $C_4$) for code division multiplexing, the reference signal of Port 2 uses code $[j\alpha_{b,2}, j\alpha_{b,2}, -j\alpha_{b,2}, -j\alpha_{b,2}]$ (given by the third row of $C_4$) for code division multiplexing, and the reference signal of Port 3 uses code $[j\alpha_{b,3}, -j\alpha_{b,3}, -j\alpha_{b,3}, j\alpha_{b,3}]$ for code division multiplexing. FIG. 9A shows the case of the resource elements occupied by the reference signals for the four ports in the communication resource block, respectively, wherein the upper left, the upper right, the lower left, and the lower right correspond to Port 0, Port 1, Port 2, and Port 3, respectively. The length of the codes for code division multiplexing of the reference signals is 4, the symbols of the reference signals occupy four resource elements for transmission, and the reference signals of the four ports occupy the same resource elements.

FIG. 9B is a diagram showing beams generated when these reference signals are transmitted by antenna arrays, wherein beams $f_0$ to $f_3$ are combined beams obtained by combining the beams transmitted by the antenna arrays on four antenna elements, respectively. As shown in FIG. 9B, the combined beams transmitted by multiple antenna arrays on each of the resource elements have mutually different directions, and are symmetric in pairs with respect to the target transmitting beam.

After receiving the beams of the reference signals, the receiving side may multiply the received signals by a conjugate transposition of the codes for code division multiplexing of the respective ports to determine the channel condition of each port. In particular, the receiving side may only pre-store information on the additional phase matrix, and use the orthogonality of the additional phase matrix to determine the channel condition of each port. These processes are similar to the case of two ports and will not be described in detail here.

Electronic Device and Communication Method of the Third Embodiment

An example of an electronic device at the transmitting side and a communication method thereof according to the third embodiment of the present disclosure will be described below with reference to FIGS. 10A and 10B.

Figure 10A:
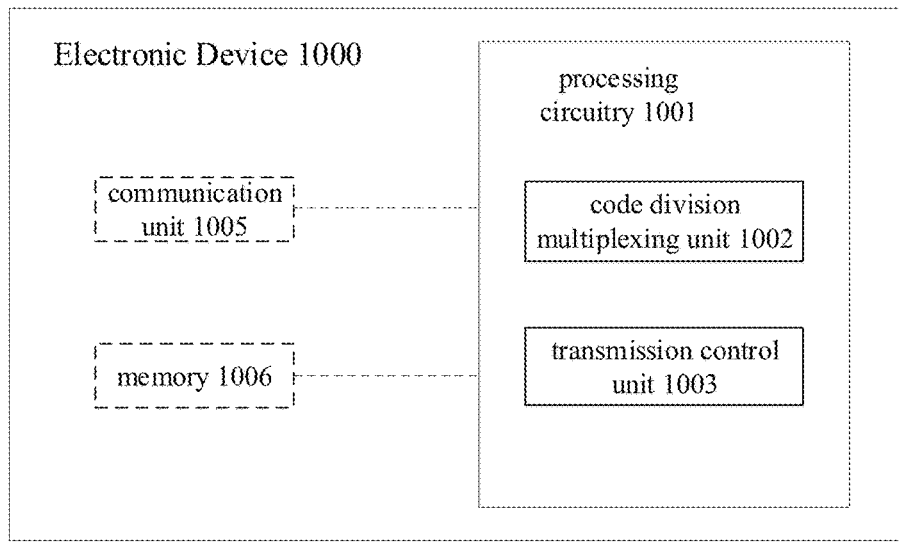
FIG. 10A is a block diagram of an electronic device at the transmitting side according to a third embodiment of the present disclosure.

FIG. 10A shows a block diagram of configuration of an electronic device 1000 at the transmitting side according to the third embodiment. In the downlink transmission, the electronic device 1000 may be a base station such as an eNB, a gNB or the like, or a component thereof, and in the uplink transmission, the electronic device 1000 may be a user equipment such as a mobile phone, an in-vehicle communication device, a drone or the like, or a component thereof.

Figure 10B:
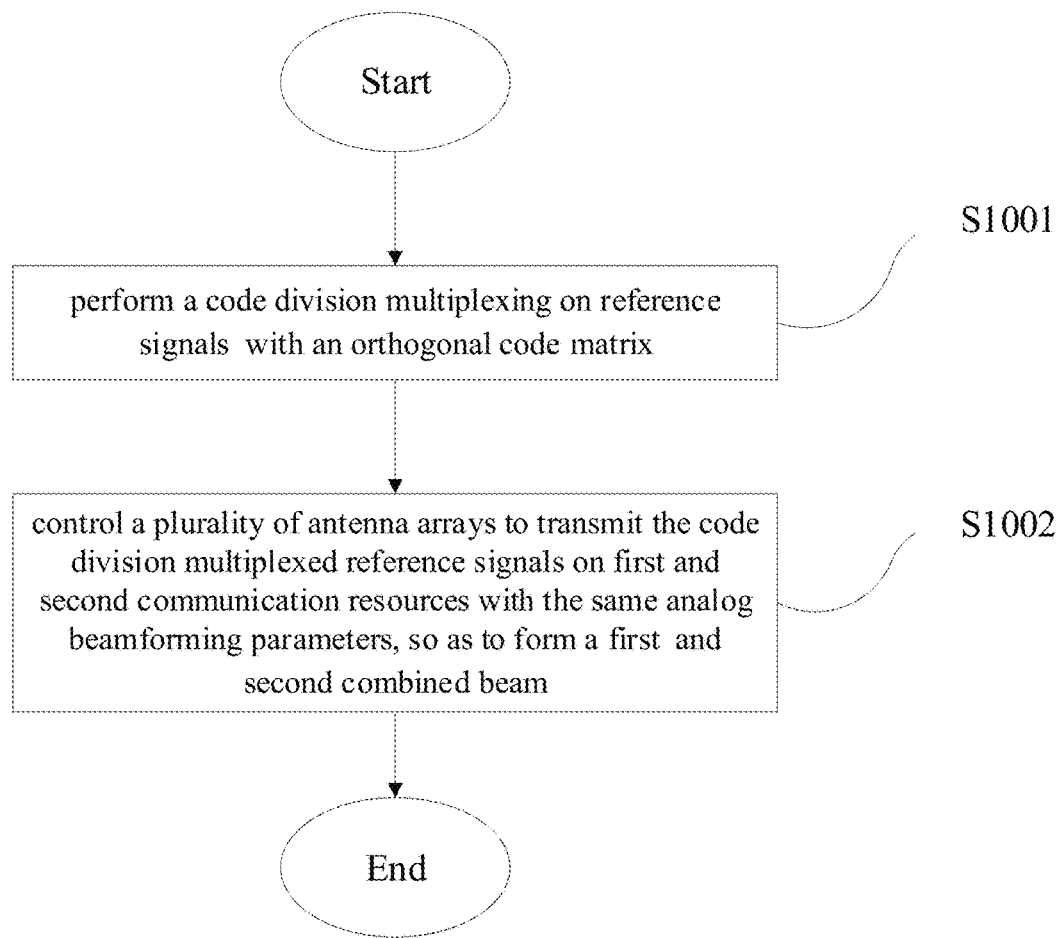
FIG. 10B is a flowchart of a communication method according to the third embodiment of the present disclosure.

As shown in FIG. 10A, the electronic device 1000 includes at least a processing circuitry 1001 that can be configured to perform the communication method as shown in FIG. 10B. Similarly to processing circuitry 501, the processing circuitry 1001 can be implemented in a variety of ways.

The processing circuitry 1001 may include a code division multiplexing unit 1002 and a transmission control unit 1003.

The code division multiplexing unit 1002 is configured to perform a code division multiplexing on reference signals with an orthogonal code matrix to generate the reference signals for a plurality of ports (step S1001 in FIG. 10B). The orthogonal code matrix contains information for adjusting the relative phase of antenna arrays. The orthogonal code matrix may be generated based on a basic compensation phase matrix and an additional phase matrix, wherein elements of the basic compensation phase matrix indicate phase differences compensated for the antenna arrays, such that the beams transmitted by individual antenna arrays with a common transmitting beam on the same communication resource can be combined into a single combined beam. The additional phase matrix is an orthogonal matrix whose element indicates a fixed phase difference applied to the antenna array(s) of different ports to adjust the direction angle of the combined beam.

The transmission control unit 1003 is configured to control the plurality of antenna arrays to transmit the code division multiplexed reference signals using the same analog beamforming parameters (step S1002 in FIG. 10B). The plurality of antenna arrays operate under the coherent beam selection type. Each of the antenna arrays transmits a first symbol of its corresponding code-multiplexed reference signal on a first communication resource (e.g., a time-frequency resource), and since these symbols have been given a relative phase constituted by the basic phase compensation phase and the additional phase by code division multiplexing, the beams transmitted by individual antenna arrays are combined into a single beam (a first combined beam). Similarly, on the second communication resource, each of the antenna array transmits a second symbol of the code division multiplexed reference signal on a second communication resource, and due to the relative phase of these symbols, the beams transmitted by individual antenna arrays are combined into a single beam (a second combined beam). The direction of the first combined beam and the second combined beam is different from the direction of the transmitting beam corresponding to the analog beamforming parameter or even substantially symmetric. The plurality of antenna arrays may also transmit reference signals on a third communication resource, a fourth communication resource, etc. to form more combined beams having mutually different beam directions. In particular, these combined beams are symmetric in pairs about the direction of the transmitting beam.

The electronic device 1000 may also include, for example, a communication unit 1005 and a memory 1006.

The communication unit 1005 can be configured to communicate with the receiving side under the control of the processing circuitry 1001. In one example, the communication unit 1005 can be implemented as a transmitter or transceiver, including communication components such as the antenna arrays and/or radio frequency links described above. The communication unit 1005 is depicted in dashed lines because it can also be located externally to the electronic device 1000.

The memory 1006 can store various information generated by the processing circuitry 1001 (e.g., the orthogonal code matrix to be used by the code division multiplexing unit 1002, the common analog beamforming parameters to be used by the antenna array, etc.), programs and data for operation of the electronic device 1000, data to be transmitted by the communication unit 1005, and the like. The memory 1006 is depicted in dashed lines as it may also be located within the processing circuitry 1001 or externally to the electronic device 1000. The memory 1006 can be a volatile memory and/or a non-volatile memory. For example, the memory 1006 can include, but is not limited to, a random access memory (RAM), a dynamic random access memory (DRAM), a static random access memory (SRAM), a read only memory (ROM) or a flash memory.

The Fourth Embodiment

In the third embodiment, a description has been given of transmitting two or more beams having different directions by code division multiplexing the reference signal with the orthogonal code matrix with reference to the figures. The example of FIGS. 8A-8B continues to be discussed below.

As shown in FIGS. 8A-8B, the reference signals of Port 0 and Port 1 are code division multiplexed with orthogonal codes [1, 1] and [jαb, −jαb], respectively. Therefore, on the first communication resource, the antenna array(s) corresponding to Port 0 has a phase difference $j\alpha_b$ relative to the antenna array(s) corresponding to Port 1, and on the second communication resource, the antenna array(s) corresponding to Port 0 a phase difference $-j\alpha_b$ relative to the antenna array(s) corresponding to Port 1. That is, for the two communication resources, the parameters for relative phase adjustment [1, jαb] and [1, −jαb] are used to adjust the relative phases of the antenna arrays of Port 0 and Port 1, respectively.

The antenna arrays use the same analog beamforming parameters, that is, all of the antenna arrays use the same transmitting beam (hereafter referred to as the target transmitting beam, denoted by f). At this time, on the first communication resource, the combined beam 0 can be expressed as $f_b^0 = [f, j\alpha_b f]$, and on the second communication resource, the combined beam 1 can be expressed as $f_b^1 = [f, -j\alpha_b f]$, where $\alpha_b$ is the basic compensation phase determined based on the structure and arrangement of the antenna arrays and the direction of the target transmitting beam.

Regarding the structure and arrangement of the antenna arrays, two ULAs that are uniformly arranged are considered first, that is, the interval between the ULAs is equal to the interval between the antenna elements. For this case, the basic compensation phase $\alpha_b$ can be expressed as $$\alpha_b = e^{-j\frac{2\pi}{\lambda}dN\sin\phi}$$

(see Formula (2)).

Let $h_0$ and $h_1$ be the channel vectors for Port 0 and Port 1, respectively. Since the size of the antenna arrays can be negligible with respect to the transmission distance, it can be assumed that the two ports point to the same channel direction (i.e., AOD=θ), and the channel vector of an entire group of the antenna arrays can be expressed as $$h = [h_0, h_1] = \left[\underbrace{1, \ldots, e^{j\frac{2\pi}{\lambda}d(N-1)\sin\theta}}_{h_0}, \underbrace{e^{j\frac{2\pi}{\lambda}dN\sin\theta}, \ldots, e^{j\frac{2\pi}{\lambda}d(2N-1)\sin\theta}}_{h_1}\right] \in C^{1\times 2N}.$$

That is to say, there is a fixed phase difference $$e^{j\frac{2\pi}{\lambda}dN\sin\theta}$$

between corresponding antenna elements of the two antenna arrays, that is, $$h_1 = e^{j\frac{2\pi}{\lambda}dN\sin\theta} h_0.$$

Therefore, the gains of the combined beam 0 and the combined beam 1 in the channel direction θ are $$p^0(\theta) = hf_b^{0,T} = h_0 f^T + j\alpha_b h_1 f^T = \left(1 + je^{j\frac{2\pi}{\lambda}dN(\sin\theta-\sin\phi)}\right)h_0 f^T$$

$$p^1(\theta) = hf_b^{1,T} = h_0 f^T - j\alpha_b h_1 f^T = \left(1 - je^{j\frac{2\pi}{\lambda}dN(\sin\theta-\sin\phi)}\right)h_0 f^T.$$

Here, a relative beam gain is defined as a ratio of the gains of the two combined beams $$\rho = \left|\frac{p^0(\theta)}{p^1(\theta)}\right|,$$

resulting in $$\rho = \left|\frac{1 + e^{j\frac{2\pi}{\lambda}dN(\sin\theta-\sin\phi)}}{1 - e^{j\frac{2\pi}{\lambda}dN(\sin\theta-\sin\phi)}}\right|. \tag{13}$$

It is noted that when the channel AOD direction θ is in the vicinity of the target transmitting beam direction φ, there is a one-to-one mapping relationship between the relative beam gain ρ and the channel AoD direction θ.

FIG. 11 is a graph showing the relationship between the relative beam gain ρ and the channel AoD direction θ when φ=0° and φ=30°. As shown in FIG. 11, the relative beam gain ρ and the channel AoD direction θ have a one-to-one mapping relationship in a neighborhood [$\theta_{min}$, $\theta_{max}$] of the transmitting beam direction φ. This neighborhood corresponds to zero points of $p^0(\theta)$ and $p^1(\theta)$ and can be given by:

$$\sin\theta_{min} = \sin\phi - \frac{\lambda}{4dN}$$

$$\sin\theta_{max} = \sin\phi + \frac{\lambda}{4dN}$$

For example, when φ=0°, [$\theta_{min}$, $\theta_{max}$]=[−7.2°, 7.2°], and when φ=30°, [$\theta_{min}$, $\theta_{max}$]=[22.0°, 38.6°].

The case where the two ULAs are uniformly arranged is described above. However, the above discussion can be similarly extended with the number of ports, the arrangement and type of antenna arrays.

Extension (1): Two ULAs are arranged non-uniformly. For such a non-uniform arrangement, the interval d between the antenna arrays is not equal to the interval $d_{edge}$ between the antenna elements, such as $d_{edge}$>d. The number of antenna elements per antenna array is N. In this extended example, the basic compensation phase $$\alpha_b = e^{-j\frac{2\pi}{\lambda}((N-1)d+d_{edge})\sin\phi}$$

(see Formula (1)).

At this time, the gain of the combined beam 0 and the combined beam 1 in the channel direction θ is $$p^0(\theta) = hf_b^{0,T} = h_0 f^T + j\alpha_b h_1 f^T = \left(1 + je^{j\frac{2\pi}{\lambda}((N-1)d+d_{edge})(\sin\theta-\sin\phi)}\right)h_0 f^T$$

$$p^1(\theta) = hf_b^{0,T} = h_0 f^T + j\alpha_b h_1 f^T = \left(1 - je^{j\frac{2\pi}{\lambda}((N-1)d+d_{edge})(\sin\theta-\sin\phi)}\right)h_0 f^T$$

Therefore, the relative beam gain ρ can be calculated as $$\rho = \left|\frac{p^0(\theta)}{p^1(\theta)}\right|; \rho = \left|\frac{1 + je^{j\frac{2\pi}{\lambda}((N-1)d+d_{edge})(\sin\theta-\sin\phi)}}{1 - je^{j\frac{2\pi}{\lambda}((N-1)d+d_{edge})(\sin\theta-\sin\phi)}}\right|. \tag{14}$$

Figure 11A:
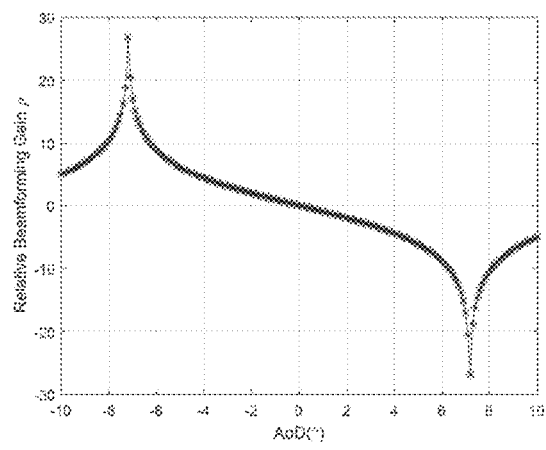
FIGS. 11A-11E are diagrams showing a mapping relationship between the relative beam gain and the channel AOD in different cases.
Figure 11A:
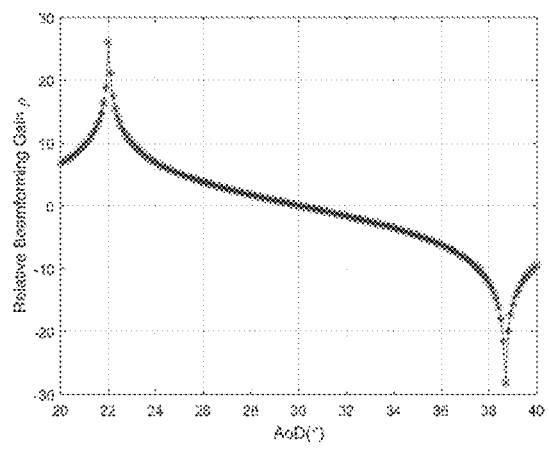
Figure 11B:
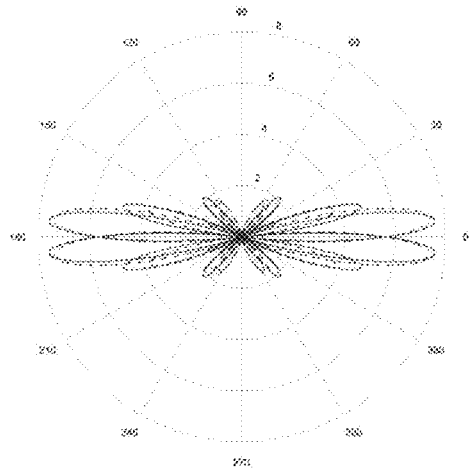
Figure 11B:
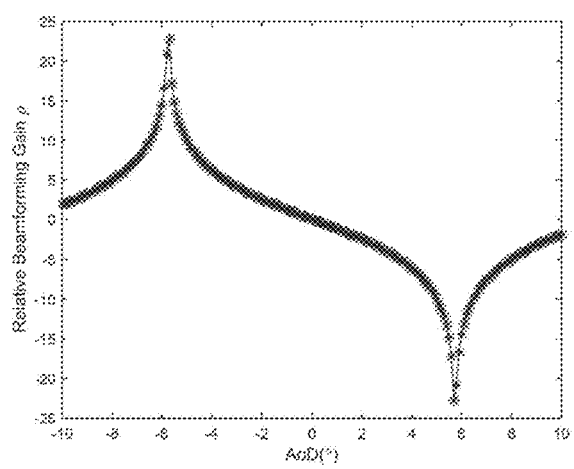

FIG. 11B is a schematic diagram of beams and a graph showing a relationship between the relative beam gain ρ and the channel AoD direction θ when φ=0°. Here assuming $d_{edge}$=2d, while the remaining conditions are the same as those in FIG. 11A. In the diagram on the left side of FIG. 11B, the solid line indicates the beams when the antenna arrays are non-uniformly arranged, and the broken line as a reference indicates the beams when the antenna arrays are uniformly arranged. As can be seen from this figure, the non-uniform arrangement of the antenna arrays results in the beam direction of the combined beam approaching the target transmitting beam. The graph on the right side of FIG. 11B shows the mapping relationship between the relative beam gain ρ and the channel AoD direction θ, from which it can be seen that there is a one-to-one mapping relationship between the relative beam gain ρ and the channel AoD direction θ within approximately [−5.8°, 5.8°]. The range of the neighborhood [$\theta_{min}$, $\theta_{max}$] is narrowed as compared with the example of FIG. 11A.

Extension (2): The number of ports is greater than 2. Assuming that there are M=$2^n$ ports and each of the ports corresponds to a respective antenna array, when the reference signals for individual ports are transmitted according to the communication method of the third embodiment, combined beams with different M directions can be formed. For these M combined beams, the relative beam gain of any two combined beams can be calculated similarly above. In particular, the relative beam gain of two combined beams that are symmetric about the target transmitting beam can be calculated, for example, $$\rho = \left| \frac{p^0(\theta)}{p^{N/2}(\theta)} \right|,$$

where $p^0(\theta)$ is the gain of the combined beam 0 (which corresponds to the 0-th column of the orthogonal code matrix $C_g$), and $p^{N/2}(\theta)$ is the gain of the combined beam N/2 (which corresponds to the N/2-th column of the orthogonal code matrix $C_g$). The two combined beams are approximately symmetrical about the target transmitting beam.

Figure 11C:
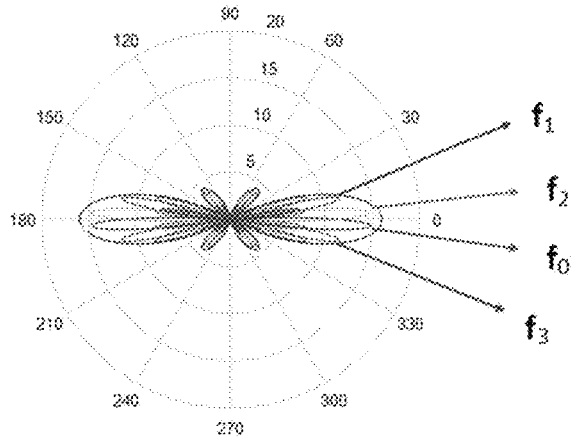
Figure 11C:
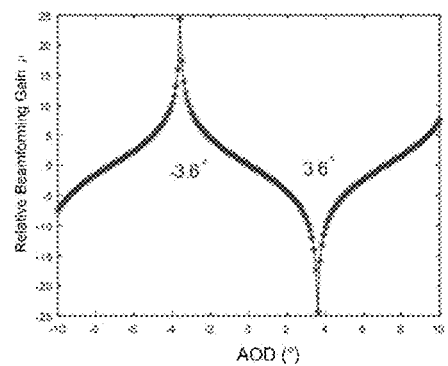

FIG. 11C shows a schematic diagram of beams and a graph showing a relationship between the relative beam gain $\rho$ and the channel AoD direction $\theta$ when M=4. In this example, the antenna arrays are ULAs and are uniformly arranged, the target transmitting beam direction $\phi=0°$, the remaining conditions are the same as in FIG. 11A. As shown in the diagram on the left side of FIG. 11C, four combined beams are formed, where $f_0$ and $f_2$ are symmetric, and $f_1$ and $f_3$ are symmetric. The graph on the right side of FIG. 11C shows the relationship between the relative beam gain $\rho$ of $f_0$ and $f_2$ and the channel AoD direction $\theta$, from which it can be seen that there is a one-to-one mapping relationship between the relative beam gain $\rho$ and the channel AoD direction $\theta$ within a neighborhood of approximately [−3.6°, 3.6°]. The range of the neighborhood [$\theta_{min}$, $\theta_{max}$] is narrowed as compared with the example of FIG. 11A.

Extension (3): The antenna arrays are UPAs. In the example described above, the antenna arrays are assumed to be ULAs having only a single row or a single column of antenna elements, but in practice, the antenna arrays may also be UPAs having N=W×H antenna elements, where W is the number of antenna elements in the horizontal direction, and H is the number of antenna elements in the vertical direction. The case where the antenna arrays are UPAs will be discussed below with reference to FIGS. 11D and 11E.

Figure 11D:
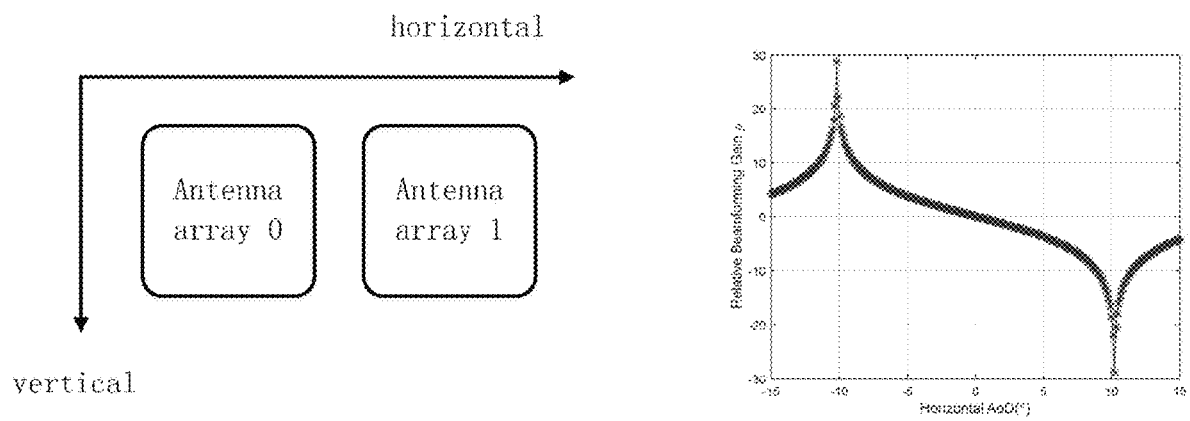
Figure 11E:
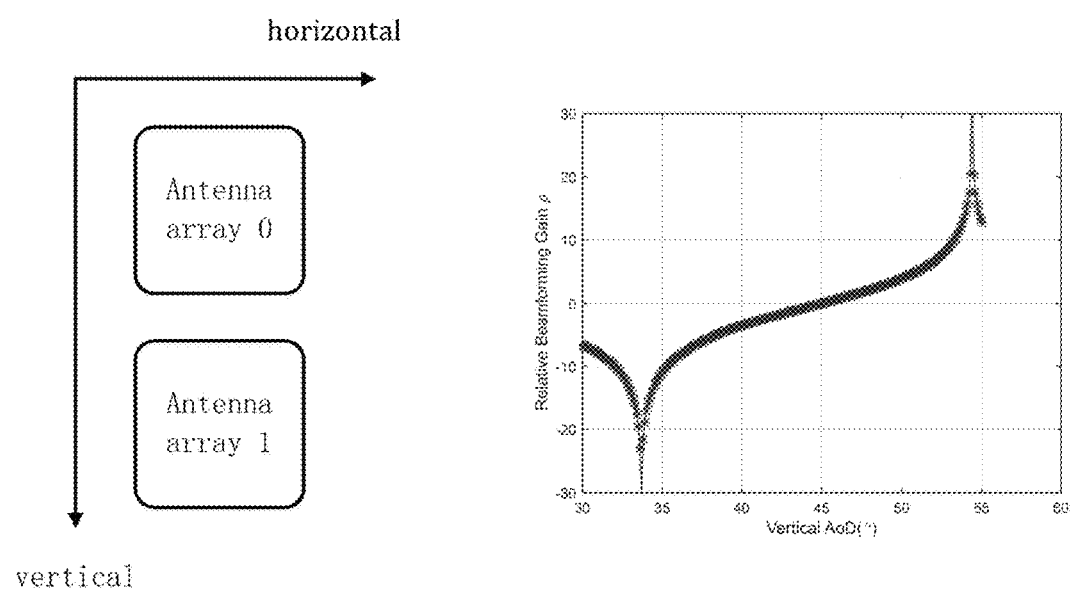

The arrangement of two antenna arrays in a particular direction (horizontal or vertical) is shown in FIGS. 11D and 11E. It will be appreciated that although FIGS. 11D and 11E only show examples in which two antenna arrays are arranged in the horizontal direction or the vertical direction, the number of antenna arrays is not limited to two.

Referring to FIG. 11D, as shown in the left figure, Antenna array 0 and Antenna array 1 are arranged in the horizontal direction. At this time, the basic compensation phase between the two antenna arrays is $$\alpha_b = e^{-j\frac{2\pi}{\lambda}d_H W \sin\phi_h \sin\phi_v},$$

where $d_H$ represents the interval of antenna elements in the horizontal direction, and $\phi_h$ and $\phi_v$ are the direction angles of the target transmitting beam in the horizontal direction and in the vertical direction, respectively. According to $$\rho = \left| \frac{p^0(\theta)}{p^1(\theta)} \right|,$$

the relative beam gain $\rho$ can be calculated as:

$$\rho = \left| \frac{1 + je^{j\frac{2\pi}{\lambda}d_H W(\sin\theta_h - \sin\phi_h)\sin\phi_v}}{1 - je^{j\frac{2\pi}{\lambda}d_H W(\sin\theta_h - \sin\phi_h)\sin\phi_v}} \right| \quad \text{Formula (15)}$$

Where $\theta_h$ represents the channel AOD in the horizontal direction. Here, a basic assumption is made that the channel AoD is equal to the target transmitting beam direction in the vertical direction, so the more the number of antenna elements is in the vertical direction, the better Formula (15) can reflect the relationship between the relative beam gain and the channel AoD in the horizontal direction.

The graph on the right side of FIG. 11D shows the mapping relationship between the relative beam gain and the channel AOD in the horizontal direction, where W=4, $d_H$=0.5λ, $\phi_h$=0°, $\phi_v$=45°. As can be seen from this graph, the relative beam gain $\rho$ and the direction $\theta_h$ of the horizontal channel AoD satisfy a one-to-one mapping relationship in a neighborhood. In addition, the case of the non-uniform structure can be analyzed using a similar method with reference to the ULAs.

Referring to FIG. 11E, as shown in the left figure, Antenna array 0 and Antenna array 1 are arranged in the vertical direction. At this time, the basic compensation phase between the two antenna arrays is $$\alpha_b = e^{-j\frac{2\pi}{\lambda}d_V H \sin\phi_h \cos\phi_v},$$

where $d_V$ represents the interval of antenna elements in the vertical direction, and $\phi_h$ and $\phi_v$ are the direction angles of the target transmitting beam in the horizontal direction and in the vertical direction, respectively. According to $$\rho = \left| \frac{p^0(\theta)}{p^1(\theta)} \right|,$$

the relative beam gain $\rho$ can be calculated as:

$$\rho = \left| \frac{1 + je^{j\frac{2\pi}{\lambda}d_V H(\cos\theta_v - \cos\phi_v)}}{1 - je^{j\frac{2\pi}{\lambda}d_V H(\cos\theta_v - \cos\phi_v)}} \right| \quad \text{Formula (16)}$$

Where $\theta_v$ represents the channel AOD in the vertical direction.

The graph on the right side of FIG. 11D shows the mapping relationship between the relative beam gain and the channel AOD in the vertical direction, where H=4, $d_V$=0.8λ, $\phi_v$=45°. As can be seen from this graph, the relative beam gain $\rho$ and the vertical channel AoD direction $\theta_v$ satisfy a one-to-one mapping relationship in a neighborhood. In addition, the case of the non-uniform arrangement can be analyzed using a similar method with reference to the ULAs.

Although the above extension examples (1) to (3) respectively describe the non-uniform arrangement of the antenna array, the number of ports of larger than 2, and the antenna arrays of UPA, it will be appreciated that any two or more of these factors may be combined in practical applications, that is, the use of the antenna arrays may be more complicated depending on actual needs. However, based on the above analysis method of the present disclosure, the relative beam gain can be similarly calculated according to Formulas (13) to (16) and variations thereof.

Channel Direction Estimation

From the above discussions, it can be concluded that for a pair of combined beams with different directions formed by transmitting reference signals after code division multiplexing, there may be a one-to-one mapping relationship between the ratio of gains and the channel direction within a certain range of the transmitting beam. Based on this understanding, as long as the channel direction is within this range, it is possible to determine the channel direction by determining the relative beam gain of the pair of combined beams. In addition, after the antenna arrays at the transmitting side are installed, their structure and arrangement are generally unchanged, and the beamforming codebook at the transmitting side contains analog beamforming parameters of a limited number of transmitting beams, so it is possible to pre-store the mapping relationship associated with the limited number of transmitting beams for channel direction estimation.

Thus, the fourth embodiment of the present disclosure proposes a solution of estimating the channel direction. Description will be given below with reference to FIG. 12.

Figure 12:
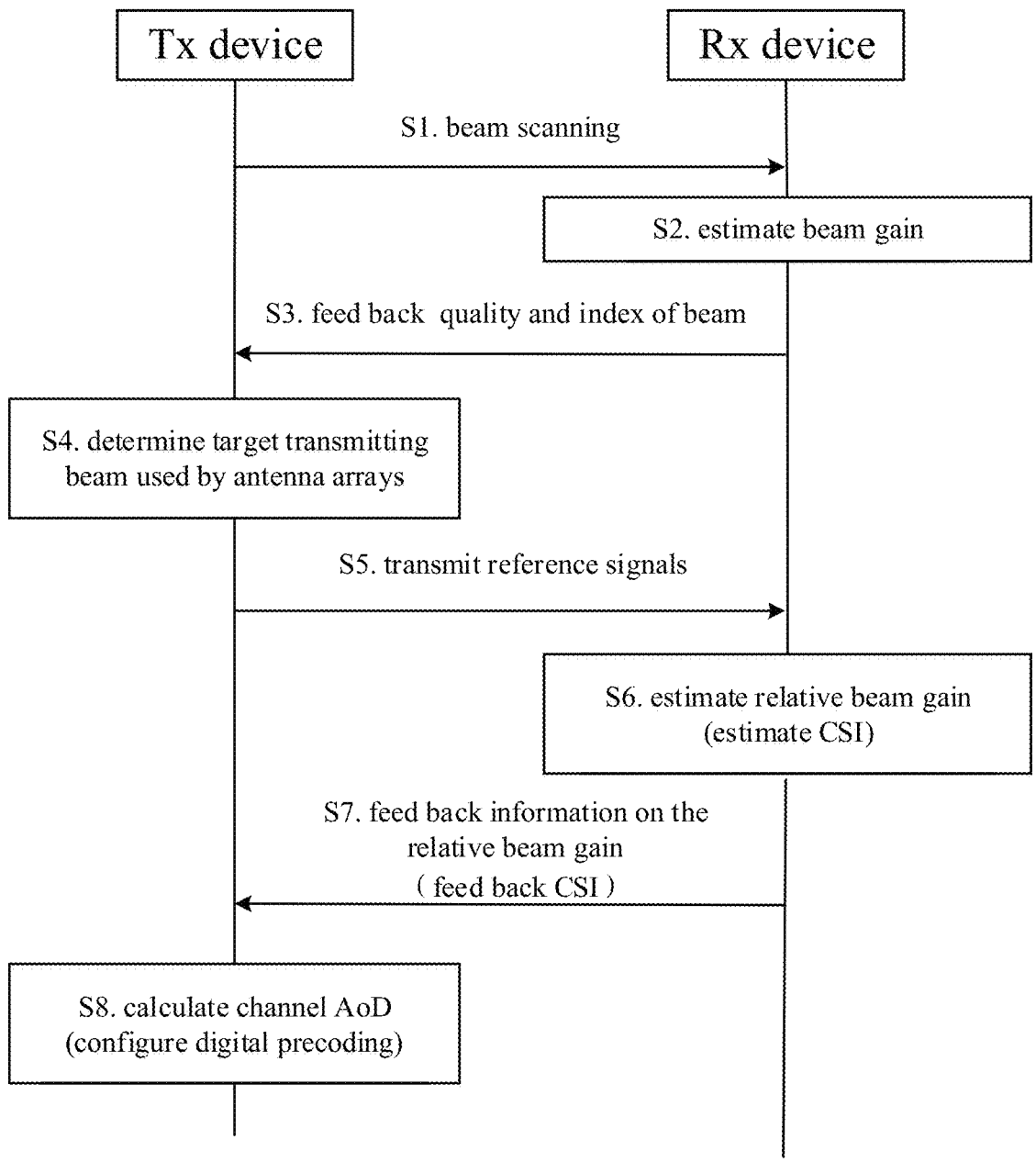
FIG. 12 is a signaling flowchart of channel direction estimation according to a fourth embodiment of the present disclosure.
Figure 13:
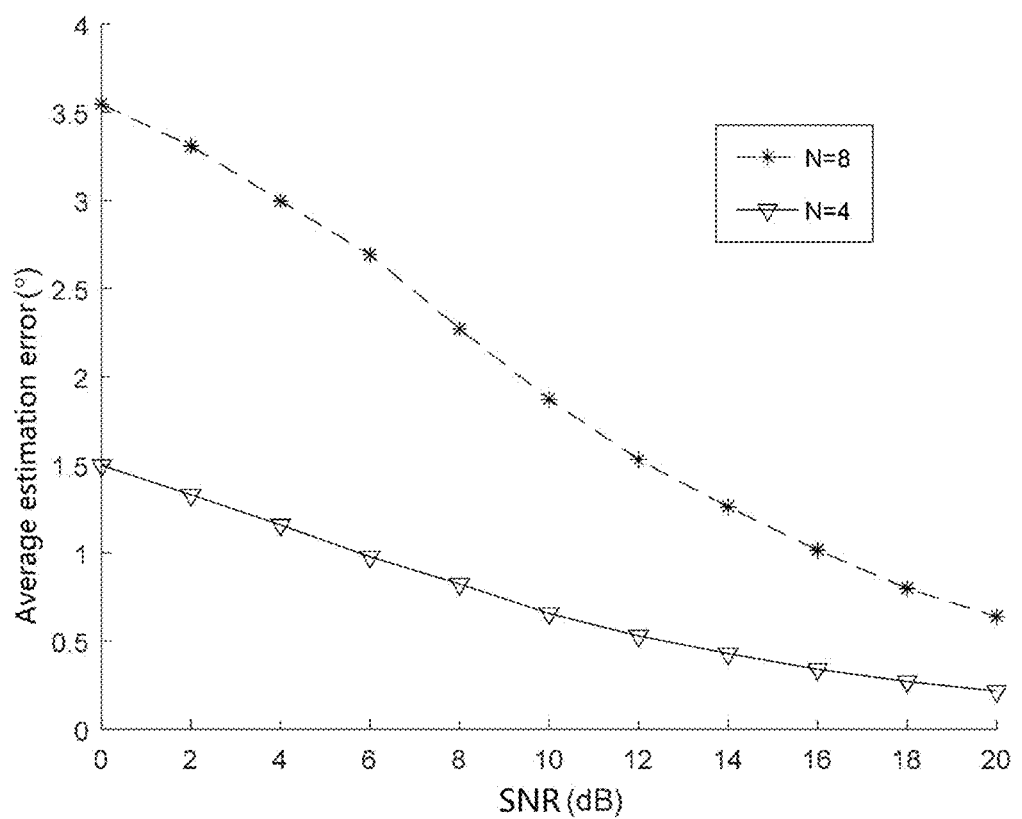
FIG. 13 is a simulation diagram of channel direction estimation according to the fourth embodiment of the present disclosure.

FIG. 12 is a signaling flowchart showing the channel direction estimation according to the fourth embodiment. In the case of downlink transmission, the transmitting side may be a base station, such as an eNB, a gNB or the like, and the receiving side may be a user equipment. In the case of uplink transmission, the transmitting side may be a user equipment, and the receiving side may be a base station.

As shown in FIG. 12, the transmitting side can select a target transmitting beam (S1 to S4) by beam scanning. For ease of understanding, S1 to S4 can be described in conjunction with FIG. 1 at the same time.

In S1, the transmitting side starts performing a beam scanning process. Referring to FIG. 1, in the downlink beam scanning process, the $n_{t\_DL}$ downlink transmitting beams of the base station 1000 sequentially send $n_{t\_DL} \times n_{r\_DL}$ downlink reference signals to the UE 1004, and in the process of uplink beam scanning, the $n_{t\_UL}$ uplink transmitting beams of the UE 1004 sequentially send $n_{t\_UL} \times n_{r\_UL}$ uplink reference signals to the base station 1000.

In S2, the receiving side can estimate the beam gains. For the process of downlink beam scanning, the UE 1004 measures the $n_{t\_DL} \times n_{r\_DL}$ downlink reference signals, for example, the received signal power (e.g., RSRP) of the downlink reference signals. Thus, the UE 1004 determines the strongest downlink transmitting beam of the base station 1000 and the strongest downlink receiving beam of the UE 1004. For the process of uplink beam scanning, the base station 1000 measures the $n_{t\_UL} \times n_{r\_UL}$ uplink reference signals (for example, measures the received signal power (e.g., RSRP) of the uplink reference signal), thereby determining the strongest uplink transmitting beam of the UE 1004 and the strongest uplink receiving beam of the base station 1000.

In S3, the receiving side feeds back information on the quality of the strongest beam and its index in the beam set to the transmitting side. After the transmitter receives the information, in S4, the transmitting side can determine the strongest transmitting beam as the target transmitting beam used by its antenna arrays. In the fourth embodiment of the present disclosure, in order to perform the channel direction estimation, it is required that the antenna array operates under the coherent beam selection type, that is, the transmitting side selects the same transmitting beam for its antenna arrays.

After the above beam scanning process is completed, the transmitting side and the receiving side perform the subsequent transmission of data and/or control signals by using the determined strongest transmitting or receiving beam of the base station and the strongest receiving or transmitting beam of the terminal device. The above process of determining the strongest transmitting and receiving beams of the base station and the UE by beam scanning is also referred to as a beam training process. Through such beam training process, the transmitting side can generally select the transmitting beam that best matches the current channel direction from its beam set.

It will be appreciated that the above S1 to S4 are procedures for determining the target transmitting beams at the transmitting side, which are not essential for the channel direction estimation to be described below. In fact, the transmitting side can also determine the target transmitting beam by any other suitable method, while it is preferred that the direction of the target transmitting beam is as close to the channel AOD direction as possible.

Then, in S5, the transmitting side transmits the reference signal using the determined target transmitting beam. Here, the reference signals have been code division multiplexed using an orthogonal code matrix. As in the third embodiment above, the orthogonal code matrix may be generated based on the basic compensation phase information and the additional phase information, wherein the basic compensation phase information indicates the phase differences compensated for each of the antenna arrays such that the beams transmitted by a plurality of antenna arrays on the same communication resource (e.g., the time-frequency resource) can be combined into a single combined beam, and the additional phase information indicates the phase difference used to adjust the direction of the combined beam. From this perspective, the elements of the orthogonal code matrix substantially indicate the relative phase of the antenna arrays used to transmit the reference signals on each of the communication resources, and the process of code division multiplexing the reference signal with the orthogonal code matrix is also the relative phase adjustment on the baseband signal. The code division multiplexing for the reference signals has been described in detail in the above third embodiment and will not be repeated here.

As a result, the transmitting side transmits a combined beam having a first beam direction on the first communication resource and a combined beam having a second beam direction on the second communication resource. Preferably, the two combined beams may be substantially symmetric about the direction of the target transmitting beam. However, the two combined beams can also be asymmetric about the direction of the target transmitting beam. The range of angle between the two combined beams determines the range of channel direction estimation.

In addition, the transmitting side can also transmit more combined beams. For example, the transmitting side may transmit a combined beam having a third beam direction on a third communication resource, a combined beam having a fourth beam direction on a fourth communication resource, and so on.

In S6, the receiving side receives each of the combined beams on corresponding communication resource, and estimates the relative beam gain ρ between two beams. Specifically, the receiving side can separately measure the gains of the received combined beams and take a ratio therebetween as the relative beam gain. In the case where a plurality of combined beams are received, two of them can be selected to estimate the relative beam gain. In the example described with reference to FIG. 11C, the received beams $f_1$ and $f_3$, for example, may be selected to estimate the relative beam gain to achieve a large range of channel direction estimation. As another example, the received beams $f_1$ and $f_3$ may be selected to estimate the relative beam gain, since a difference of gains between the main lobe and the side lobe of the two beams is large, the calculated relative beam gain value is more meaningful, so that the channel direction estimation is more accurate. However, in order to accurately estimate the channel AOD, the channel direction between the transmitting side and the receiving side has an angle with the target transmitting beam direction that is less than a predetermined threshold. That is, the channel direction falls within the neighborhood $[\theta_{min}, \theta_{max}]$ with respect to the direction of the target transmitting beam, wherein the neighborhood $[\theta_{min}, \theta_{max}]$ is related to which pair of beams selected for calculating the relative beam gain. In consideration of the estimation accuracy, it is desirable that the gain ratio of the two combined beams exceeds a predetermined threshold.

As a process that can be performed simultaneously, in S6 (as shown in parentheses), the receiving side can also determine channel state information based on the received reference signals. For example, as described in the third embodiment, the receiving side may implement the reception of each of the reference signals using the same orthogonal code matrix or additional phase matrix as at the transmitting side, and calculate channel state information such as channel quality indication (CQI), precoding matrix indication (PMI), and rank indication (RI) based on the received reference signals (e.g., CSI-RS). In addition, the receiving side can also perform more accurate channel state feedback, such as a precoding feedback based on linear combined codebook, a feedback based on covariance matrix, a hybrid channel state information feedback, and the like.

Next, in S7, the receiving side feeds information on the relative beam gain ρback to the transmitting side. When feeding back the relative beam gain, in order to reduce the transmission cost, the calculated value may be quantized, and the quantized codebook is pre-stored at both of the transmitting side and the receiving side. As an example, a plurality of quantized codebooks with different precisions may be stored at the transmitting side and the receiving side as needed, and then the transmitting side may configure the receiving side to adopt a certain quantization precision, or the receiving side determines to adopt a certain quantization precision and notifies the transmitting side. Since the mapping relationship between the channel direction and the relative beam gain in the vicinity of the target transmitting beam direction is approximately linear, a uniform quantization can be used, for example, a uniform quantization of $\log_{10} \rho$, and when the quantization precision is 2 bits, the quantized codebook is selected as $\{-10, -3, +3, +10\}$ dB, and when the quantization precision is 3 bits, the quantized codebook is selected as $\{-10, -6, -3, -1, +1, +3, +6, +10\}$ dB. However, the receiving side can also adopt any suitable quantization method. Then, the receiving side feeds back the quantized result indicating the relative beam gain to the transmitting side in form of a Relative Beamforming Gain Indicator (RBGI).

Additionally, in S7 (as shown in parentheses), the receiving side may also simultaneously transmit the determined channel state information, such as CQI, PMI, RI and the like. These pieces of channel state information may be included in the signaling message along with the relative beam gain indicator. Of course, the receiving side can use different signaling messages to transmit the relative beam gain indicator and the channel state information.

In S8, after receiving the relative beam gain indicator indicating the relative beam gain, the transmitting side may determine information on the relative beam gain and calculate the channel direction (AOD) accordingly. The mapping relationship between the relative beam gain and the channel direction has been calculated and stored in the transmitting side in advance. Since the structure and arrangement of the antenna arrays used at the transmitting side are generally fixed, the selection of the antenna arrays can also be performed according to a predetermined rule, so that all mapping relationship sets only related to the beam set of the beamforming codebook can be stored. The mapping relationship between the relative beam gain and the channel direction may be stored in form of a mapping table at the transmitting side, so that the transmitting side can directly map from the received relative beam gain to the channel AOD.

In addition, in S8 (as shown in parentheses), the transmitting side can also configure the digital precoding using the received channel state information, such as CQI, PMI, RI, etc., to achieve channel matching.

The signaling flow for implementing the channel AOD estimation at the transmitting side has been described above. As can be seen from FIG. 12, the channel AOD estimation according to the present embodiment can be performed together with channel state feedback, and thus has a good compatibility. It should be noted that although the example in which the channel AOD estimation is performed together with the channel state feedback is shown in FIG. 12, it will be appreciated that the two processes can be performed independently.

Simulation

Here, the channel AoD estimation method proposed in this embodiment is simulated and verified. Consider two uniformly arranged ULA antenna arrays, the number of antenna elements in each of the antenna arrays is N=4 or 8. The beam of the antenna array uses a 4× quantized DFT codebook, and the beam used by the antenna arrays is determined by beam scanning. Assume that the size of a sector covered by the antenna array is 120 degrees, that is, the range of the channel AoD is [−6°, 60°].

FIG. 14 shows a variation in error of the channel AoD estimation with the SNR according to the present embodiment. It can be seen that as the SNR increases, the accuracy of the channel AoD estimation method proposed by the present disclosure increases. It is also noted that the estimation accuracy when N=8 is greater than that when N=4, so the more the antenna elements are, the greater the accuracy of the channel AoD estimation is. At the same time, as the number of antenna elements increases, the beam becomes narrower, and the range of the channel AoD estimation is correspondingly reduced. The simulation results illustrate that the present disclosure enables an accurate channel AoD estimation.

Application Examples of Channel Direction Estimation

The channel direction estimation proposed in this embodiment can be applied to many scenarios, and some typical application scenarios will be described below. The following application examples are merely exemplary and not limiting.

An application example of beam tracking will be described below with reference to FIGS. 14A-14B.

When the user equipment moves, the base station can perform beam switching such that the beam direction follows the user, that is, keeps the direction of the transmitting beam tracking the channel AoD direction. The triggering condition for beam switching can typically be a change in channel direction that exceeds a certain threshold (e.g., 3.6°). The base station can periodically determine the current channel AOD. When it is determined that the channel AOD has changed beyond the threshold, the base station switches the transmitting beam used by the antenna arrays, for example, by selecting a transmitting beam closer to the current channel direction from its beam set to transmit data or control signals.

Figure 14A:
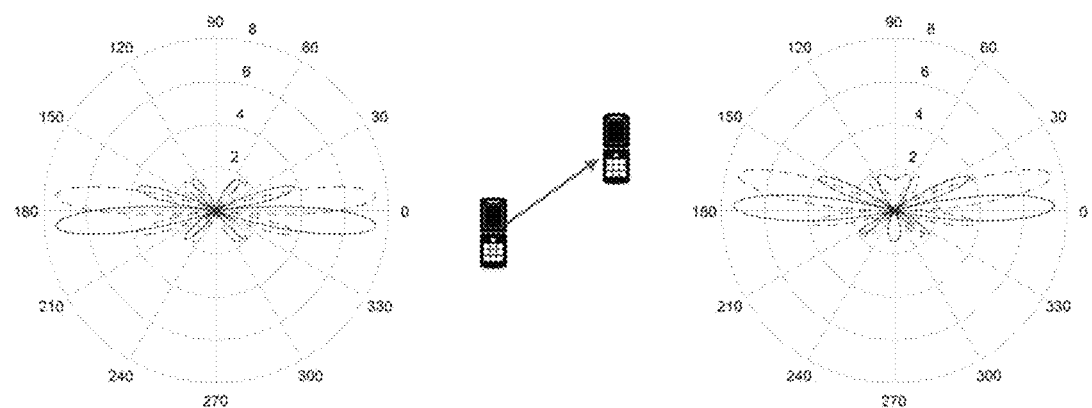
FIG. 14 is a diagram of beam patterns and a diagram of a mapping relationship before and after beam switching according to the fourth embodiment of the present disclosure.
Figure 14B:
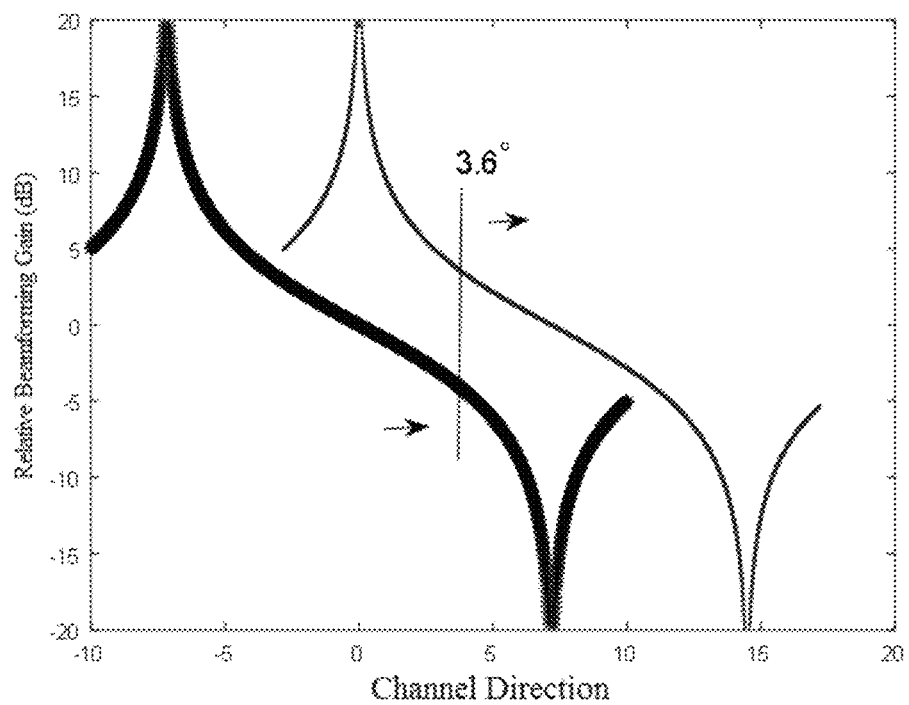

FIGS. 14A-14B are schematic diagrams showing the channel direction estimation according to the present embodiment performed before and after beam switching. For example, at the beginning, the base station can perform the channel direction estimation using a pair of combined beams as shown in the beam pattern on the left side of FIG. 14, and the mapping relationship between the relative beam gain and the channel direction as used is shown by the bold plot in FIG. 14B. When the movement of the user equipment causes the channel AOD to exceed, for example, 3.6°, the base station switches the transmitting beam used by its antenna arrays to ensure that the transmitting beam is aligned with the channel AoD and to maintain a high received SNR, while ensuring that the channel AoD falls in the vicinity of the transmitting beam so as to maintain a high accuracy of the channel AoD estimation. After performing the beam switching, the base station can perform the channel direction estimation using another pair of combined beams as shown in the beam pattern on the right side of FIG. 14A, the pair of combined beams being closer to the switched transmitting beam, and the base station can use the mapping relationship as shown by the thin line in FIG. 14B to estimate the channel direction.

In addition, the trigger condition of the beam switching may also be based on the predicted channel AoD direction. Specifically, in two consecutive slots $t_1$ and $t_2$, the base station transmits separately reference signals to perform the channel direction estimation according to the present embodiment, thereby estimating channel AoD directions of the two slots as $AoD_{t_1}$ and $AoD_{t_2}$, and the base station can obtain the angular velocity of the user's movement as follows $$v_a = \frac{AoD_{t_1} - AoD_{t_2}}{t_2 - t_1} \quad (17)$$

Based on the estimated user angular velocity $v_a$, the base station may predict the channel AoD estimate for the next slot as:

$$AoD_{t+1} = AoD_t + v_a \Delta_t \quad (18)$$

Where $\Delta_t$ is the time interval.

Based on the predicted channel AOD of the next slot, the base station can determine whether it is necessary to switch the beam of the antenna arrays.

In addition to beam tracking, the channel AOD estimation according to the present embodiment can also be applied to other scenarios.

As an example, multiple neighboring base stations may cooperatively estimate the channel direction of the same user equipment, and then the position of the user equipment is located by, for example, three-point positioning.

As another example, the base station may use the estimated results of the channel directions of multiple users for user scheduling, thereby avoiding scheduling the same communication resource for those users whose channel directions are close to each other, thereby reducing the inter-user interference.

In one example, if the transmitting side performs time division duplexing, it may set the channel AOD determined by the above channel direction estimation method as the channel AOA for beam reception.

Electronic Device and Communication Method at the Transmitting Side

An example of an electronic device at the transmitting side and a communication method thereof according to the fourth embodiment of the present disclosure will be described below with reference to FIGS. 15A and 15B.

Figure 15A:
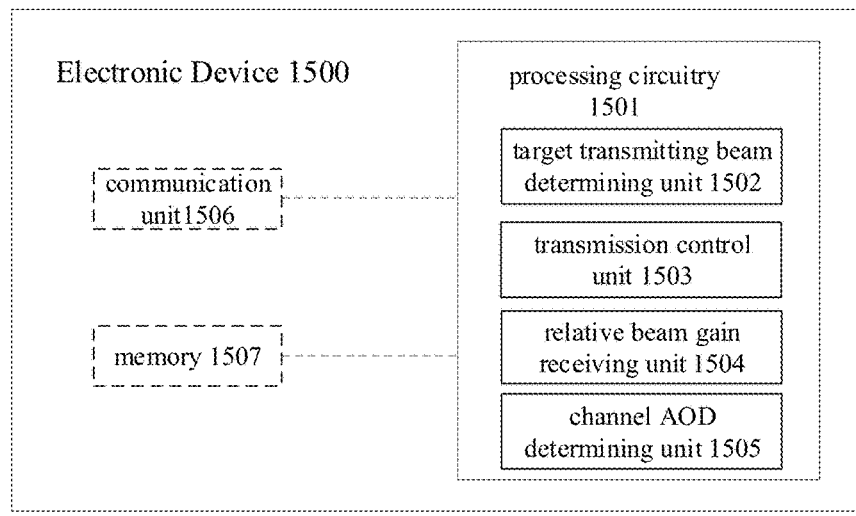
FIG. 15A is a block diagram of an electronic device at the transmitting side according to the fourth embodiment of the present disclosure.

FIG. 15A is a block diagram showing the configuration of an electronic device 1500 at the transmitting side according to the fourth embodiment. In the downlink transmission, the electronic device 1500 may be a base station such as an eNB, a gNB or the like, a drone control tower, or a component thereof, and in the uplink transmission, the electronic device 1500 may be, for example, a mobile phone, an in-vehicle communication device, a drone or the like, or a component thereof.

Figure 15B:
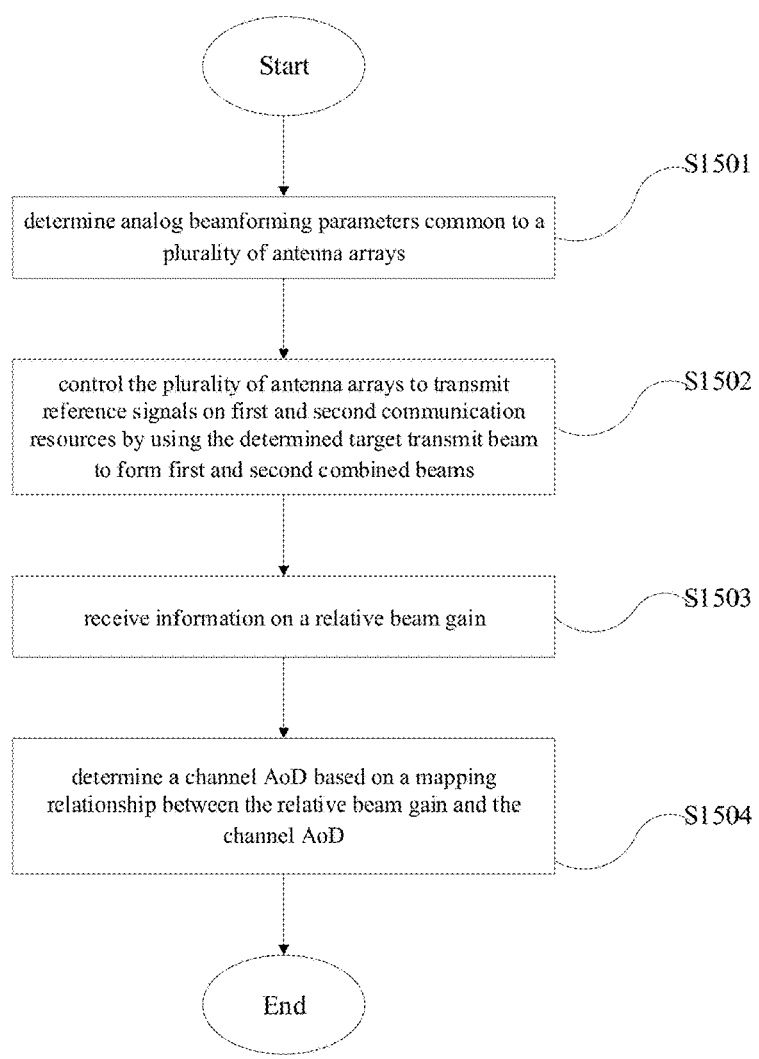
FIG. 15B is a flowchart of a communication method according to the fourth embodiment of the present disclosure.

As shown in FIG. 15A, the electronic device 1500 includes at least a processing circuitry 1501 that can be configured to perform the communication method as shown in FIG. 15B. Similarly to processing circuit 501, the processing circuitry 1501 can be implemented in a variety of ways.

The processing circuitry 1501 may include a target transmitting beam determining unit 1502, a transmission control unit 1503, a relative beam gain receiving unit 1504, and a channel AOD determining unit 1003.

The target transmitting beam determining unit 1502 is configured to determine a target transmitting beam to be used by the antenna arrays at the transmitting side (step S1501 in FIG. 15B). As an example, the target transmitting beam determination 1502 may select the optimum transmitting beam from a set of transmitting beams as the target transmitting beam by performing beam training. In this embodiment, all antenna arrays operate under the coherent beam selection type, i.e., all antenna arrays will use a common target transmitting beam. If the optimum transmitting beams selected for each of the antenna arrays as a result of the beam training are inconsistent, the target transmitting beam determination unit 1502 can make an overall consideration for the antenna arrays to determine a transmitting beam that is comparatively good for all antenna arrays. Once determined, the analog beamforming parameters corresponding to the common target transmitting beam can be used to configure the phase shifters of the antenna arrays.

The transmission control unit 1503 is configured to control the plurality of antenna arrays to transmit reference signals using the determined analog beamforming parameters (step S1502 in FIG. 15B). Here, the transmission control unit 1503 can control the transmission of at least two reference signals. The symbols of the reference signals are code division multiplexed using an orthogonal code matrix generated based on the basic compensation phase and the additional phase, and as a result of the code division multiplexing, a set of reference signal symbols to be transmitted on the first communication resource is adjusted to have different relative phases (which include the basic compensation phase and the additional phase) such that when they are transmitted by the corresponding antenna array(s), the transmitting beams formed by all of the antenna arrays can be combined into a single combined beam, and the direction of the combined beam is deviated from the target transmitting beam. A set of reference signal symbols to be transmitted on the second communication resource are applied with different relative phases from the previous set such that when they are transmitted by corresponding antenna array(s), the transmitting beams formed by all of the antenna arrays can be combined into a combined beam whose direction is different or even symmetric with the previous combined beam. In addition, the transmission control unit 1503 can also control the transmission of more combined beams having directions different from each other on other communication resources.

The relative beam gain receiving unit 1504 is configured to receive information on the relative beam gain from the receiving side (for example, the electronic device 1600 to be described below) (step S1503 in FIG. 15B). The relative beam gain represents a ratio of the two combined beams received at the receiving side. When multiple combined beams are received at the receiving side, two combined beams can be selected from them for calculating a relative beam gain therebetween. In one example, the receiving side can select two beams with the largest angular range to maximize the range of the channel AOD estimation. In another example, the receiving side may select two beams whose gain ratio exceeds a predetermined threshold to ensure the accuracy of the channel AOD estimation. The calculated relative beam gain can be quantized according to the required quantization accuracy and sent to the electronic device 1500 as a relative beam gain indicator. In one example, the relative beam gain indicator can be sent along with the channel state information.

The channel AOD determining unit 1505 is configured to determine the channel AOD using the information on the relative beam gain received by the relative beam gain receiving unit 1504 (step S1504 in FIG. 15B). The channel AOD determining unit 1505 can refer to a mapping table that records the mapping relationship between the relative beam gain and the channel AOD. Such mapping table may be multiple varying for different transmitting beams and is pre-stored at the transmitting side.

The electronic device 1500 may also include, for example, a communication unit 1506 and a memory 1507.

The communication unit 1506 can be configured to communicate with the receiving side under the control of the processing circuitry 1501. In one example, the communication unit 1506 can be implemented as a transceiver, including communication components such as the antenna arrays and/or radio frequency links as described above. The communication unit 1506 is depicted in dashed lines because it can also be located externally to the electronic device 1500.

The memory 1507 can store various information generated by the processing circuitry 1501 (e.g., the analog beamforming parameters corresponding to each of the transmitting beams in the transmitting beam set, the determination result by the target transmitting beam determining unit 1502, the orthogonal code matrix, the relative beam gain indicator received by the relative beam gain receiving unit 1504, the channel AOD determined by the channel AOD determining unit 1505, etc.), programs and data for operation of the electronic device 1500, data to be transmitted by the communication unit 1506, and the like. The memory 1507 is depicted in dashed lines as it may also be located within processing circuitry 1501 or externally to the electronic device 1500. The memory 1507 can be a volatile memory and/or a non-volatile memory. For example, memory 1507 can include, but is not limited to, a random access memory (RAM), a dynamic random access memory (DRAM), a static random access memory (SRAM), a read only memory (ROM) or a flash memory.

Electronic Device and Communication Method at the Receiving Side

An example of an electronic device at the receiving side and a communication method thereof according to the fourth embodiment of the present disclosure will be described below with reference to FIGS. 16A and 16B.

Figure 16A:
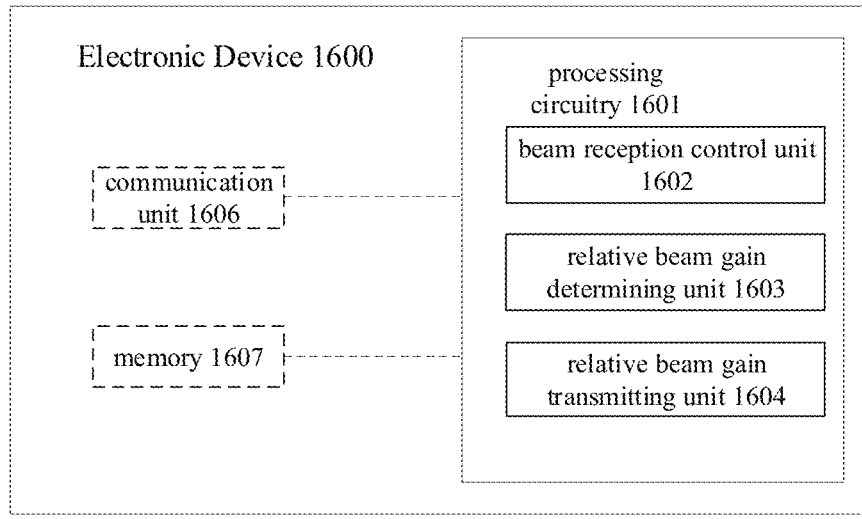
FIG. 16A is a block diagram of an electronic device at the receiving side according to the fourth embodiment of the present disclosure.

FIG. 16A is a block diagram showing the configuration of an electronic device 1600 at the receiving side according to the fourth embodiment. In the downlink transmission, the electronic device 1600 may be a user equipment such as a mobile phone, an in-vehicle communication device, a drone or the like, or a component thereof, and in the uplink transmission, the electronic device 1500 may be a base station such as an eNB or a gNB a drone control tower or the like, or a component thereof.

Figure 16B:
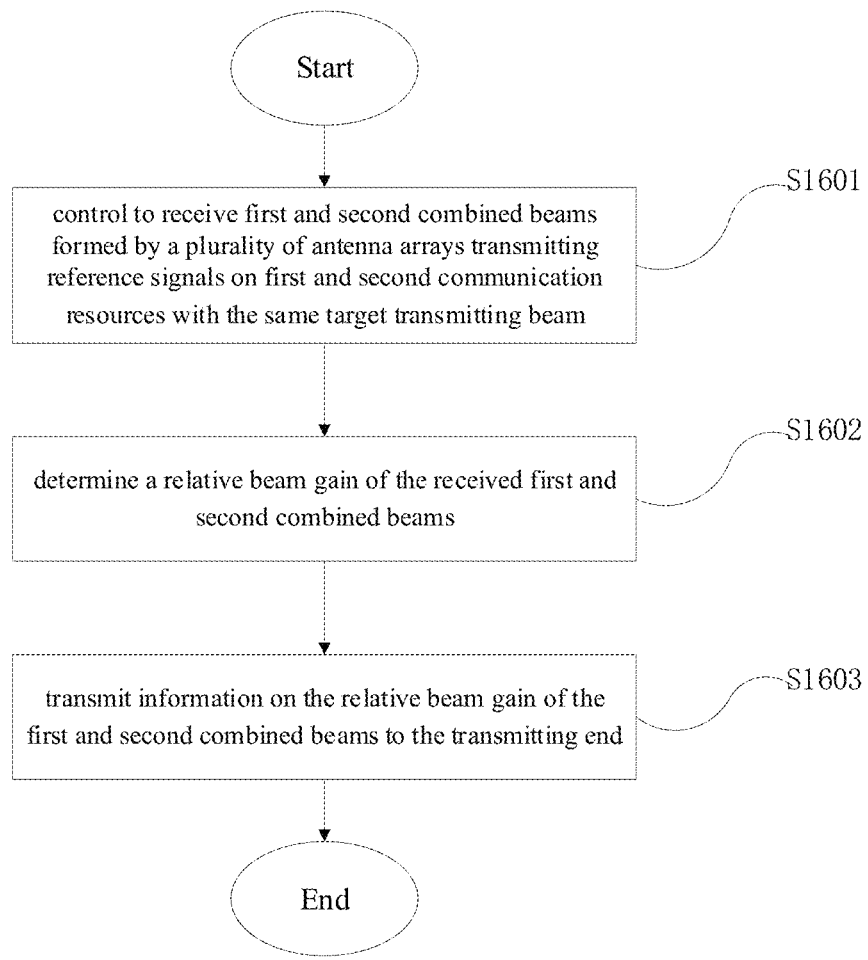
FIG. 16B is a flowchart of a communication method according to the fourth embodiment of the present disclosure.

As shown in FIG. 16A, the electronic device 1600 includes at least a processing circuitry 1601 that can be configured to perform the communication method as shown in FIG. 16B. Similarly to processing circuit 501, the processing circuitry 1601 can be implemented in a variety of ways.

The processing circuit 1601 may include a beam reception control unit 1602, a beam gain measuring unit 1603, and a relative beam gain transmitting unit 1604.

The beam reception control unit 1602 is configured to control the reception of a combined beam formed by transmitting reference signals by a plurality of antenna arrays using a common transmitting beam at a transmitting side (e.g., the electronic device 1500 as described above) on each communication resource (step S1601 in FIG. 16B). Here, at least two reference signals are generated by code division multiplexing using an orthogonal code matrix, and as a result of the code division multiplexing, a set of reference signal symbols transmitted on the first communication resource are adjusted to have respective relative phases constituted by a basic compensation phase and an additional phase such that when they are transmitted by corresponding antenna arrays, the transmitting beams formed by all of the transmitting antenna arrays are combined into a first combined beam, and the direction of the combined beam is deviated from the direction of the target transmitting beam. A set of reference signal symbols transmitted on the second communication resource are applied with different relative phases from the previous set such that when they are transmitted by corresponding antenna arrays, the transmitting beams formed by all of the transmitting antenna arrays are combined into a second combined beam with a direction different or even symmetric with the first combined beam. The beam reception control unit 1602 may also receive a third combined beam, a fourth combined beam and the like on a third communication resource, a fourth communication resource, or even more communication resources. These combined beams have different directions through the relative phase adjustment process with the orthogonal code matrix.

The relative beam gain determining unit 1602 is configured to determine the relative beam gain of the combined beams received by the beam reception control unit 1602 on each of the communication resources (step S1602 in FIG. 16B). The relative beam gain is a ratio of gains of the two combined beams. Since each combined beam is associated with a corresponding communication resource (such as time-frequency resource elements), the gains of the received beams on the particular two communication resources can be measured and the ratio therebetween is calculated. When the beam reception control unit 1602 receives more than two combined beams, the beam gain measuring unit 1602 may select two combined beams for calculating the relative beam gain, for example, according to the rang of the channel AOD estimation, the accuracy of the channel AOD estimation, and the like.

The relative beam gain transmitting unit 1603 is configured to transmit information on the relative beam gain to the transmitting side (step S1603 in FIG. 16B). Before being transmitted, the relative beam gain calculated by the relative beam gain determining unit 1602 may be quantized and/or encoded according to a preset quantization precision to generate a relative beam gain indicator (RBGI) indicating information on the relative beam gain. In one example, the relative beam gain indicator may occupy several bits (which depend on the quantization accuracy) in a signaling for transmitting channel state information to be transmitted to the transmitting side along with the channel state information. In another example, the relative beam gain indicator can be sent using a new signaling.

The electronic device 1600 may also include, for example, a communication unit 1606 and a memory 1607.

The communication unit 1606 can be configured to communicate with the receiving side under the control of the processing circuitry 1601. In one example, the communication unit 1606 can be implemented as a transmitter or transceiver, including communication components such as antenna arrays and/or radio frequency links as described above. The communication unit 1606 is depicted in dashed lines as it may also be located externally to the electronic device 1600.

The memory 1607 may store various information generated by the processing circuitry 1601 (e.g., information on the gains of the beams received by the beam reception control unit 1602, the relative beam gain determined by the relative beam gain determining unit 1603, or the relative beam gain indicator, etc.), programs and data for operation of the electronic device 1600, data to be transmitted by the communication unit 1606, and the like. The memory 1607 is depicted in dashed lines as it may also be located within the processing circuit 1601 or externally to the electronic device 1600. The memory 1607 can be a volatile memory and/or a non-volatile memory. For example, the memory 1607 can include, but is not limited to, a random access memory (RAM), a dynamic random access memory (DRAM), a static random access memory (SRAM), a read only memory (ROM) or a flash memory.

Modification Example

In the above fourth embodiment, it is described that the transmitting side implements the combining of beams with different directions by transmitting reference signals subjected to the code division multiplexing process (the relative phase adjustment), and based on a mapping relationship between the relative beam gain of the combined beams and the channel direction angle, the channel direction angle between the transmitting side and the receiving side is estimated accurately.

The inventive idea of the present disclosure is not limited to the specific implementation in the fourth embodiment, and may be embodied in various modifications.

Modifications according to the present disclosure will now be described with reference to the drawings.

Figure 17A:
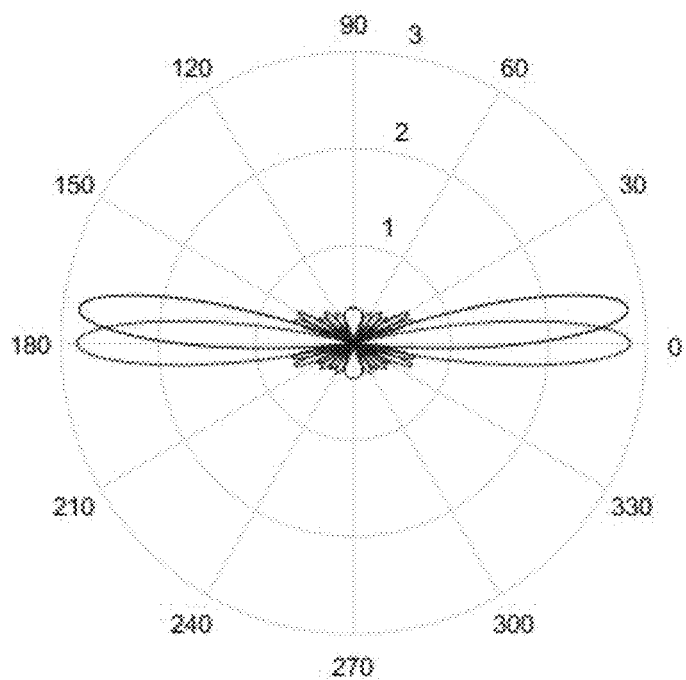
FIG. 17 is a diagram of transmitting beam patterns according to a modification embodiment of the present disclosure.

In a modification embodiment of the present disclosure, the transmitting side transmits two or more beams with different directions by beamforming. These beams with different directions may be formed by a single antenna array using different analog beamforming parameters, or may be formed by a plurality of antenna arrays using the same analog beamforming parameters as in the above third and fourth embodiments, or any other suitable way. FIG. 17A schematically shows a pattern of two transmitting beams. However, it will be appreciated that the number of beams transmitted by the transmitting side can be more than two. As shown in FIG. 17A, there are an overlapped portion in the propagation ranges of the two beams, so that in the overlapped portion, the receiving side can receive two beams simultaneously.

Figure 17B:
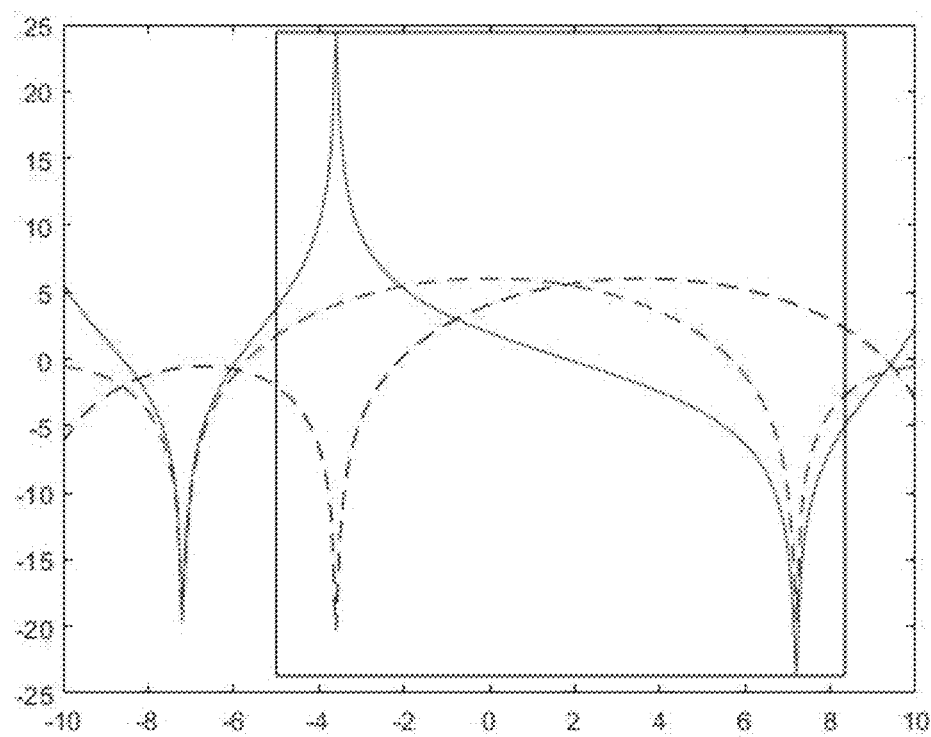

A transmitting beam formed by beamforming has a gain characteristic that depends on the transmission direction. The two broken lines in FIG. 17B show the curves of gains of the two beams in FIG. 17A as a function of the direction angle. As shown in FIG. 17B, the curves of beam gains of the two transmitting beams are offset from each other by an angle which is a difference between the transmit direction angles of the two beams.

The solid line in FIG. 17B shows a plot of the relative beam gain as a function of the direction angle between the two beams. As can be seen from FIG. 17B (see the box), the relative beam gain and the direction angle have a one-to-one mapping relationship in a range where the two beams are overlapped, i.e., between zero points of the two beams. Similar to the fourth embodiment, the estimation of channel direction (e.g., angle of arrival AOA) can be implemented based on such a one-to-one mapping relationship.

Figure 18:
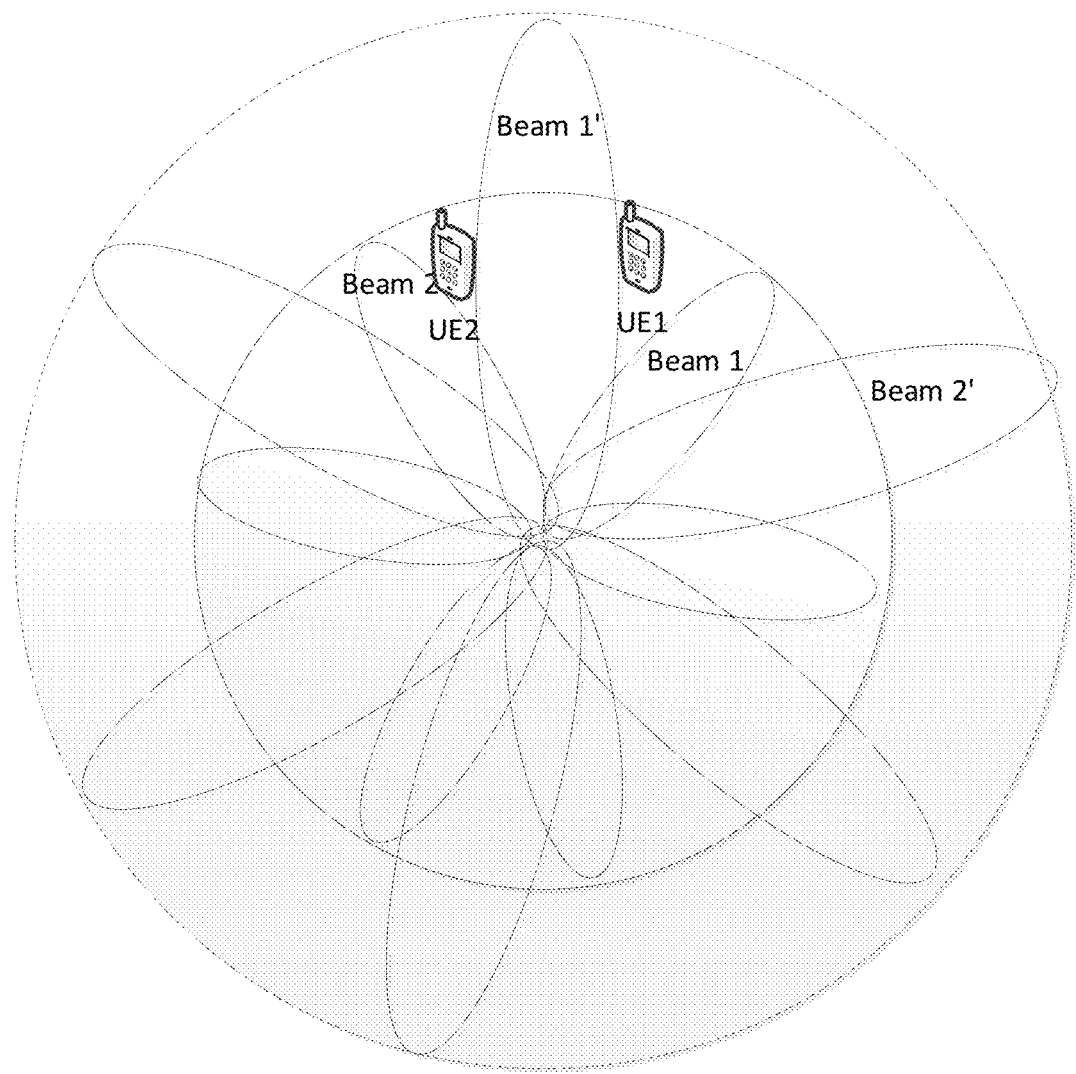
FIG. 18 is a graph of beam gains according to the modification embodiment of the present disclosure.

For example, FIG. 18 shows an example of a modification embodiment of the present disclosure. The transmitting side (such as a base station) can transmit beams for a plurality of reference signals toward an entire area or local areas. The gain or coverage of these beams can be designed as needed. FIG. 18 shows an example in which beams have different gains. In FIG. 18, solid circles indicate cell boundaries, and dotted circles indicate a boundary that the strongest beam can reach. Although FIG. 18 depicts the case where the beam gains are different, the beams can be designed to have the same gain.

As shown in FIG. 18, UE1 may receive Beam 1' as the strongest beam and receive Beam 1 as the second strongest beam in a region between Beam 1 and Beam 1'. Although UE1 may also receive other beams (e.g., receive Beam 2' through a reflection path, etc.), the gains of the other beams are smaller than Beam 1' and Beam 1. By reporting the received strongest and second strongest beams by UE1, the base station can determine that UE1 is in the region between Beam 1 and Beam 1'.

UE1 can also detect the beam gains of Beam 1 and Beam 1' and calculate the relative beam gain of them. For example, UE1 can calculate a ratio of gains of the strongest Beam 1' to the second strongest Beam 1. The larger the gain ratio is, the closer the UE1 is to Beam 1', otherwise the closer it is to Beam 1. The calculated relative beam gain can be represented as a relative beam gain indicator with a corresponding value after quantization and fed back to the base station. With the information on the relative beam gain fed back to the base station, the base station can determine an exact orientation of UE1 between Beam 1 and Beam 1', based on the mapping relationship between the direction angle and the relative beam gain (as in FIG. 17B).

Similarly, UE2 may receive Beam 1' as the strongest beam and receive Beam 2 as the second strongest beam, and provide information on the strongest beam, the second strongest beam, and the relative beam gain of them to the base station, thereby the base station is enabled to know that UE2 is between Beam 1' and Beam 2 and determines an exact orientation of UE2 between beam 2 and beam 1' based on the mapping relationship between the direction angle and the relative beam gain.

Therefore, the receiving side can estimate the channel direction angle by reporting at least the relative beam gain of the received two beams.

In one example, in order to estimate the channel direction angle, the receiving side may also report the identity information of the received two beams. The identity information may be, for example, the port of reference signal, the beam identity, information on communication resource(s) occupied by the beam, or the like. The identity information can also be any other information as long as it can be associated with the transmitting beam of the transmitting side.

The transmitting side may pre-store the mapping relationship between the relative beam gain and the channel direction angle, for example, in form of a mapping table. For example, in the example of FIG. 18, the transmitting side can store the mapping relationship between the relative beam gain of Beam 1' and Beam 1 and the direction angle between the two beams, so that when the relative beam gain from UE1 is received, which direction angle UE1 is at between Beam 1' and Beam 1 is determined based on the mapping relationship. Similarly, the transmitting side can also store the mapping relationship between the relative beam gain of Beam 1' and Beam 2 and the direction angle between the two beams, and so on.

The transmitting side may further store information on each transmitting beam, so that the transmitting side can determine the transmitting beam associated with the receiving side and its transmitting direction from the identity information fed back from the receiving side. For example, in the example of FIG. 18, the transmitting side may determine Beam 1' and Beam 1 from the identity information of the strongest beam and the second strongest beam reported by UE1, so as to determine that UE1 is between Beam 1' and Beam 1, and to call the mapping table of the relative beam gain and direction angles of the two beams.

In the above manner, the transmitting side may only need to transmit two or more beams for reference signals to at least the area where the receiving side is located, and conveniently determine the channel direction between the receiving side and the transmitting side (e.g., channel AOA) with the receiving side obtaining and feeding back the identity information on the beams and the relative beam gain information.

Figure 19:
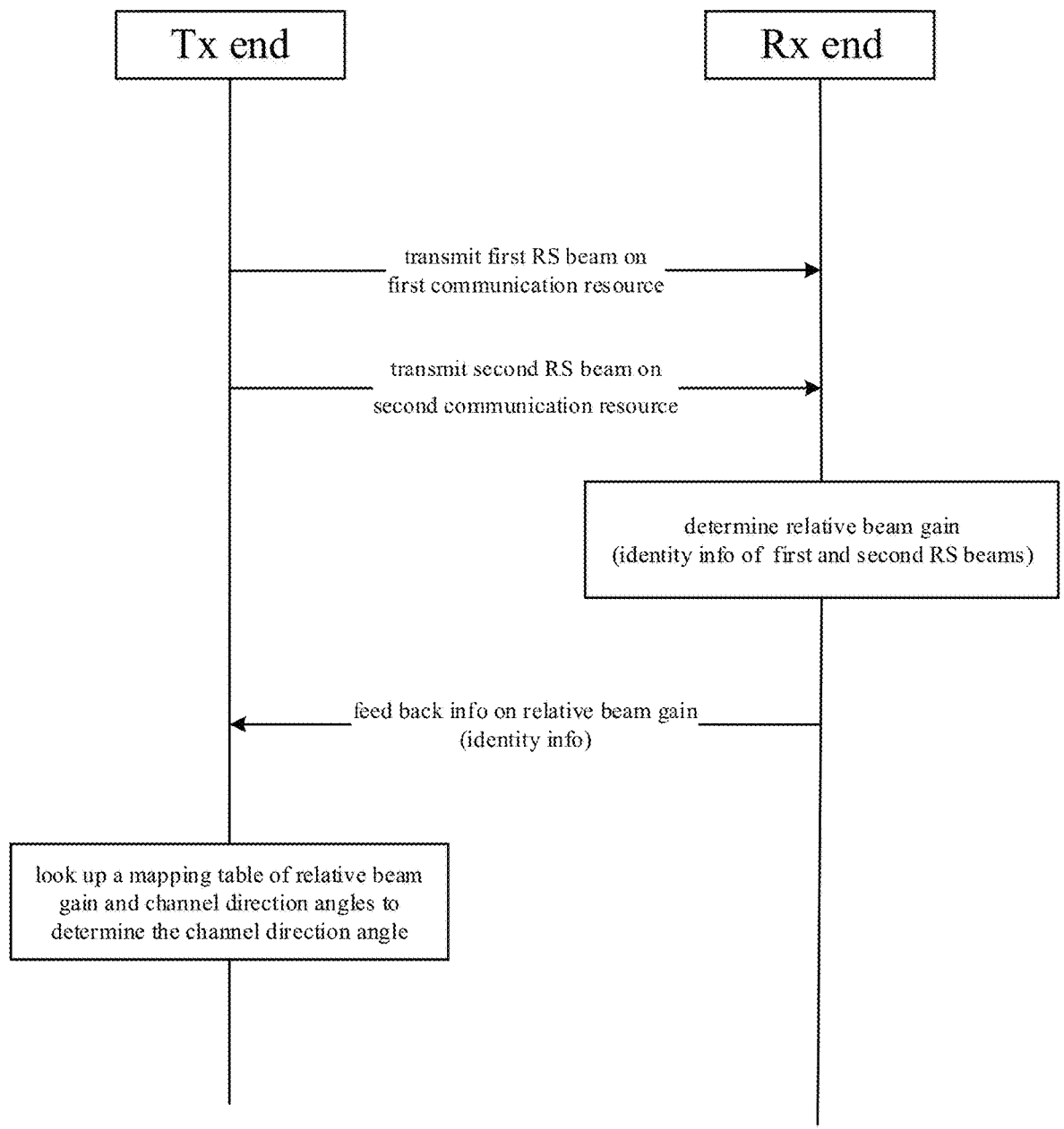
FIG. 19 is a communication flowchart according to the modification embodiment of the present disclosure.

FIG. 19 is a communication flow according to the modification embodiment. As shown in FIG. 19, the transmitting side transmits a first reference signal beam by beamforming on a first communication resource (e.g., time-frequency resource elements) and a second reference signal beam by beamforming on a second communication resource. The two reference signal beams have different directions. In one example, the transmitting side can transmit reference signals using different analog beamforming parameters to form reference signal beams such that the beams point to different transmission directions. In another example, the transmitting side can transmit reference signals subjected to the relative phase adjustment by using a plurality of antenna arrays with the same analog beamforming parameters as in the third and fourth embodiments so as to form reference signal beams having different directions.

Preferably, the transmission directions of the first and second reference signal beams (e.g., the analog beamforming parameters for forming the two beams, the parameters for the relative phase adjustment, etc.) are determined, so that the receiving side is between the two reference signal beams and is able to receive the two reference signal beams.

In addition, the transmitting side can also transmit more reference signal beams on more communication resources, for example, to cover a larger range.

The receiving side receives the first reference signal beam and the second reference signal beam as the strongest and second strongest receiving beams, and calculates a relative beam gain of them. For example, the receiving side can detect the reference signal received power (RSRP) of the two received beams and calculate the ratio. The calculated relative beam gain can be quantized according to the required quantization accuracy.

The receiving side may also determine identity information of the first reference signal beam and the second reference signal beam.

The receiving side then feeds back the determined relative beam gain (and the identity information of the reference signal beams, if any) to the transmitting side. The relative beam gain information and/or identity information can be used to determine the channel direction of the receiving side, such as the signal arrival angle.

The operations performed by the transmitting side and the receiving side as briefly described above may be implemented, for example, by electronic devices having a processing circuitry. For example, it may be implemented cooperatively by all or a part of the units of the electronic device 1500 including the processing circuitry 1501 or the electronic device 1600 including the processing circuitry 1601.

Various aspects of embodiments of the present disclosure have been described in detail above, but it will be appreciated that the structure, arrangement, type, number and the like of antenna arrays, ports, reference signals, communication devices, communication methods and the like are illustrated for purpose of description, and are not intended to limit the aspects of the present disclosure to these specific examples.

It will be appreciated that the respective units of the electronic devices 500, 700, 1000, 1500, 1600 described in the above embodiments are only logical modules divided according to specific functions implemented by them, and are not intended to limit specific implementations. In an actual implementation, each of the above units may be implemented as separate physical entities, or may also be implemented by a single entity (e.g., a processor (CPU or DSP, etc.), an integrated circuit, etc.).

Application Example of the Present Disclosure

The technology described in the present disclosure can be applied to various products.

For example, the electronic device 500, 700, 1000, 1500 or 1600 according to the embodiments of the present disclosure may be implemented as various base stations or stalled in various base stations, or may be implemented as various user equipments or stalled in various user equipments. The communication methods according to the embodiments of the present disclosure can be implemented by various base stations or user equipments.

The base station as described in the present disclosure may be implemented as any type of base stations, preferably, such as the macro gNB or the small gNB in the NR (New Radio) access technology of the 3GPP 5G communication standard. A small gNB may be an gNB that covers a cell smaller than a macro cell, such as a pico gNB, micro gNB, and home (femto) gNB. Instead, the base station may be implemented as any other types of base stations such as a NodeB, eNodeB and a base transceiver station (BTS). The base station may include a main body configured to control wireless communication, and one or more remote radio heads (RRH), a wirelesss relay, a drone control tower or the like disposed in a different place from the main body.

The user equipment may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The user equipment may also be implemented as a terminal (that is also referred to as a machine type communication (MTC) terminal) that performs machine-to-machine (M2M) communication, a drone or the like. Furthermore, the user equipment may be a wireless communication module (such as an integrated circuit module including a single die) mounted on each of the above terminals.

1. Application Examples of the Base Station

It will be appreciated that as used in the present disclosure, the term "base station" has the entire breadth in its generic sense, and includes at least the wireless communication station used as a wireless communication system or a portion of a wireless communication system for purpose of communication. Examples of the base station can be for example but is not limited to the following: either or both of the base transceiver station (BTS) and the base station controller (BSC) in the GSM system; either or both of the radio network controller (RNC) or NodeB in the 3G communication system; eNB in the LTE and LTE-Advanced system; corresponding network nodes in future communication systems (for example, the gNB possibly appearing in the 5G communication system, or the like). In communication scenarios such as D2D, M2M and V2V, a logical entity having a control function over the communication can be referred to a base station. In the scenario of cognitive radio communication, a logical entity having a function of frequency spectrum coordination can also be referred to a base station.

First Application Example

Figure 20:
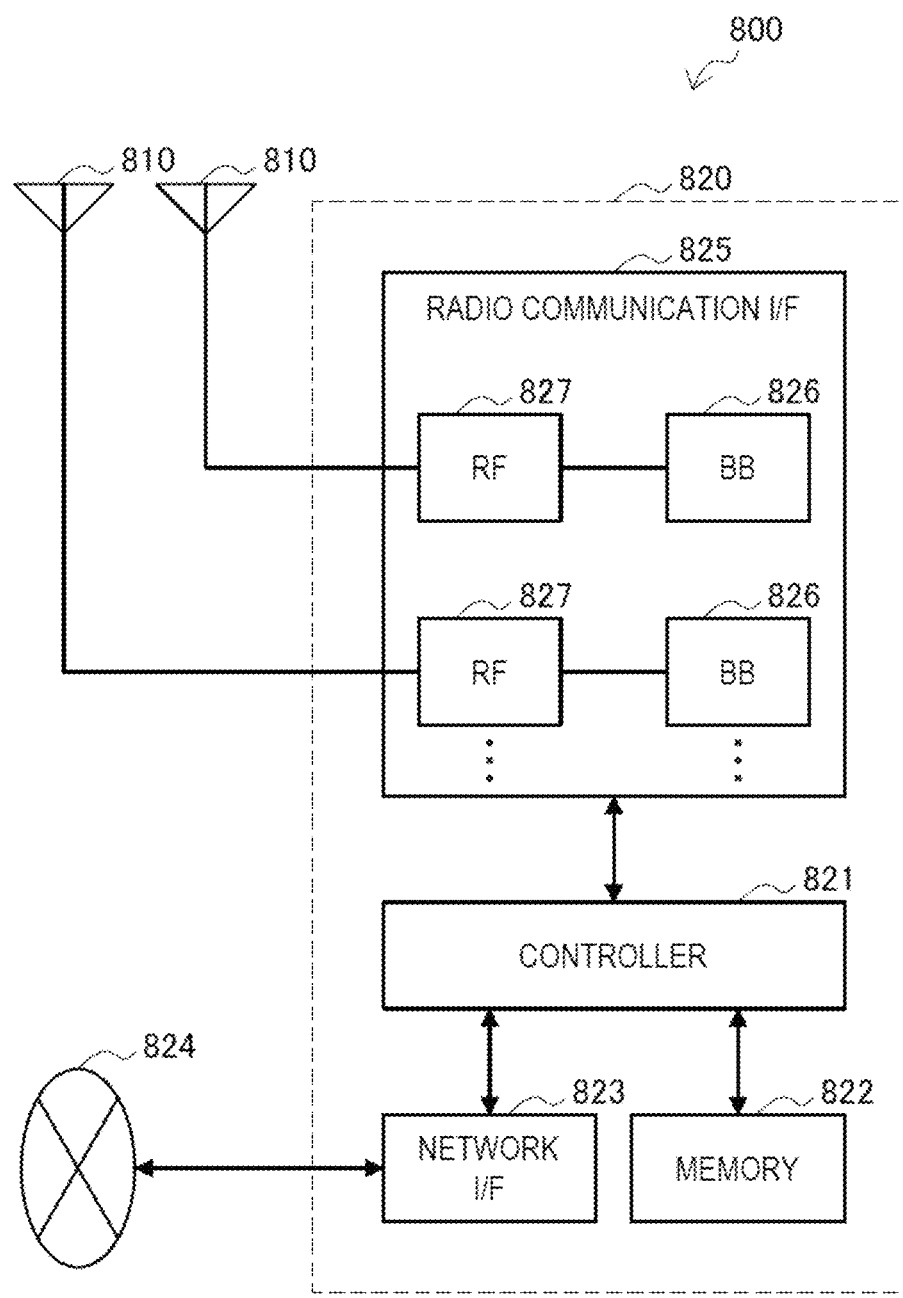
FIG. 20 is a block diagram showing a first application example of schematic configuration of the base station.

FIG. 20 is a block diagram illustrating a first example of a schematic configuration of the base station to which a technology of the present application may be applied. In the downlink transmission, the base station may be implemented as a device at the transmitting side, such as the electronic device 500, 700, 1000 or 1500, or in the uplink transmission, the base station may be implemented as a device at the receiving side, such as the electronic device 1600. In FIG. 20, the base station is illustrated as an gNB 800. The gNB 800 includes a plurality of antennas 810 and a base station device 820. The base station device 820 and each antenna 810 may be connected with each other via a RF cable.

The antennas 810 may include multiple antenna arrays arranged according to FIGS. 3A-3B, which includes multiple antenna elements (such as multiple antenna elements included in a Multiple Input and Multiple Output (MIMO) antennas), and is used for the base station 820 to transmit and receive radio signals. The gNB 800 may include multiple antennas 810, as illustrated in FIG. 20. For example, the multiple antennas 810 may be compatible with multiple frequency bands used by the gNB 800. FIG. 20 illustrates the example in which the gNB 800 includes multiple antennas 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 may include the processing circuitry 301 or 601 as described above, perform the communication method as described in the above first to fourth embodiments, or control the components of the electronic device 500, 700, 1000, 1500 or 1600. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an gNB or a core network node in the vicinity. The memory 822 includes RAM and ROM, and stores a program that is executed by the controller 821, and various types of control data such as a terminal list, transmission power data, and scheduling data.

The network interface 823 is a communication interface for connecting the base station device 820 to a core network 824. The controller 821 may communicate with a core network node or another gNB via the network interface 823. In that case, the gNB 800, and the core network node or the other gNB may be connected to each other through a logical interface such as an S1 interface and an X2 interface. The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE), LTE-Advanced or NR, and provides radio connection to a terminal positioned in a cell of the gNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers such as L1, medium access control (MAC), radio link control (RLC), and a packet data convergence protocol (PDCP). The BB processor 826 may have a part or all of the above-described logical functions instead of the controller 821. The BB processor 826 may be a memory that stores a communication control program, or a module that includes a processor configured to execute the program and a related circuit. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 20. For example, the multiple BB processors 826 may be compatible with multiple frequency bands used by the gNB 800. The radio communication interface 825 may include the multiple RF circuits 827, as illustrated in FIG. 20. For example, the multiple RF circuits 827 may be compatible with multiple antenna elements. Although FIG. 20 illustrates the example in which the radio communication interface 825 includes the multiple BB processors 826 and the multiple RF circuits 827, the radio communication interface 825 may also include a single BB processor 826 or a single RF circuit 827.

In the gNB 800 illustrated in FIG. 20, one or more of the units (for example, the transmission control unit 504 of the processing circuitry 501, the transmission control unit 1003 of the processing circuitry 1001, the transmission control unit 1503 of the processing circuitry 1501, or the beam reception control unit 1602 of the processing circuitry 1601) included in the processing circuitry 501, 701, 1001, 1501 or 1601 described with reference to FIG. 5A, 7A, 10A, 15A or 16A may be implemented in the radio communication interface 825. Alternatively, at least a part of these components may be implemented in the controller 821. As an example, the gNB 800 includes a part (for example, the BB processor 826) or the entire of the radio communication interface 825 and/or a module including the controller 821, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 800, and the radio communication interface 825 (for example, the BB processor 826) and/or the controller 821 may execute the program. As described above, as a device including the one or more components, the gNB 800, the base station device 820 or the module may be provided. In addition, a readable medium in which the program is recorded may be provided.

Second Application Example

Figure 21:
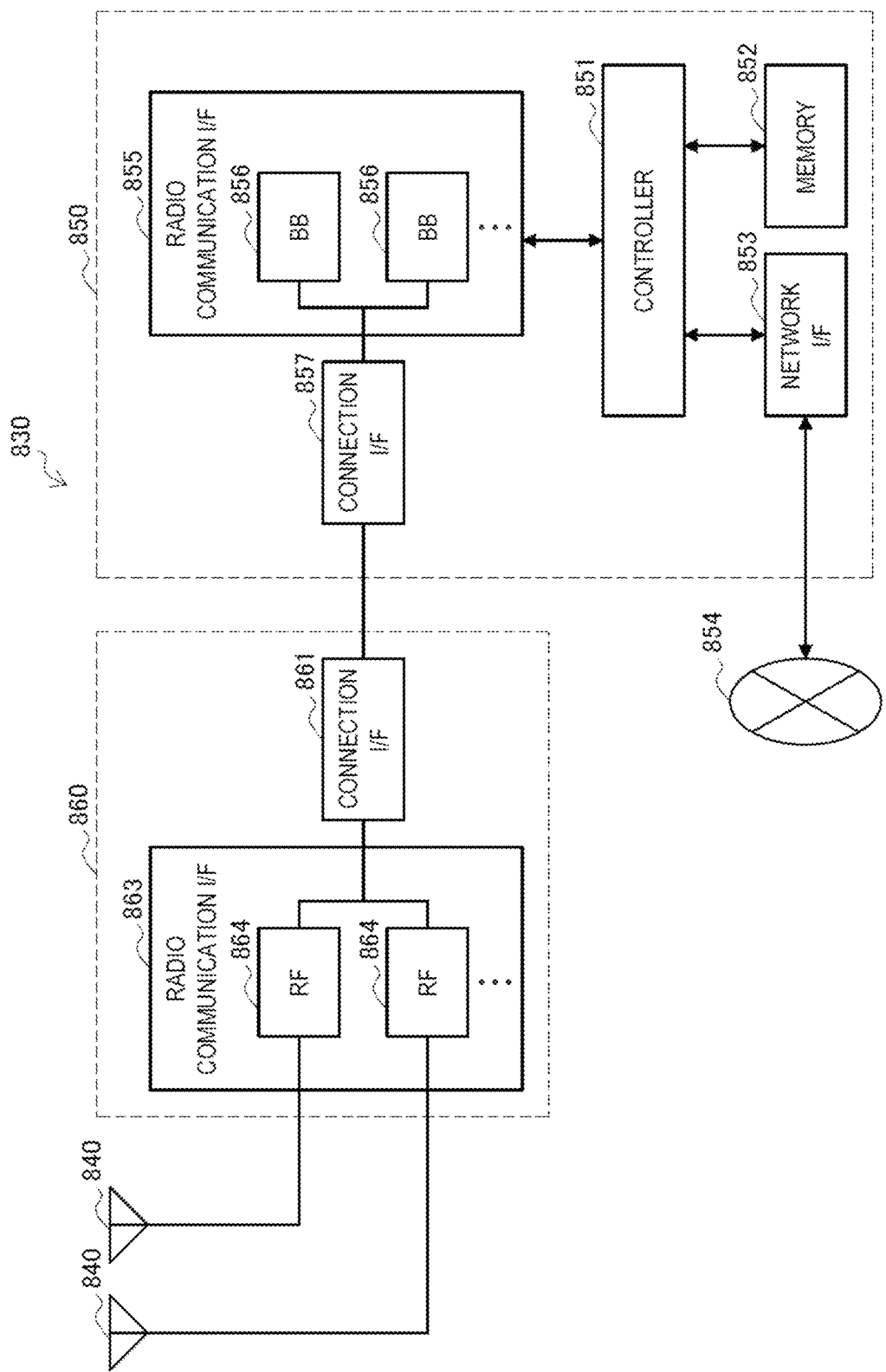
FIG. 21 is a block diagram showing a second application example of schematic configuration of the base station.

FIG. 21 is a block diagram illustrating a second example of a schematic configuration of the base station to which a technology of the present application may be applied. In the downlink transmission, the base station may be implemented as a device at the transmitting side, such as the electronic device 500, 700, 1000 or 1500, or in the uplink transmission, the base station may be implemented as a device at the receiving side, such as the electronic device 1600. In FIG. 21, the base station is illustrated as gNB 830. The gNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

The antennas 840 includes multiple antenna arrays arranged according to FIGS. 3A-3B, and the antenna array includes multiple antenna elements such as multiple antenna elements included in an MIMO antenna and is used for the RRH 860 to transmit and receive radio signals. The gNB 830 may include multiple antennas 840, as illustrated in FIG. 21. For example, multiple antennas 840 may be compatible with multiple frequency bands used by the gNB 830. FIG. 21 illustrates an example in which the gNB 830 includes multiple antennas 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 20.

The radio communication interface 855 supports any cellular communication scheme such as LTE, LTE-Advanced or NR, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 20, except the BB processor 856 is connected to the RF circuit 864 of the RRH 860 via the connection interface 857. The radio communication interface 855 may include the multiple BB processors 856, as illustrated in FIG. 21. For example, multiple BB processors 856 may be compatible with multiple frequency bands used by the gNB 830. Although FIG. 21 illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 21. For example, multiple RF circuits 864 may support multiple antenna elements. Although FIG. 21 illustrates the example in which the radio communication interface 863 includes the multiple RF circuits 864, the radio communication interface 863 may also include a single RF circuit 864.

In the gNB 830 illustrated in FIG. 21, one or more of the units (for example, the transmission control unit 504 of the processing circuitry 501, the transmission control unit 1003 of the processing circuitry 1001, the transmission control unit 1503 of the processing circuitry 1501, or the beam reception control unit 1602 of the processing circuitry 1601) included in the processing circuitry 501, 701, 1001, 1501 or 1601 described with reference to FIG. 5A, 7A, 10A, 15A or 16A may be implemented in the radio communication interface 855. Alternatively, at least a part of these components may be implemented in the controller 851. As an example, the gNB 830 include a part (for example, the BB processor 856) or the entire of the radio communication interface 855 and/or a module including the controller 851, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 830, and the radio communication interface 855 (for example, the BB processor 856) and/or the controller 851 may execute the program. As described above, as a device including the one or more components, the gNB 830, the base station device 850 or the module may be provided. A program causing the processor to function as the one or more components may also be provided. In addition, a readable medium in which the program is recorded may be provided.

2. Application Example of the User Equipment

First Application Example

Figure 22:
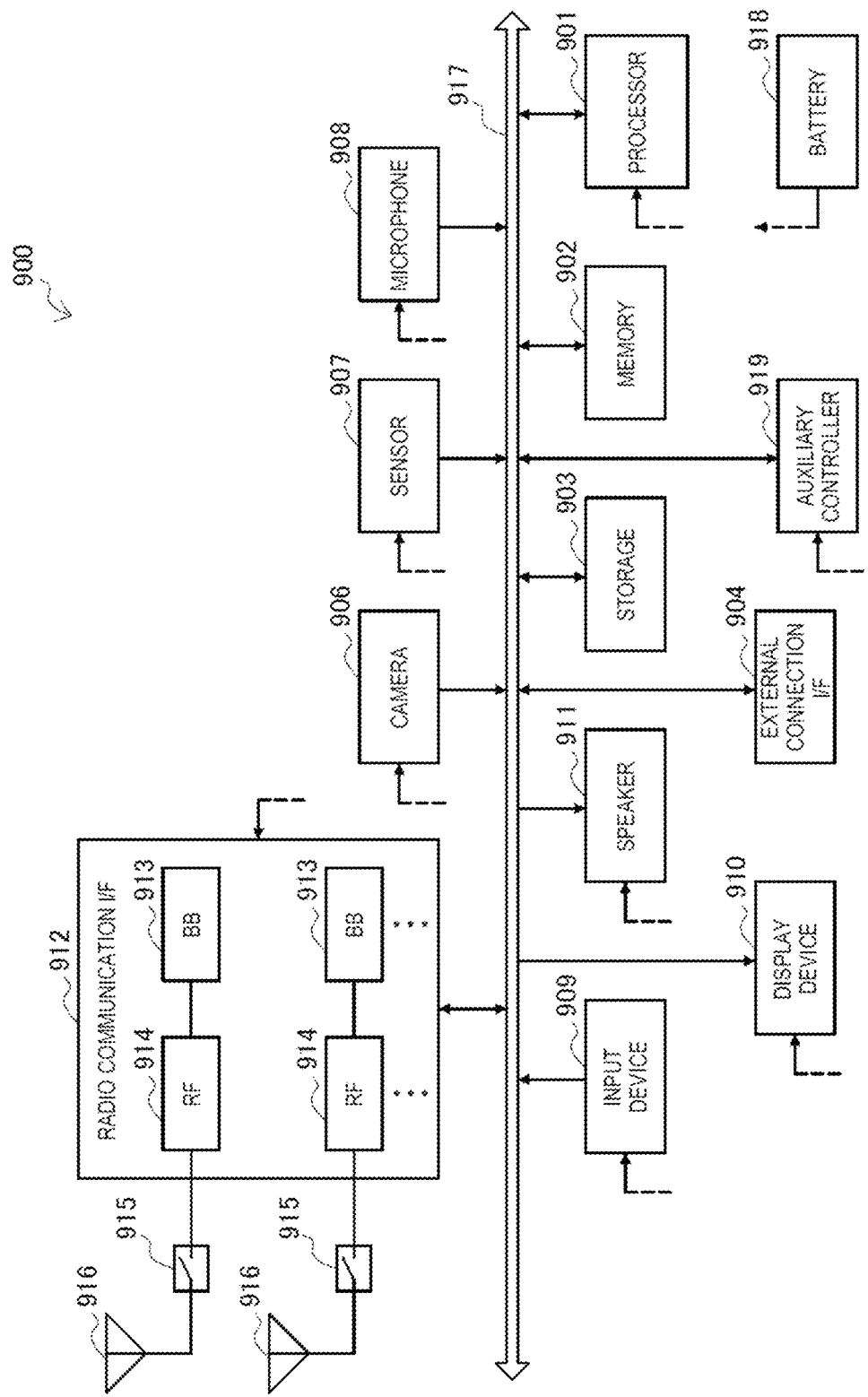
FIG. 22 is a block diagram showing an example of schematic configuration of a smart phone.

FIG. 22 is a block diagram illustrating an example of a schematic configuration of a smartphone 900 to which a technology of the present application may be applied. In the downlink transmission, the smartphone 900 may be implemented as the electronic device 1600 as described with reference to FIG. 16A, and in the uplink transmission, the smartphone 900 may be implemented as the electronic device 500, 700, 1000 or 1500 as described in FIG. 5A, 7A, 10A or 15A. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and the other layers of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts the sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE, LTE-Advanced or NR, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that integrates the BB processor 913 and the RF circuit 914 thereon. The radio communication interface 912 may include multiple BB processors 913 and multiple RF circuits 914, as illustrated in FIG. 22. Although FIG. 22 illustrates the example in which the radio communication interface 912 includes multiple BB processors 913 and multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a wireless local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

The antennas 916 may include multiple antenna arrays arranged according to FIGS. 3A-3B, and each of the antennas 916 includes multiple antenna elements such as multiple antenna elements included in an MIMO antenna, and is used for the radio communication interface 912 to transmit and receive radio signals. The smartphone 900 may include multiple antennas 916, as illustrated in FIG. 22. Although FIG. 22 illustrates the example in which the smartphone 900 includes multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 22 via feeder lines, which are partially shown as dashed lines in the figure. The auxiliary controller 919 operates a minimum necessary function of the smartphone 900, for example, in a sleep mode.

In the smartphone 900 illustrated in FIG. 22, one or more of the components (for example, the transmission control unit 504 of the processing circuitry 501, the transmission control unit 1003 of the processing circuitry 1001, the transmission control unit 1503 of the processing circuitry 1501, or the beam reception control unit 1602 of the processing circuitry 1601) included in the processing circuitry 501, 701, 1001, 1501 or 1601 described with reference to FIG. 5A, 7A, 10A, 15A or 16A may be implemented in the radio communication interface 912. Alternatively, at least a part of these components may also be implemented in the processor 901 or the auxiliary controller 919. As an example, the smartphone 900 include a part (for example, the BB processor 913) or the entire of the radio communication interface 912, and/or a module including the processor 901 and/or the auxiliary controller 919, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the smartphone 900, and the radio communication interface 912 (for example, the BB processor 913), the processor 901 and/or the auxiliary controller 919 may execute the program. As described above, as a device including the one or more components, the smartphone 900 or the module may be provided. A program causing the processor to function as the one or more components may also be provided. In addition, a readable medium in which the program is recorded may be provided.

In addition, in the smartphone 900 illustrated in FIG. 22, for example, the communication unit 505 of the electronic device 500, the communication unit 705 of the electronic device 700, the communication unit 1506 of the electronic device 1500 or the communication unit 1605 of the electronic device 1600 may be implemented in the radio communication interface 912, for example, the RF circuit 914.

Second Application Example

Figure 23:
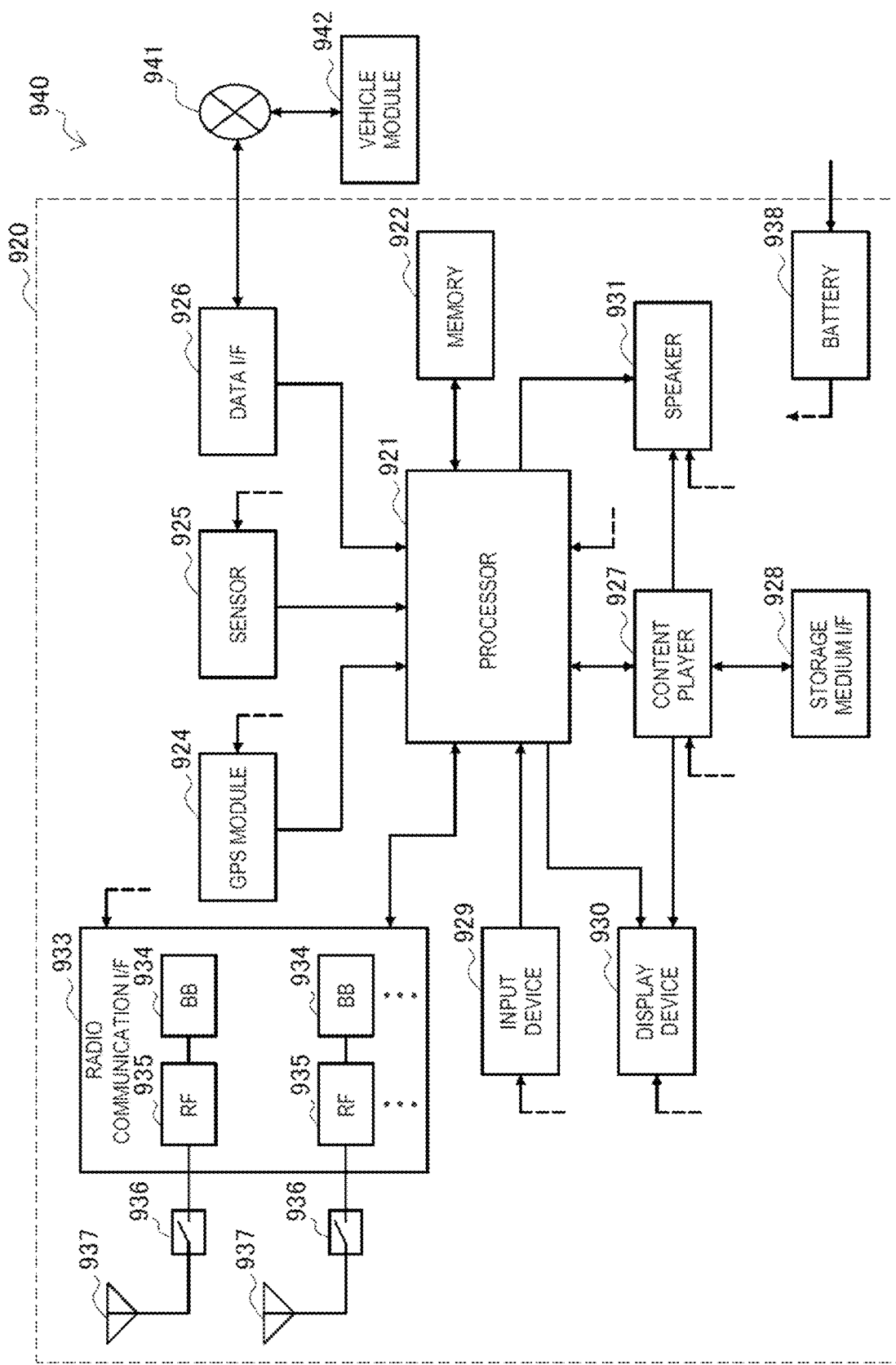
FIG. 23 is a block diagram showing an example of schematic configuration of an automobile navigation device.

FIG. 23 is a block diagram illustrating an example of a schematic configuration of a car navigation device 920 to which an embodiment of the technology of the present application may be applied. Wherein the car navigation device 920 can be implemented as the electronic device 500, 700, 1000, 1500 or 1600 described with reference to the figures. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and other functions of the car navigation device 920. The memory 922 includes RAM and ROM, and stores a program that is executed by the processor 921, and data.

The GPS module 924 uses GPS signals received from a GPS satellite to measure a position, such as latitude, longitude, and altitude, of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium, such as a CD and a DVD, that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme, such as LTE, LTE-A or NR, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module which integrates the BB processor 934 and the RF circuit 935 thereon. The radio communication interface 933 may include multiple BB processors 934 and multiple RF circuits 935, as illustrated in FIG. 23. Although FIG. 23 illustrates the example in which the radio communication interface 933 includes multiple BB processors 934 and multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a wireless LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

The antennas 937 may include multiple antenna arrays arranged according to FIGS. 3A-3B, and each of the antennas 937 includes multiple antenna elements, such as multiple antenna elements included in an MIMO antenna, and is used for the radio communication interface 933 to transmit and receive radio signals. The car navigation device 920 may include the multiple antennas 937, as illustrated in FIG. 23. Although FIG. 23 illustrates the example in which the car navigation device 920 includes multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 23 via feeder lines that are partially shown as dashed lines in the figure. The battery 938 accumulates power supplied from the vehicle.

In the car navigation device 920 illustrated in FIG. 23, one or more of the components (for example, the transmission control unit 504 of the processing circuitry 501, the transmission control unit 1003 of the processing circuitry 1001, the transmission control unit 1503 of the processing circuitry 1501, or the beam reception control unit 1602 of the processing circuitry 1601) included in the processing circuitry 501, 701, 1001, 1501 or 1601 described with reference to the figures may be implemented in the radio communication interface 933. Alternatively, at least a part of these components may also be implemented in the processor 921. As an example, the car navigation device 920 includes a part (for example, the BB processor 934) or the entire of the radio communication interface 933 and/or a module including the processor 921, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the car navigation device 920, and the radio communication interface 933 (for example, the BB processor 934) and/or the processor 921 may execute the program. As described above, as a device including the one or more components, the car navigation device 920 or the module may be provided. A program causing the processor to function as the one or more components may also be provided. In addition, a readable medium in which the program is recorded may be provided.

In addition, in the car navigation device 920 illustrated in FIG. 23, for example, the communication unit 505, 705, 1005, 1506 or 1605 described with reference to the figures may be implemented in the radio communication interface 933, for example, the RF circuit 935.

Technology of the present application may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

In addition, readable medium recording programs therein can be provided. Therefore, the present disclosure further relates to a computer readable storage medium, storing a program including instructions thereon, which are used to perform the communication method as described with reference to FIG. 5B, 7B, 10B, 15B or 16B when loaded and executed by a processing circuitry.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device at a transmitting side, comprising a processing circuitry configured to:
    determine a target channel direction corresponding to a direction from a location of the electronic device to a target device,
    determine basic compensation phase information for a plurality of antenna arrays with respect to the target channel direction, wherein the basic compensation phase information, which is based on distance intervals between antenna elements in each of the plurality of antenna arrays and distance intervals between antenna arrays of the plurality of antenna arrays, indicates phase differences compensated for each of the plurality of antenna arrays such that beams transmitted by the plurality of antenna arrays can be combined into a single combined beam which has the same direction as the target channel direction, and
    control the plurality of antenna arrays to transmit beams based on the target channel direction and the basic compensation phase information.

2. The electronic device according to claim 1, wherein the target channel direction is determined by a beam training between the transmitting side and a receiving side.

3. The electronic device according to claim 1, wherein the plurality of antenna arrays each transmit the beams by using analog beamforming parameters corresponding to the target channel direction.

4. An electronic device at a transmitting side, comprising a processing circuitry configured to:
    determine common analog beamforming parameters for a plurality of antenna arrays, each antenna array forming a beam pointing to a particular channel direction based on the common analog beamforming parameters, the common analog beamforming parameters including phase setting parameters of phase shifters corresponding to antenna elements of the plurality of antenna arrays, and
    determine, based on phase differences between corresponding antenna elements of the plurality of antenna arrays, a relative phase adjustment for baseband signals of the plurality of antenna arrays so as to adjust a direction of a combined beam resulting from a combination of transmitting beams formed by the plurality of antenna arrays with the common analog beamforming parameters.

5. The electronic device according to claim 4, wherein the processing circuitry is further configured to change the direction of the combined beam by changing the relative phase adjustment for baseband signals, so as to fit a change in channel direction between the transmitting side and a receiving side.

6. The electronic device according to claim 4, wherein the processing circuitry is further configured to form a first combined beam with a first relative phase adjustment and a second combined beam with a second relative phase adjustment, respectively, which are symmetric about the particular channel direction, and to determine a channel direction between the transmitting side and a receiving side based on a comparison between beam gains of the first combined beam and the second combined beam at the receiving side.

7. The electronic device according to claim 6, wherein an angle between the particular channel direction and the channel direction between the transmitting side and the receiving side is smaller than a predetermined threshold.

8. The electronic device according to claim 7, wherein the processing circuitry is further configured to determine, based on the channel direction between the transmitting side and the receiving side, the analog beamforming parameters for serving data transmission of the receiving side, such that a beam direction corresponding to the analog beamforming parameters is close to the channel direction.

9. An electronic device at a transmitting side, comprising:
a processing circuitry, configured to
perform a code division multiplexing on reference signals for a plurality of ports with an orthogonal code matrix, and
control a plurality of antenna arrays to transmit the code division multiplexed reference signals on a first communication resource and a second communication resource with same analog beamforming parameters, so as to form a first combined beam and a second combined beam,
wherein the first combined beam and the second combined beam are symmetric about a particular transmitting beam corresponding to the analog beamforming parameters.

10. The electronic device according to claim 9, wherein the orthogonal code matrix is generated based on basic compensation phase information indicating phase differences compensated for each of the plurality of antenna arrays such that beams transmitted by the plurality of antenna arrays can be combined into a single combined beam and additional information used for adjusting a direction angle of the single combine beam with respect to the transmitting beam corresponding to the analog beamforming parameters.

11. The electronic device according to claim 9, wherein the orthogonal code matrix $C_M = C_M^b \odot C_M^r$, where $C_M$, $C_M^b$ and $C_M^r$ are matrices of M×M, and M represents the number of ports,
wherein each of elements of the basic compensation phase matrix $C_M^b$ indicates a phase difference compensated for an antenna array corresponding to each port, and the additional phase matrix $C_M^r$ is a matrix for adjusting direction angles of the first and second combined beams with respect to the transmitting beam, and $\odot$ is an operation of multiplying corresponding elements of matrices.

12. The electronic device according to claim 11, wherein the basic compensation phase matrix $C_M^b$ can be expressed as $$C_M^b = \begin{bmatrix} 1 & 1 & \cdots & 1 \\ \alpha_{b,1} & \alpha_{b,1} & \cdots & \alpha_{b,1} \\ \vdots & \vdots & \ddots & \vdots \\ \alpha_{b,M-1} & \alpha_{b,M-1} & \cdots & \alpha_{b,M-1} \end{bmatrix}$$

where $\alpha_{b,m}$, $1 \leq m \leq M-1$ indicates a phase difference compensated for an antenna array corresponding to the m-th port with respect to an antenna array corresponding to the 0-th port, and has a value depending on structure and arrangement of the antenna arrays, and the direction of the transmitting beam.

13. The electronic device according to claim 11, wherein the number of ports M is a power of 2, i.e. $M=2^n$, wherein n is a positive integer greater than 1 and
wherein the additional phase matrix is generated according to $C_M^r = C_{M/2}^r \otimes H_2$, where $H_2$ represents a second-order Hadamard matrix $$H_2 = \begin{bmatrix} 1 & 1 \\ 1 & -1 \end{bmatrix},$$

$\otimes$ represents an operation for kronecker product, and when the number of ports is 2, the additional phase matrix $$C_2^r = \begin{bmatrix} 1 & 1 \\ j & -j \end{bmatrix}.$$

14. The electronic device according to claim 9, wherein the processing circuitry is further configured to control the plurality of the antenna arrays to transmit the code division multiplexed reference signals on a third communication resource and a fourth communication resource with the same analog beamforming parameters, so as to form a third combined beam and a fourth combined beam,
wherein the third combined beam and the fourth combined beam are symmetric about the particular transmitting beam, and has a direction angle relative to the particular transmitting beam different from the direction angles of the first and second combined beams relative to the particular transmitting beam.

15. An electronic device at a transmitting side, comprising a processing circuitry configured to:
determine common analog beamforming parameters for a plurality of antenna arrays;
control the plurality of antenna arrays to transmit code division multiplexed reference signals on a first communication resource and a second communication resource by using a determined target transmitting beam, so as to form a first combined beam and a second combined beam, respectively, wherein the first combined beam and the second combined beam have different directions;

receive information on a relative beam gain of the first and second combined beams received at a receiving side; and determine a channel direction angle based on a mapping relationship between the information and the channel direction angles.

* * * * *